United States Patent [19]

O'Hair

[11] Patent Number: 5,315,668

[45] Date of Patent: May 24, 1994

[54] OFFLINE TEXT RECOGNITION WITHOUT INTRAWORD CHARACTER SEGMENTATION BASED ON TWO-DIMENSIONAL LOW FREQUENCY DISCRETE FOURIER TRANSFORMS

[75] Inventor: Mark A. O'Hair, Huber Heights, Ohio

[73] Assignee: The United States of America as represented by the Secretary of the Air Force, Washington, D.C.

[21] Appl. No.: 800,174

[22] Filed: Nov. 27, 1991

[51] Int. Cl.$^5$ ............................................. G06K 9/62
[52] U.S. Cl. ........................................ 382/14; 382/36; 382/43; 382/57
[58] Field of Search ....................... 382/14, 15, 30, 31, 382/34, 36, 43, 57

[56] References Cited

U.S. PATENT DOCUMENTS

| | | | |
|---|---|---|---|
| 4,254,400 | 3/1981 | Yoda et al. | 340/146.3 MA |
| 4,327,354 | 4/1982 | Persoon | 340/146.3 MA |
| 4,490,851 | 12/1984 | Gerhart et al. | 382/43 |
| 4,513,441 | 4/1985 | Henshaw | 382/43 |
| 4,513,442 | 4/1985 | Scherl | 382/49 |
| 4,651,289 | 3/1987 | Maeda et al. | 364/513.5 |
| 4,764,973 | 8/1988 | O'Hair | 382/14 |
| 4,817,176 | 3/1989 | Marshall et al. | 382/43 |
| 5,191,622 | 3/1993 | Shojima et al. | 382/13 |

OTHER PUBLICATIONS

O'Hair, "A Whole Word and Number Reading Machine Based on Two Dimensional Low Frequency Fourier Transforms", Dissertation at Air Force Institute of Technology, Dec. 1990.

*Primary Examiner*—David K. Moore
*Assistant Examiner*—Andrew W. Johns
*Attorney, Agent, or Firm*—Bernard E. Franz; Thomas L. Kundert

[57] ABSTRACT

Image analysis and recognition includes reading text, by digitally scanning a surface, locating the printed material in that digital image, and then recognizing words, phrases, or numbers based on their two dimensional, low frequency Fourier harmonics. One objective is to specifically apply this method of recognition to the postal industry, to include all shipping and labeling applications. Once the image of a word is digitized and isolated, a two-dimensional Fourier transform is computed of the digital image. The process is accomplished in the same manner regardless of the type of surface the printed text comes from, just as long as each word, phrase, or set of numbers to be recognized is isolated, stored in a digital form, and then Fourier Transformed. The sine and cosine coefficients from the Fourier Transform are then filtered to include only the low frequency, terms (i.e. DC term and first 5 harmonics in both vertical and horizontal axis). The sine and cosine terms (coefficients) then define 121 unique vectors which represent a 121 orthogonal vector space. The vector space is normalized to unity and each image of the word, phrase, or set of numbers defines a unique point along this 121 orthogonal vector hypersphere. A library of words, phrases, and/or numbers must be produced using many different font styles. The library when developed, will consist of sine and cosine coefficient values which represent each word, phrase, or number to be recognized. This library is uniquely fashioned by averaging the sine and cosine terms of similar font styles into what is called font groups.

6 Claims, 28 Drawing Sheets

Fig. 6
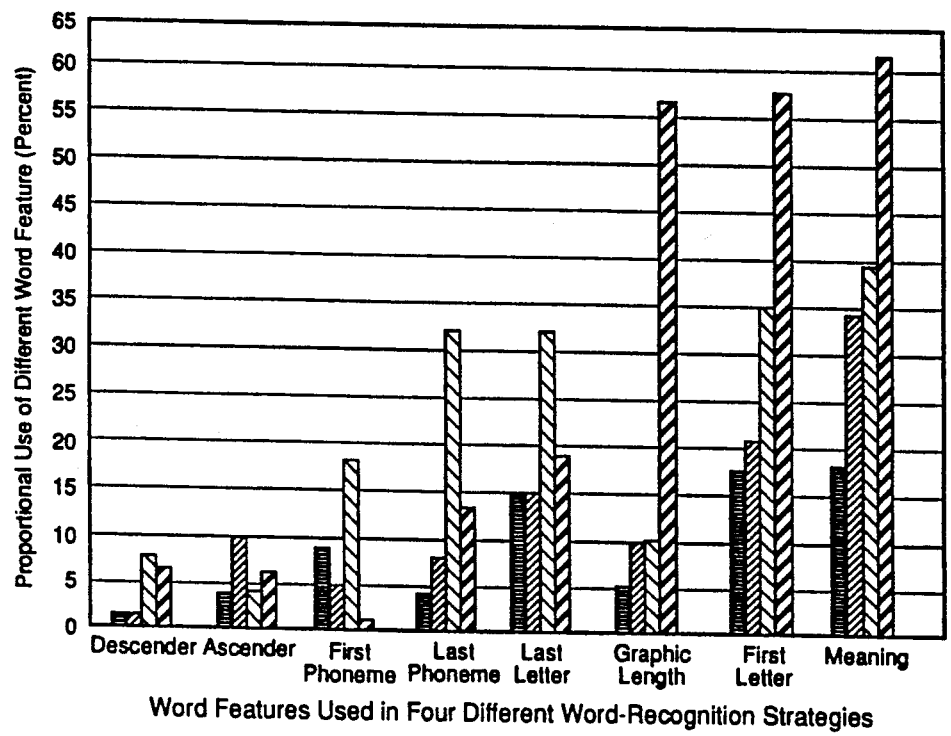
Fig. 7
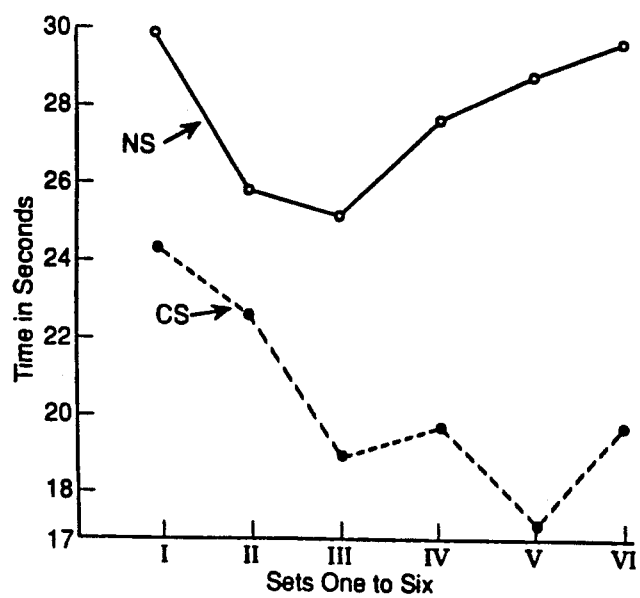
Fig. 8

Fig. 9
Avant Garde : Spacing between letters
-5 pixels   +1 pixels   +7 pixels
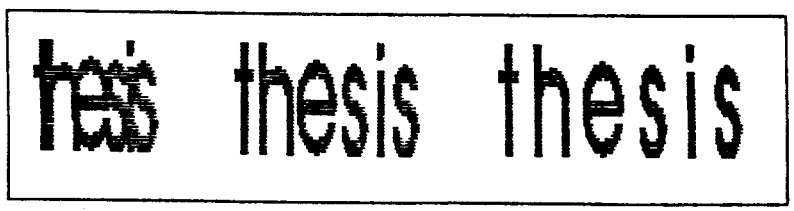
Helena Script : Spacing between letters
-5 pixels   +1 pixels   +7 pixels
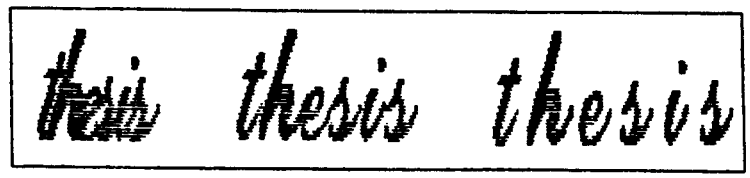
Fig. 10

```
        V         HORIZONTAL --->
        E
        R  |
        T  |
        I  |      (*) - signifies coefficient used.
        C  V
        A
        L
```

```
       -4 -3 -2 -1  0  1  2  3  4              -4 -3 -2 -1  0  1  2  3  4
      ---------------------------             ---------------------------
   -4 |                         |          -4 |                         |
   -3 |                         |          -3 |                         |
   -2 |    *  *  *  *  *  *  *  |          -2 |    *  *  *  *  *       |
   -1 |    *  *        *  *     |          -1 |    *  *  *  *  *       |
    0 |    *  *        *  *     |           0 |    *  *  *  *  *       |
   +1 |    *  *        *  *     |          +1 |    *  *  *  *  *       |
   +2 |    *  *  *  *  *  *  *  |          +2 |    *  *  *  *  *       |
   +3 |                         |          +3 |                         |
   +4 |                         |          +4 |                         |
      ---------------------------             ---------------------------

(2 x 3) - (1 x 1)                            (2 x 2)
```

*Fig. 11* clear                                                              to
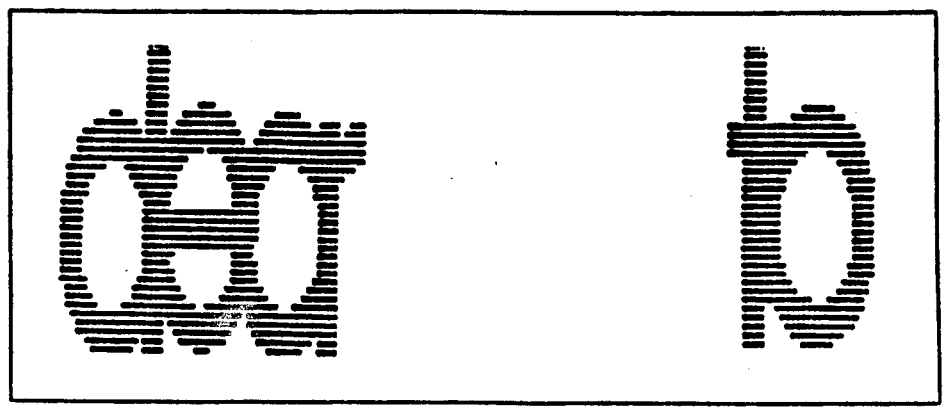
*Fig. 12*
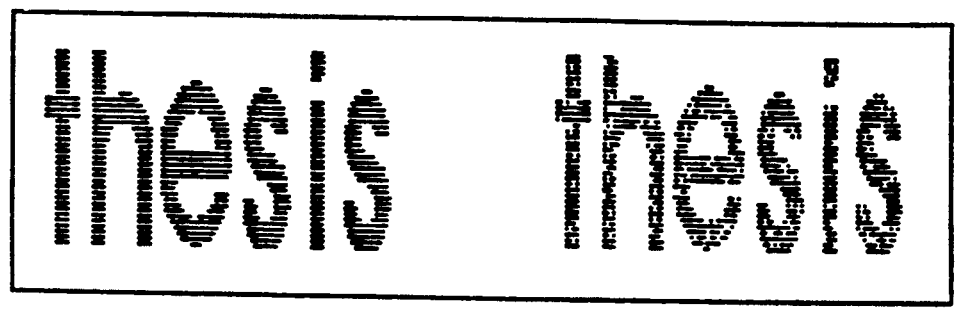
50% noise                                                     86% noise
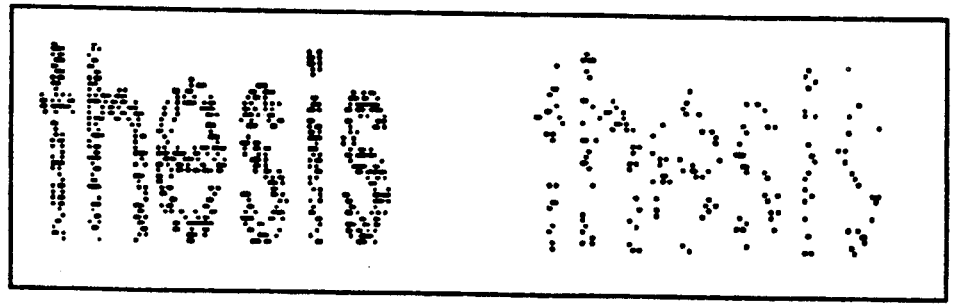
*Fig. 13*

```
VERTICAL                HORIZONTAL --->              -4 -3 -2 -1  0  1  2  3  4
                                              -4  |  •  •  •  •  •  •  •  •  •
            (•) - signifies                   -3  |  •  •  •  •  •  •  •  •  •
                  coefficients used.          -2  |  •  •                 •  •
                                              -1  |  •  •                 •  •
                                               0  |  •  •                 •  •
                                              +1  |  •  •                 •  •
                                              +2  |  •  •                 •  •
                                              +3  |  •  •  •  •  •  •  •  •  •
                                              +4  |  •  •  •  •  •  •  •  •  •

[a] : (4 x 4) - (2 x 2)

-4 -3 -2 -1  0  1  2  3  4                    -4 -3 -2 -1  0  1  2  3  4
  -4 |                                          -4  |        •  •  •  •  •
  -3 |                                          -3  |        •  •  •  •  •
  -2 |  •  •  •  •  •  •  •  •  •               -2  |        •  •  •  •  •
  -1 |  •  •  •  •  •  •  •  •  •               -1  |        •  •  •  •  •
   0 |  •  •  •  •  •  •  •  •  •                0  |        •  •  •  •  •
  +1 |  •  •  •  •  •  •  •  •  •               +1  |        •  •  •  •  •
  +2 |  •  •  •  •  •  •  •  •  •               +2  |        •  •  •  •  •
  +3 |                                          +3  |        •  •  •  •  •
  +4 |                                          +4  |        •  •  •  •  •

[b] : (2 x 4)                                    [c] : (4 x 2)

number of agreements:
    [a] vs [b] = 24323 out of 25000 possible.
    [a] vs [c] = 23731 out of 25000 possible.
    [b] vs [c] = 24021 out of 25000 possible.
number of non agreements between all three:
    [a] != [b] != [c] = 253 out of 25000 possible.
```

*Fig. 14*

```
V         HORIZONTAL --->              -4 -3 -2 -1  0  1  2  3  4
E                                     ------------------------------
R |                              -4 |  •     •     •     •     •
T |       (•) - signifies        -3 |  •     •     •     •     •
I |             coefficients used.-2 |  •     •     •     •     •
C V                              -1 |  •     •     •     •     •
A                                 0 |  •     •     •     •     •
L                                +1 |  •     •     •     •     •
                                 +2 |  •     •     •     •     •
                                 +3 |  •     •     •     •     •
                                 +4 |  •     •     •     •     •
                                     ------------------------------
                                     [a] : (4 x 4) - (evens terms)

-4 -3 -2 -1  0  1  2  3  4              -5 -4 -3 -2 -1  0  1  2  3  4  5
  ---------------------------------       -------------------------------------
-4 |  •     •     •     •     •       -4 |
-3 |     •     •     •     •          -3 |
-2 |  •     •     •     •     •       -2 |  • • • • • • • • • • •
-1 |     •     •     •     •          -1 |  • • • • • • • • • • •
 0 |  •     •     •     •     •        0 |  • • • • • • • • • • •
+1 |     •     •     •     •          +1 |  • • • • • • • • • • •
+2 |  •     •     •     •     •       +2 |  • • • • • • • • • • •
+3 |     •     •     •     •          +3 |
+4 |  •     •     •     •     •       +4 |
  ---------------------------------       -------------------------------------
   [b] : (4 x 4) - (odd terms)              [c] : (2 x 5)

number of agreements:
    [a] vs [b] = 23978 out of 25000 possible.
    [a] vs [c] = 24289 out of 25000 possible.
    [b] vs [c] = 24362 out of 25000 possible.
number of none agreements between all three:
    [a] != [b] != [c] == 201 out of 25000 possible.
```

*Fig. 15* a = location of the word 'one' in a particular font style

A = centroid or average of all a's b = location of the word 'own' in a particular font style B = centroid or average of all b's

OFFLINE TEXT RECOGNITION WITHOUT INTRAWORD CHARACTER SEGMENTATION BASED ON TWO-DIMENSIONAL LOW FREQUENCY DISCRETE FOURIER TRANSFORMS

RIGHTS OF THE GOVERNMENT

The invention described herein may be manufactured and used by or for the Government of the United States for all governmental purposes without the payment of any royalty.

RELATED DISCLOSURES

The invention is an improvement and modification to my U.S. Pat. No. 4,764,973, titled "Whole Word, Phrase or Number Reading." The invention covered by that patent related to an Optical Character Reader (OCR) machine which would perform off line text recognition without having to segment words into individual characters. This previous system is not adequate, though, in handling a large vocabulary (1000-5000 words) with many font styles (>20). Those two key items have been solved by a new algorithm. This new added approach makes the system of U.S. Pat. No. 4,764,973 an OCR usable by industry to recognize documents in both printed and cursive text. U.S. Pat. No. 4,764,973 is hereby incorporated by reference.

The invention of U.S. Pat. No. 4,764,973 is disclosed in my thesis (AFIT/GEO/ENG/84D-4) titled "Whole Word Recognition Based on Low Frequency Fourier Complex and Amplitude Spectrums" for the School of Engineering, Air Force Institute of Technology (AU), Wright-Patterson Air Force Base, December, 1984, a copy of which is included in the file of U.S. Pat. No. 4,764,973 and is hereby incorporated by reference.

The present invention is disclosed in my dissertation, entitled "A Whole Word and Number Reading machine Based on Two Dimensional Low Frequency Fourier Transforms" AFIT/DS/ENG/90D-01 (approved and nominally dated December, 1990, but not published until 1991), presented at the Air Force Institute of Technology (AFIT), Air University, Wright Patterson Air Force Base, Ohio, 45433 (hereinafter referenced as "my dissertation"). A copy of this dissertation was included with this application as filed, and incorporated by reference. The text of the dissertation is included at the end of this specification, and the drawings thereof are FIGS. 1-40 herein.

BACKGROUND OF THE INVENTION

The present invention relates generally to image analysis and recognition of whole words, phrases or numbers. This includes a Fourier transformation and pattern recognition of offline text that does not require intraword character segmentation.

OCR automation of businesses is dependent on a machine's ability to recognize the input (words, phrases, or numbers) and act according to preprogrammed instructions. Unfortunately most inputs are not in a form compatible with automation. An example is the postal service. The average person does not address his letter with a bar code label format. People address their mail with words written on one side of the envelope or package. No two persons' handwriting is the same and no one can write exactly the same way each time. In addition, words and numbers are inseparable because they touch one another or the print is broken and incomplete. It is not difficult for the human mind to recognize most handwriting but the complexity to build a computer system to do the same has yet to be achieved.

U.S. Pat. No. 4,764,973 provides a preliminary background. It provides the rudimentary steps to input a piece of document text (whether on a printed page or parcel package), scan the text, and to recognize the scanned information. However, the previous algorithm was not capable of handling a large dictionary with many font styles. It was only sufficient as a testbed for research and for use with studying dyslexic readers. The background section of the patent provides more discussion of the problem, and includes references for background information and prior studies in this field.

SUMMARY OF THE INVENTION

An objective of the invention is to provide a method of reading text, by digitally scanning a surface, locating the printed material in that digital image, and then recognizing words, phrases, or numbers based on their two dimensional, low frequency Fourier harmonics. Another objective is to specifically apply this method of recognition to the postal industry, to include all shipping and labeling applications.

According to the invention, once the image of a word is digitized and isolated, a two-dimensional Fourier transform is computed of the digital image. The process is accomplished in the same manner, regardless of the type of surface the printed text comes from, just as long as each word, phrase, or set of numbers to be recognized is isolated, stored in a digital form, and then Fourier Transformed. The sine and cosine coefficients from the Fourier Transform are then filtered to include only the low frequency terms (i.e. DC term and first 5 harmonics in both vertical and horizontal axis. The sine and cosine terms (coefficients) then define 121 unique vectors which represent a 121 orthogonal vector space. The vector space is normalized to unity and each image of the word, phrase, or set of numbers defines a unique point along this 121 orthogonal vector hypersphere.

According to the invention, a library of words, phrases, and/or numbers must be produced using many different font styles. The library, when developed, will consist of sine and cosine coefficient values which represent each word, phrase, or number to be recognized. The key element in this invention is building the proper library of Fourier coefficients. This library is uniquely fashioned by averaging the sine and cosine terms of similar font styles into what is called font groups (reference my dissertation). The importance of the font groups is key in building a library which has the flexibility to allow for font style variations while still maintaining a set of sine and cosine terms which are representative of the images to be identified.

The invention then achieves recognition by selecting which library word's coefficients and test word's coefficients have the smallest error value. This is equivalent to finding the library word which is nearest to the test word along the surface of the orthogonal vector hypersphere. The method according to the invention is also capable of evaluating its own performance and self adjusting to reduce incorrect matches. This ability of self monitoring also allows the method to detect when a new font style, one which is not a part of the library, is being initially viewed and to add this new font style to its library.

A conclusion is that a system according to the invention can be operated as a stand-alone system or as part of a current Optical Character Reader (OCR) system which employs character segmentation. When used as a part of another OCR, it would provide an alternate method of recognizing words which could then be combined with the segmented method to achieve an increase in the recognition rate and a decrease in the rejection rate.

BRIEF SUMMARY OF THE DRAWING

FIG. 6 is a diagram showing the visual importance of top and bottom half of words;

FIG. 7 is a bar graph showing eight measures of word similarity;

FIG. 8 is a graph showing anagram testing of fourth graders;

FIG. 9 is a diagram showing an avant garde font style;

FIG. 10 is a diagram showing actual images with varied spacings;

FIG. 11 is a diagram showing harmonic groupings;

FIG. 12 is a diagram showing additions images in avant garde font style with a −5 pixel spacing;

FIG. 13 is a diagram showing random noise on the word 'thesis' in avant garde font style;

FIG. 14 is a diagram showing first three harmonic groups;

FIG. 15 is a diagram showing second three harmonic groups;

FIG. 39 is a diagram showing a schoolbook italicized font style;

FIG. 40 is a diagram showing a wedding text font style;

DETAILED DESCRIPTION

My U.S. Pat. No. 4,764,973 provides a preliminary background. It provides the rudimentary steps to input a piece of document text (whether on a printed page or parcel package), scan the text, and to recognize the scanned information. The computer hardware has been modified to use a Sun Sparc 2 workstation, but this effects only the speed with which the process takes place and not the functionality of the processes involved. What has been improved i& the method for building the library and the recognition algorithm which identifies the image of a word from that stored library. The previous algorithm was not capable of handling a large library with many font styles. It was only sufficient as a testbed for proof of concept and for use with studying dyslexic readers. This invention builds an offline text recognizer for both printed and cursive text.

My dissertation includes further background information, and a program listing for the method of building the library and reading whole words and numbers in text.

Figure 41:
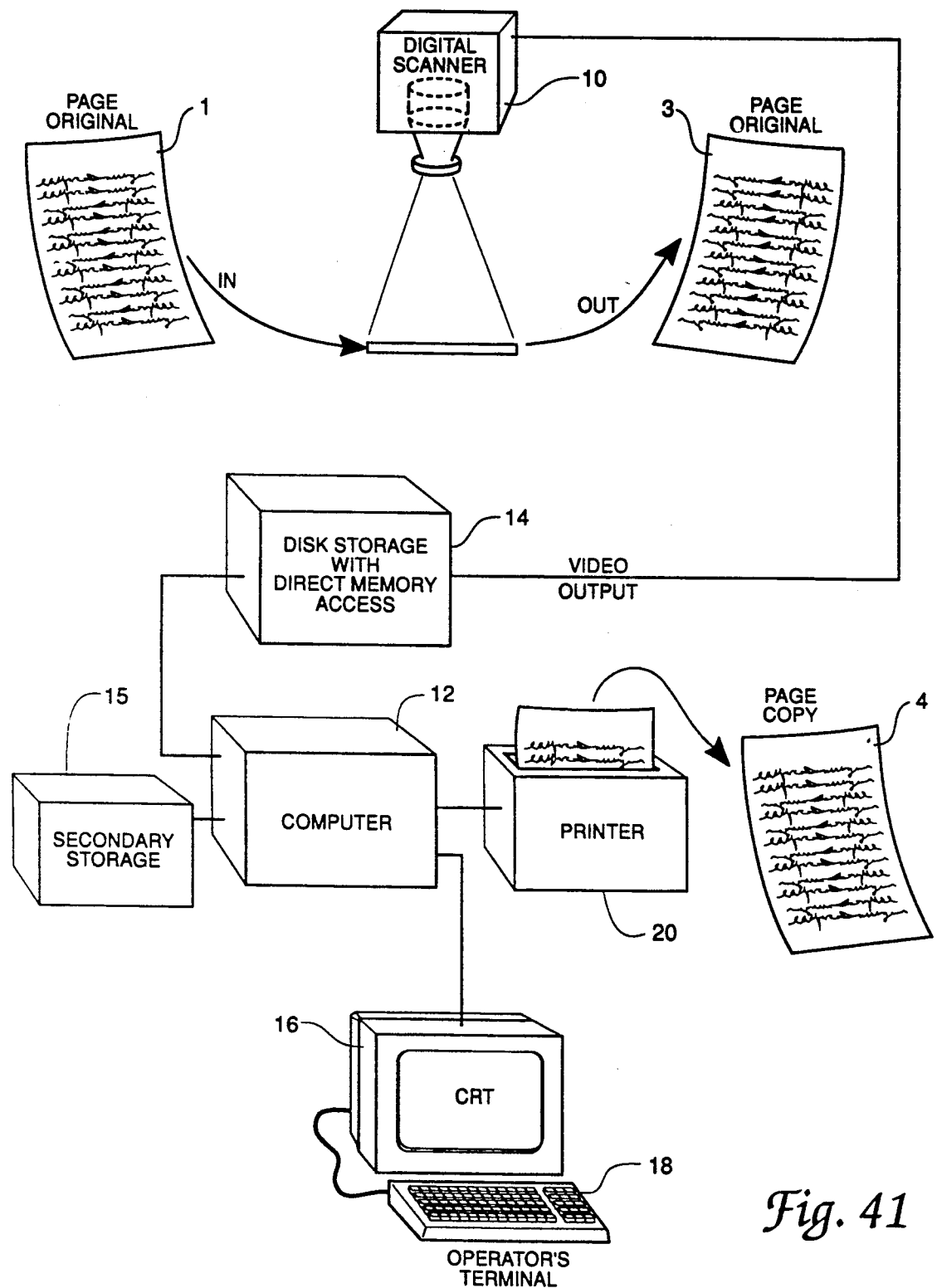
FIG. 41 is a system block diagram showing the units of apparatus for reading text.

As shown in FIG. 41, the equipment comprises off-the-shelf parts, including a digital scanner 10, a computer 12, disk storage apparatus 14, secondary storage 15, a CRT terminal 16, a keyboard 18, and a printer 20. The operation is shown by the flow chart in FIG. 42. FIGS. 43a–43e comprise a more detailed flow chart.

Basic Method

The basic process of recognizing text, with a system having representative digital images stored in memory, uses as an initial step;

(a) building a library of known words, phrase& and numbers using low frequency filtered Fourier coefficients using many different font styles and assembling them into font groups.

Figure 42:
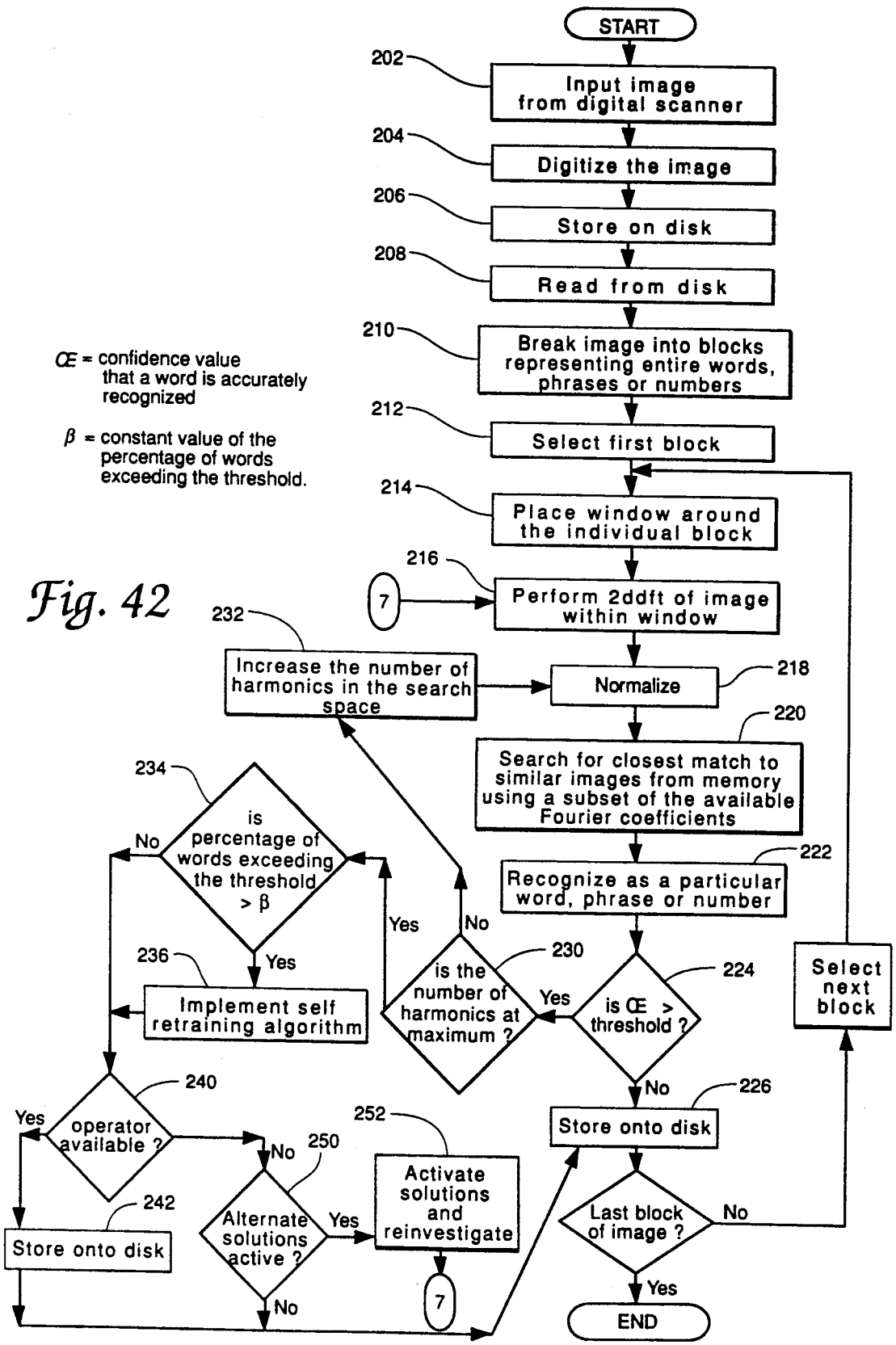
FIG. 42 is an overall flow chart for the method of reading according to the invention.

Referring to FIG. 42, the process then comprises the following steps:

(b) inputting an image representing text (box 202);

(c) digitizing the image to form a digital picture thereof (box 204);

(d) storing the image on the disk 14 (box 206) and reading the image from the disk (box 208) into memory of the computer 12;

(e) breaking the image into blocks of data, wherein the blocks represent entire words, phrases, or numbers (block 210);

(f) selecting the first block (box 212), and placing a window around the first individual block (box 214);

(g) performing a two-dimensional discrete Fourier Transform (2DDFT) of the image within the window (box 216);

(h) adjusting for punctuations;

(i) filtering both the real (cosine) and imaginary (sine) coefficients to the first five harmonics in both the vertical and horizontal axis; these coefficients then make up a total of 121 unique vectors which defines a 121 orthogonal vector space;

(j) energy normalizing to unity the 121 unique vectors, which will eliminate the effects due to image brightness (box 218);

(k) searching the library of known coefficients and finding the closest match by computing the smallest error between library image and input image (box 220), and recognize as a particular word, phrase or number (box 222);

(l) calculating a confidence value of the closest match based on the radius of the chosen font group and the distance between the font group center and the input word (box 224);

(m) storing the match in secondary storage 15 if confidence is high (box 226) or further investigating if confidence is low.

Self Monitoring

The system has the capability to self-monitor its decisions and performance and make an appropriate change(s) to its algorithm to improve its level of recognition. When confidence is low, the method of recognition enters into a self-monitoring mode. This mode has the following properties but is not limited to:

(a) varying the total number of harmonics used and the specific harmonic field used for recognition (boxes 230 and 232) (reference my dissertation sections 4.2.4 and 4.3.3);

(b) monitoring the percentage of words which exceed the low confidence threshold and activating the self-retraining mode (boxes 234 and 236)(reference section 4.3.2);

(i) using a small sample of less than 50 words;
  (ii) calculate the mean magnitude and direction of errors between the input words, phrases, or numbers and the library words or numbers;
  (iii) add this mean magnitude and direction to the entire library font group(s) which is(are) selected in l(k) above;
  (iv) if the confidence values do not improve for the next set of 50 input words, then return the previous font group(s) to their values and repeat the first 50 inputs against the font styles in the library. Using the most popular two or three font styles selected between the nearest neighbor matches, build a new font group using these two or three most popular font styles and the input font style;
  (v) if the confidence values do not improve for the third set of 50 input words, then eliminate this new font group, use only the original font groups in the library, and flag all words with a low confidence value;

(c) If a human operator is available (box 240), display only those words, phrases, and numbers which exceed the low confidence threshold and can not be improved upon by items (a), (b), and/or (d), and store onto disk (box 242);

(d) If a human operator is not available and alternate solutions are active (box 250), activate solutions (box 252) that include, but are not limited to:
  (i) breaking the input image into three parts (reference section 4.3.1 of my dissertation);
  (ii) imaging the input into three distinct Fourier vector spaces and reaching a best solution based on their correlation (reference section 4.3.3);
  (iii) varying the scanner resolution;
  (iv) searching strategic key subregions of the input image to eliminate confusion between words that differ only in details such as 'came/come' or 'after/often';
  (v) post processing based on syntax and semantics (specifically for the postal reader the relationship between zip code possibilities and city/state names is very important, as well as zip code, city, and street name possibilities).

Further Description

A page or surface 1 with printed or cursive text is placed in the field-of-view of the digital scanner 10 at position 2, then out as shown at 3. A minimum scanner resolution of 60 to 72 pixels per inch is required. This is calculated based on the desired capability of the system according to the invention. To properly run the algorithms, it is required to have at least six pixels of resolution in the vertical axis for each word, phrase, or number. Using a scanner with a resolution of 60 pixels per inch, allows the algorithm to read words written as small as 1/10 of an inch on a printed page. If the word size on a page is smaller than 1/10 of an inch, then two options are available;

1. Optically magnify the image during scanning, thus increasing the number of pixels per inch.

2. Dynamically increasing the number of pixels per inch that the scanner is operating at. This is a common feature for digital scanners and is the simpler approach of these two options. It should be noted that a hand scanner for bulky packages and/or specific uses can be used instead of a large table top scanner.

The image taken from scanner 10 is fed into disk storage 14 (which has direct memory access). This is done simply to buffer the input and is not absolutely necessary. The image is subsequently supplied to the computer 12 from disk 14, which analyzes the digital picture of the image input.

The computer 12 breaks the image up into blocks of data, wherein the blocks represent entire words, phrases, or numbers. The system as described in my dissertation was a Sun 4 workstation. The need for a mainframe computer is not necessarily required. This process can be run on any personal computer. The only thing that changes is the speed in which a page is processed.

The first algorithm run by the computer, locates prospective words, phrases, and numbers from a digital image. This is done similar to the process in FIGS. 43a, 43b, and 43c. This is not new technology to perform this technique. Each prospective word, phrase, or number is windowed and handed off to the next computer program for processing.

The algorithm run next performs a two-dimensional discrete Fourier Transform (hereafter 2DDFT) of the image within the window. The Fourier coefficients are filtered to include the DC term and the first five harmonics in both the vertical and horizontal axis. These real and imaginary components (the cosine and sine terms, respectively) then make up a total of 121 vectors which defines a 121 orthogonal vector space. These 121 vectors are normalized to unity and thus define a unique point on this 121 dimensional hypersphere for each image of a word, phrase, or number. Similar looking words, phrases, or numbers cluster on the hypersphere's surface and the smaller distance from one point to another defines the visual similarity between and two words.

One of the primary technological breakthroughs of the invention lies in the development of a proper library. For recognition to occur, every word, phrase, or number is compared to the set of images in the library. Therefore, the establishment of a library, which is representative of the images to be identified, while maintaining enough margin for image variation is crucial. The system according the invention, develops a library based on font groups. Font groups represent the spatial averaging of images in Fourier space and can be thought of as developing new font styles from the characteristics of various similar or dissimilar font styles. My dissertation provides a complete explanation of font groups.

Figure 43A:
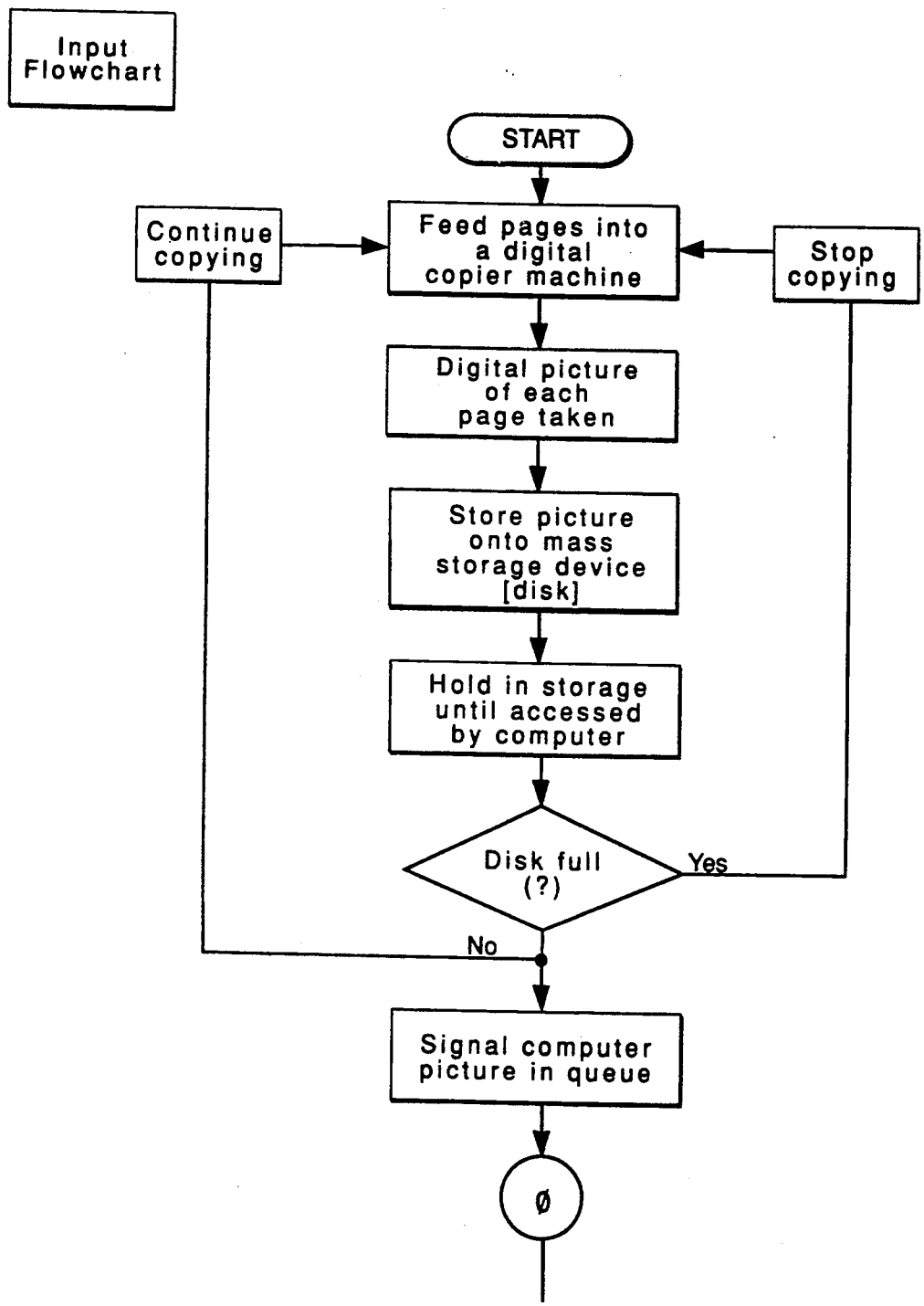
FIGS. 43a–43e comprise a more detailed flow chart.
Figure 43B:
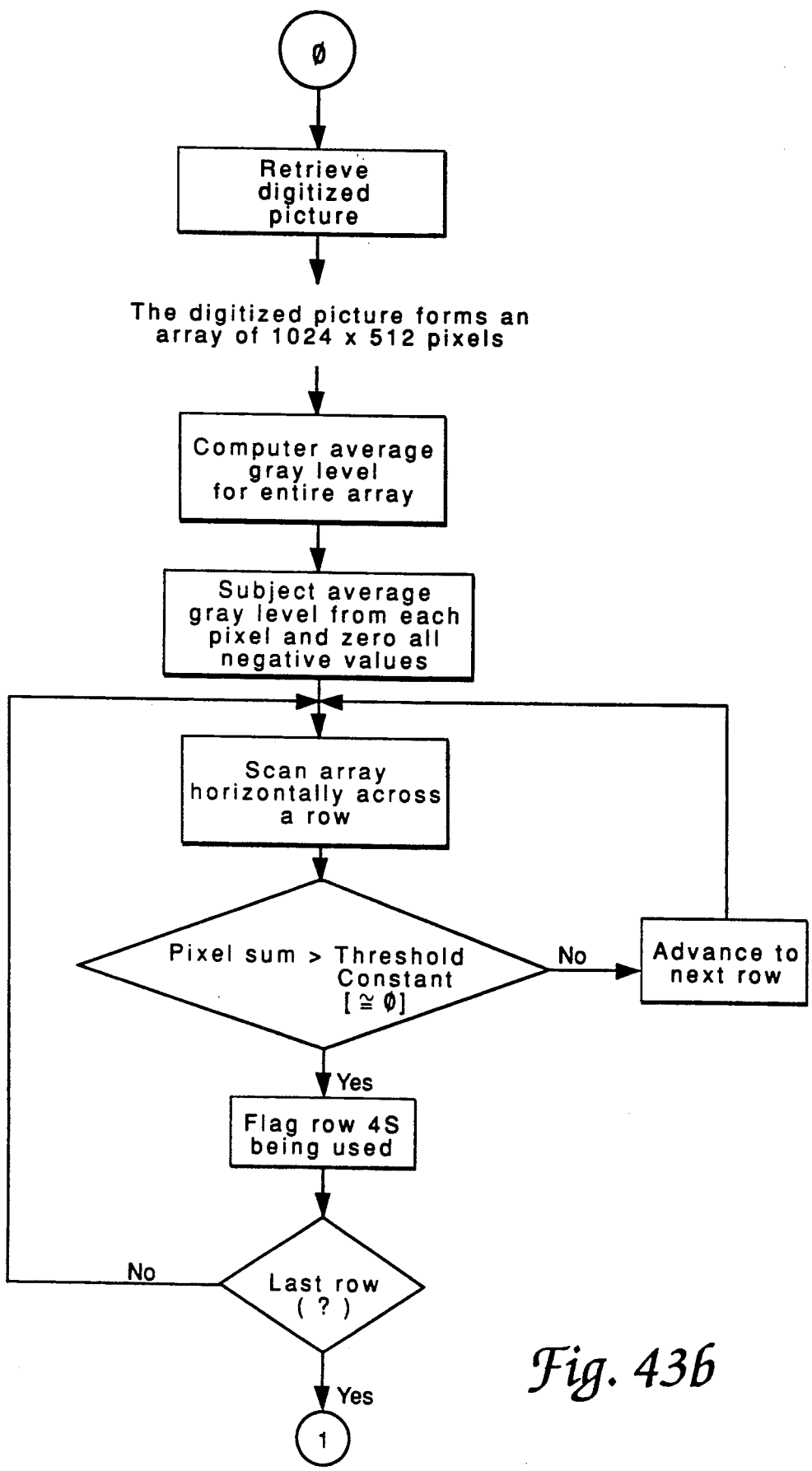
Figure 43C:
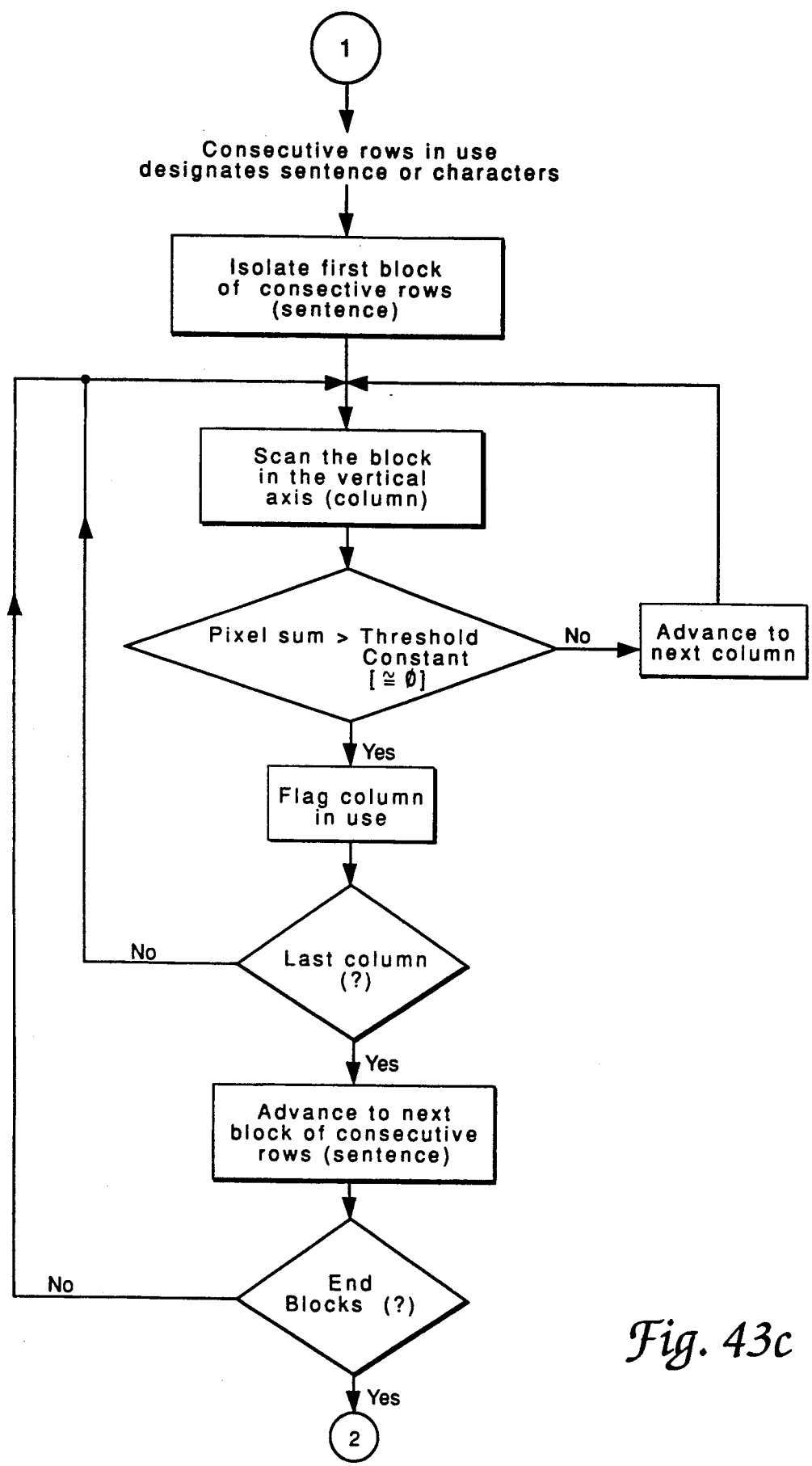
Figure 43D:
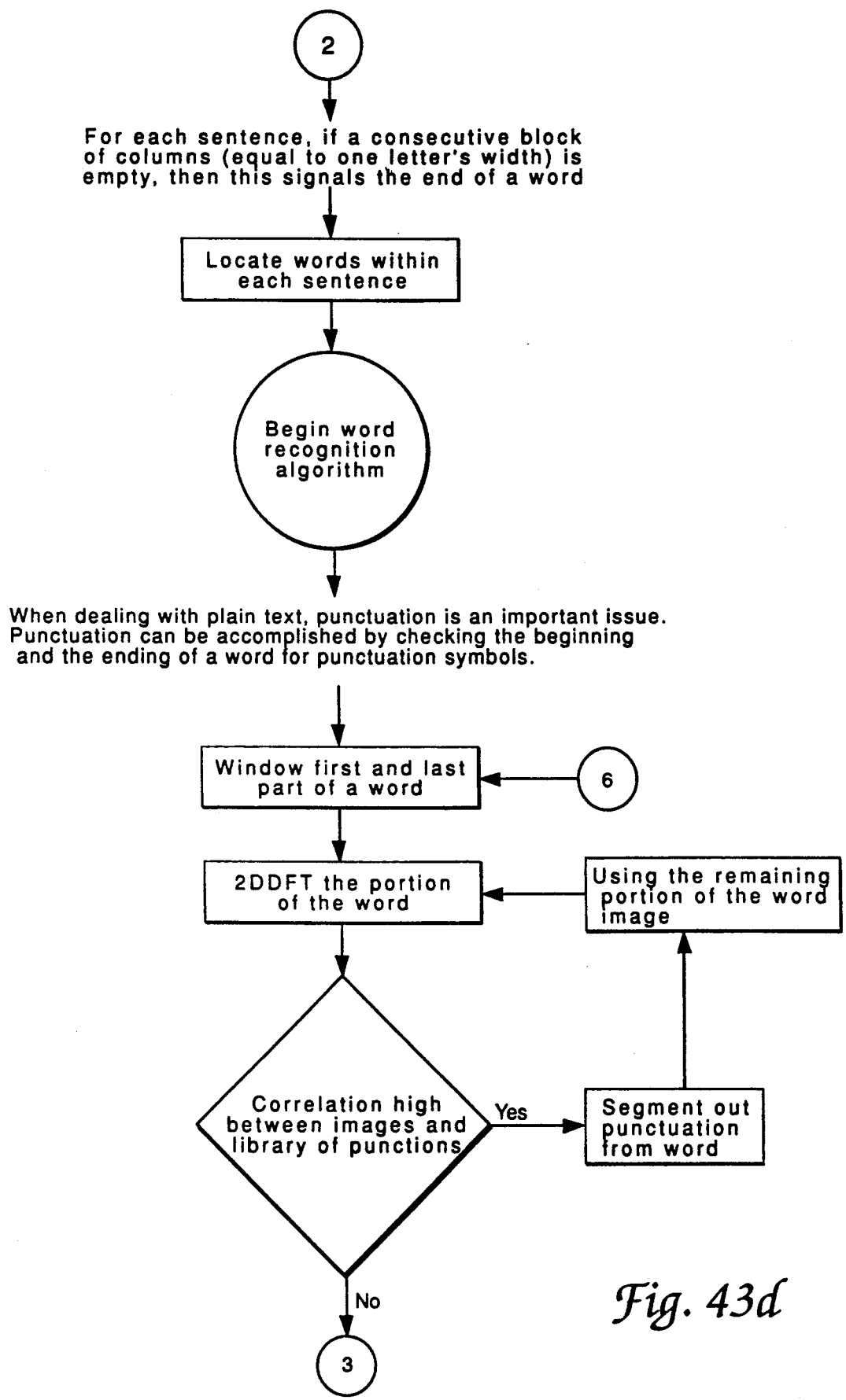

With the establishment of a proper library based on the use of font groups, the algorithm searches for punctuation in text. This is not always a necessary step, case in point, the postal reading problem looking at the five digit zip code number. FIG. 43d outlines the process to be implemented for searching and isolating punctuations.

After a nearest neighbor (library match) is made, the system makes a determination of the quality of that match. This is accomplished through the knowledge obtained about each font group's centroid and clustering of the font styles around that centroid. There are two important factors recorded in the library about each image. First is the location on the multi-dimensional hypersphere and second is the average distance across each individual font group cluster. This distance is a measure of the variance within each particular font group. If a nearest neighbor is selected but the distance is equal to three or more times the standard deviation of the radius, then a low confidence value is given to the match. If the distance is less than one standard deviation, then a high confidence value is given to the match. With such a system, the method is capable of monitoring its matches and assessing a confidence value of its performance.

Figure 43E:
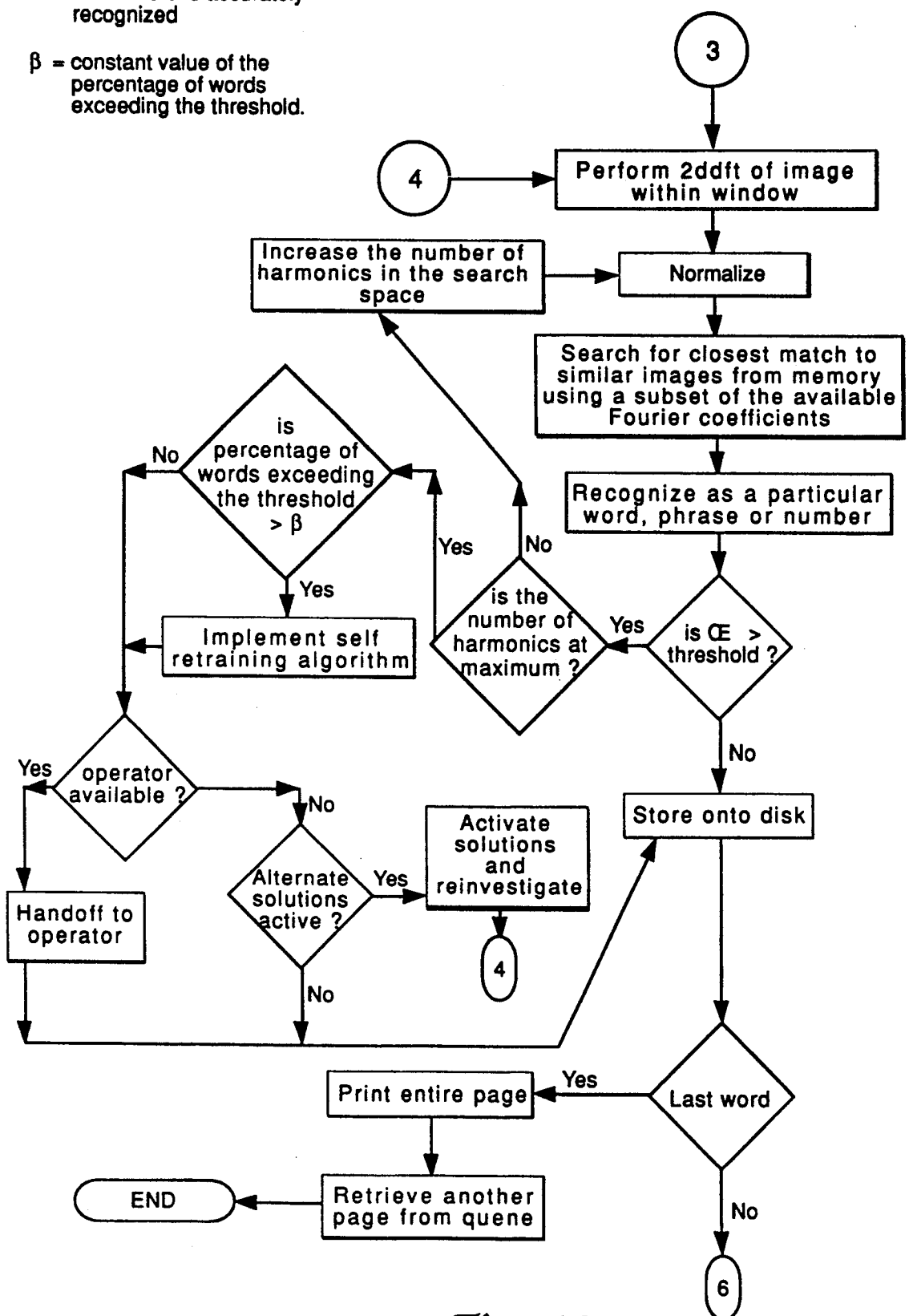

When confidence values are low, a whole host of self-correcting procedures can be activated. A flow chart of the process is shown in FIG. 43e and a brief description is as follows.

The self retraining algorithm, described in my dissertation, is capable of learning a new font style given a brief example of that font style. This learning process can either develop a new font group or alter an existing one.

The number of harmonics can be varied to accommodate for highly confusable images (i.e. 'came' and 'come' or '9008' and '9088'). The increase of harmonics is a trade-off between processing speed and accuracy of recognition, described in my dissertation.

Figures 1, 2:
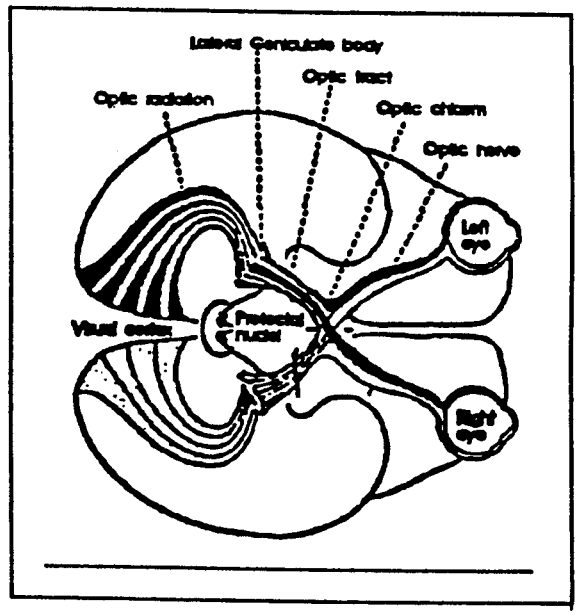
FIG. 1 is a diagram showing samples of hand writing.
FIG. 2 is a diagram showing the human visual system.

The use of the a CRT terminal 16 and keyboard 18 in FIG. 1 is not essential to the invention. They can be used by a human operator to monitor the health of the system and if a higher level of accuracy is required, human interaction with the recognition process is available. Images which have a high degree of uncertainty about them can be displayed on the CRT terminal 16 and the human operator's recognition can be typed onto the keyboard 18. This is a very important feature because it assigns only difficult words (ones with a high uncertainty) to be handed off to an operator and allows the system to be used interactively. Therefore, the CRT terminal 16 and keyboard 18 are not essential, but significantly add to the capability of the system.

The printer 20 is not necessarily needed. The ASCII representation of a word which is sent to the secondary storage 15 is the main objective of this system. It is nice to be able to printout the finished product on the printer 20, but by no means necessary. What is necessary is that the information be stored on the storage unit 15.

Additional alternate solutions, listed in FIG. 43e and described in my dissertation, include, but are not limited to a redundant Fourier investigation of the image by using different Fourier harmonics, separation of the image into three separate parts (first, middle, and end) and recognition based on the three parts (this is synonymous to reading syllables), and searching the library based on higher level syntactic and semantic post reader correction.

DISSERTATION

The following is a copy of the text of my dissertation, with FIGS. 1–40 herein being the drawings thereof. Appendix A of the dissertation is the same as FIGS. 17–40 of the drawings herein, showing different font styles. Appendix B of the dissertation is a computer program for learning font groups, and is included herein. Appendix C on pages 105–119 of the dissertation, which is a list of the 5000 most popular words in the English language, is not included herein.

The Fourier transform is investigated as a means for developing an optical reader capable of reading a large vocabulary without segmenting the image of a word into individual characters. The reader is capable of reading printed and cursive font styles, is scale invariant, and is substantially insensitive to noise. The image of a particular word is treated as a single symbol; the two dimensional low frequency Fourier coefficients (assuming n coefficients are calculated) define the word's location on an $\eta$ dimensional hypersphere of unit radius. The distance between individual locations (words) categorizes similar and dissimilar words. The smaller the distance, the more similar two images are. Multiple images of a word using various font styles form a unique cluster on the surface of the hypersphere. The distance between clusters (different words) is greater than the distance across a cluster (same word in different font styles). Therefore, by using the centroid of these clusters to build a library of words, input or test words match to the nearest cluster centroid using a minimum distance calculation. This algorithm is capable of correctly recognizing at least 5000 words using 24 various font styles (120,000 individual images).

A WHOLE WORD AND NUMBER READING MACHINE BASED ON TWO DIMENSIONAL LOW FREQUENCY FOURIER TRANSFORMS

I. Introduction

The objective of this research was to investigate the use of the Fourier Transform as a means for developing an optical reader that is scale invariant and not limited by font shapes or spacing. With the development of laser printers, the evenly spaced text from the standard typewriter or daisy wheel printer becomes a thing of the past. Text is now more italicized, ornate, and varied in letter spacing. Now, these three characteristics have become a stumbling block to present day optical character readers (OCR's). The OCR depends upon segmenting a word into letters and then reconstructing the entire word. But what if segmenting a word into individual letters is not required? The boundaries which exist between words and lines are quite apparent but between individual letters they are not.

Under these circumstances an optical reader independent of letter segmentation could read almost any text as long as it has an appropriate template. This includes italicized and even possibly script (cursive) fonts. What seems impossible on a computer is being done within the human brain as one reads the text in FIG. 1.

With the vast difference in hand writing, the above text is still discernable. This process of identifying text is hypothesized by the Gestalt Theory. It theorizes how the brain identifies the numerous font types or objects based on associations with partial or similar learned images. No two the's are exactly shaped the same. Yet how difficult was it to read the last the? The brain has stored a vast quantity of different the's, yet as long as the font type is not too strange, it is read. Association is not dependent on segmenting the letters within a word, except when the words are unfamiliar or very long, but the image of a word is treated as a single symbol. Consequently, laser printing italic or script font is easy for the brain to decipher but almost impossible for an OCR. However, a gestalt based reader solves this dilemma.

My Masters' thesis (13) explored an approach to recognizing text as whole words without letter segmentation. In my research, I used 200 capital words with fixed letter spacing and some variation in font style. The thesis conclusions reveal that Fourier Transforms can model the gestalt of whole words, but it did not answer the question: is a working vocabulary with many various font styles possible? The thesis was quite successful as a test case for identifying whole words, but it was very limited in scope. A working vocabulary needs to be much larger and include lower case letters. Font variation increases greatly with the use of lower case, which adds to the complexity of the problem.

The system proposed above digitizes the image of a letter or word and forms the two dimensional Discrete Fourier Transform (2DFT). The coefficients from this transform are then used to categorize the original image. The smaller the difference there is in coefficient values the higher the correlation to similar looking input images.

The scope of this investigation is to use the lower harmonics of the 2DFT as a feature set in which to categorize digital images of words. A wide variance in letter spacing, along with print, italic and script font styles, which provide a variety in shapes, combine into a large vocabulary. Using this vocabulary, this research determines whether or not a reading machine can be based on low order Fourier Transforms. Therefore, this research has developed an algorithm for a reading machine which is:

1. capable of reading a large vocabulary of words and numbers without having to segment the individual characters; therefore, it will identify text as whole words or complete numbers.
2. capable of reading printed and cursive font styles.
3. scale invariant and substantially insensitive to noise.

II. Background

This portion will include the psychology of reading, the Fourier transformation used to model the gestalt theory, and my masters thesis. The first discussion centers on the psychology behind reading.

2.1 Physical parts

In modeling the reading process, it is important to overview the physical components of the system. Light focused on the human retina generates electrical signals that code the pattern content. The signals, in the form of pulses, transmit along the optical nerve to the thalamus so that a topological mapping of the viewed image exists both at the lateral geniculate in the thalamus and subsequently at the visual input cortex. The original image and the image presented at the visual input cortex maintains a homeomorphic (one-to-one correspondance) relationship. See FIG. 2 for a drawing of the human visual system. But from this point, mapping is lost by the vast interconnectivity between the input cortex and the visual association cortex. It is postulated, that at this point, what is commonly known as the gestalt process probably occurs. (12:260) The interconnections between the visual input cortex and the visual association cortex provide a mechanism through which an image is associated with a similarly stored or learned pattern.

2.2 Gestalt

The gestalt theory was originally developed in Germany to articulate what is known today as the interactions between the visual input cortex and the visual association cortex. It attempts to explain how one recognizes the world around him based on associations with what he has previously seen. "In German the word gestalt may be used as a synonym for form, or perhaps shape. In gestalt theorie the word gestalt means any segregated whole." (9:192) The theory, first proposed in Germany about a century ago, describes how images are recognized by categorizing or segmenting them into individual parts and then reinforcing or inhibiting their association with memorized patterns. Recognition is not necessarily based on a single simple association but on a countless number of associations. (8:1128) All of this is theorized to occur in the vast interconnections within the brain. Other than image content, many other factors affect what the brain perceives, note FIG. 3.

Figure 3:
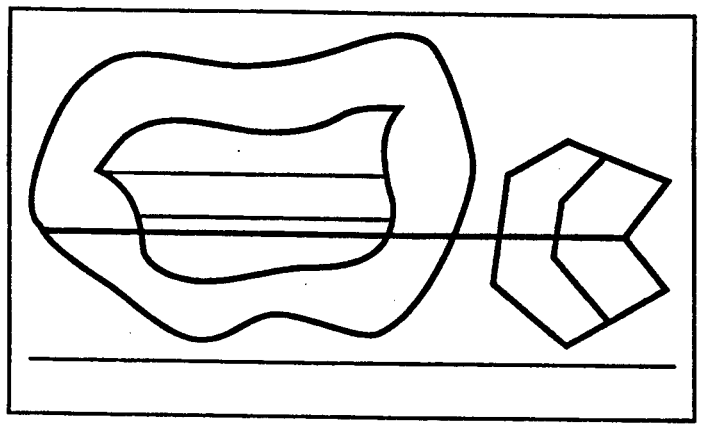
FIG. 3 is a Gesalt diagram showing a "hidden four"
Figure 4:
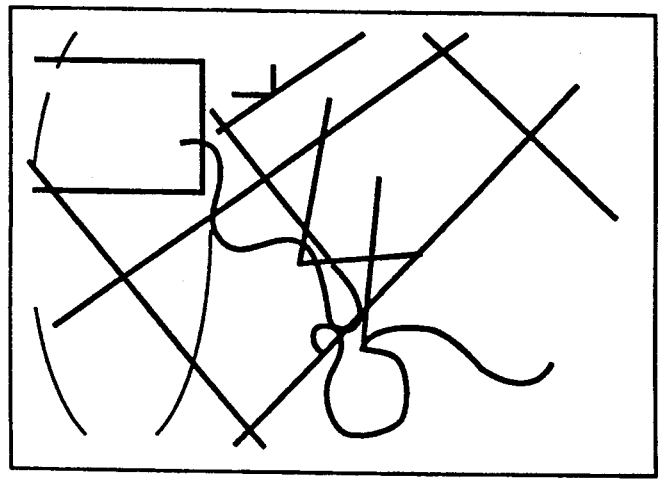
FIG. 4 is a Gesalt diagram showing an "obvious four"

"The number 4 is certainly well known, but without prior instructions or warning, only a few people would include it in their description of FIG. 3. Now look at FIG. 4 and the 4 would probably be included in most persons' description of the figure. Why, then, is it seen now? Because the relation between the added lines and the geometrical parts of the 4 are not such that these parts are absorbed in the formation of the wholes." (9:209) The brain is continually segmenting an image into parts that then are considered as wholes. Therefore, the way in which an image is perceived is based on how the image is segmented.

This continual segmenting into wholes occurs everytime one looks at an image. Depending on what prior instructions one is given, (i.e. reading, looking for one's keys, etc.) he associates the segments with memorized patterns (there's a 4, here's the keys, etc.). So when reading, it is theorized the brain preprocesses what it sees with a predefined list of acceptable symbols or segments. Therefore, for reading, gestalt is how one associates text to what is stored in the memory based on similar shapes. To understand how one might model this association, one should look closely at the reading process itself. (9:3)

2.3 Reading Process

The first question should be: What is reading? Some might believe reading is simply seeing what is printed on a page, but reading also includes comprehension, creative thought, and auditory sounds. Words are merely symbols which serve to recall a particular meaning or idea. There is no physical relationship between the word lion and the actual animal, yet the image of the word is used as a symbol to represent a physical object. What about the word very? It is not a tangible object yet it is a symbol used to convey a meaning and develop comprehension. How the brain associates a symbol to previously known symbols is considered recognition for this discussion. How the brain relates these symbols after they are recognized is considered comprehension. It is important to note that the two are not mutually exclusive in the brain. They both provide recursive information to one another during reading.

Figure 5:
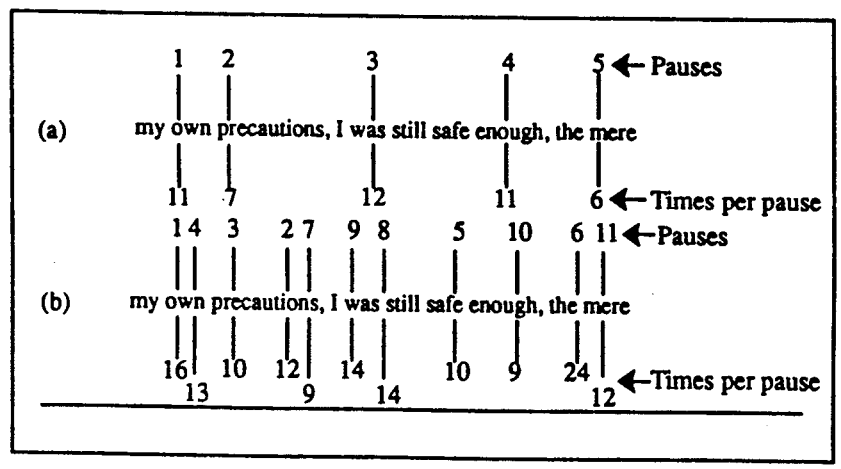
FIG. 5 is a diagram showing location of fixation pauses.

Tinker theorizes that the simple mechanics of reading begins with breaking down sentences into specific windows. The eye moves along a string of words making frequent stops or fixation pauses. The actual reading or recognition process occurs at the pauses. These pauses on the average are about 250 ms. (16:12) FIG. 5 is an example of this. FIG. 5a is the eye movements of a good adult reader and FIG. 5b is the eye movements of a poor adult reader. Between pauses no recognition occurs. The eyes are continually fixating, sweeping, fixating, sweeping.

During the fixation phase a person perceives a word or phrase. Research shows that the perceptual span for adults is 3 to 4 unrelated letters during this phase. When letters are grouped in the form of nonsense syllables (combination of letters that can be pronounced but which do not make a meaningful word, as bak or snerk), the perceptual span increases to about 7 letters. As the meaning becomes clearer, the perceptual span increases. (16:14)

In 1898, R. Doge and B. Erdmann proposed and supported the view that proficient readers perceive printed material in either units, whole words, or entire phrases. Their results showed test subjects "recognized words that were printed in type too small for individual letters to be identified; too far in peripheral for recognition of their component letters; and exposed beyond the distance at which individual letters could be recognized." (16:15) As a result, "the arrangement, the total form, is the main thing, whether in the recognition of letters, numbers, words, of objects of whatever sort". (16:15)

In a later test by Koffka, "a word of 25 letters tachistoscopically exposed letters (i.e., flashed briefly on a screen) can be seen clearly and distinctly in all its parts, . . . whereas with 25 unconnected letters at best a small fraction will be perceived." (7:592) Tinker therefore concludes, "the fact that during a reading fixation pause a person may at times read in a sentence words containing 20 to 30 letters with a typical average of 8 to 10 letters, but can perceive only 3 to 4 unrelated letters, suggests that in reading, perception must take place by some means other than the recognition of individual letter after letter." (16:14)

When unfamiliar words appear, the brain can only perceive them by a process of analysis. This process involves limiting the window, or number of letters to be perceived, by breaking the word into small components. The amount of analysis depends on the degree of unfamiliarity. Words previously recognized by the brain may have a wide range of familiarity. Familiarity increases with each reoccurrence of the word. Therefore, the mechanics of reading is to portion the input into segmented wholes for further processing.

Next one must look at the components of reading. Recall the visual system is not the only input to reading. The visual system, the auditory system, and the intellect (comprehension and creative thought) are all components to reading. Each facet of reading provides an input of sorts, which allows a person to recognize the segmented wholes.

Text consists basically of organized scribblings. These scribblings have distinct rules according to their shapes. They include vertical, horizontal, diagonal, and curved lines. (16) All letters are distinguished by their parts. The letter c is a round or curved line opened on the right; the letter I is a single vertical line, etc. Gibson and, Levin claim the cognitive process has established a distinct rule based system that makes up these scribblings to create a standard between symbols. (4)

This rule system includes character segmentation. The location of space bounds our symbols. Improper spacing creates confusion and ambiguity concerning which symbols are to be grouped into words. Compare the two phrases:

the red earrings you race
there dear rings your ace

Both have the same set of characters in them yet with different segmentations. Proper segmentation between words as well as proper segmentation within words is important. Compare lousy with busy. It is very important to distinguish between the two when telling one's boss how work is proceeding.

Not only is there information contained between symbols, but certain parts of symbols seem to carry more importance than others. Take for example FIG. 6. There is a unique difference in a reader's ability to read the top from the bottom half of words. This difference is incorporated in the brains ability to segment and provide the most meaningful data to the area where association occurs.

Huey noted that "a preponderance of distinctive features exists in the tops of the letters." (4:170) In addition to this, the brain has learned an orthographic rule system. These rules "govern what sequence of letters and groups of letters may be put together to form words. Everyone knows that the letter q is followed by u and that the cluster of the two letters is pronounced /kw/. The cluster km is not permitted, unless it crosses a morpheme boundary: milkmaid." (4:173) The orthographic rule system is a preprocessor when reading.

So the human visual system has a learned set of rules to segment text when reading. Proficient readers make fewer pauses and errors when reading and can associate longer words in a single pause than poor readers. (8) In reading, the ability of properly segmenting words is a learned response. The brain naturally segments any image it sees, but proper letter segmentation based on a learned rule system is vital to good reading skills.

For the purpose of discussion, the second input source is called the auditory track. "Correctly pronouncing a word ordinarily recalls its meaning if it is in the reader's speaking vocabulary. Coordination of the visual and auditory aspects of phonics is essential." (16:34) While reading silently, most readers internally verbalize what they see. Therefore, phonics plays an important part in recognition and can be considered as a secondary input. Table 7 displays an analysis of word features. The table analyzes "the proportional use made of eight different word features in the preferred word-recognition strategies of children and adults and was conducted by Selvin Chin-Chance of the University of Hawaii. The eight objective measures of word similarity, identified at the bottom included semantic features, phonetic features and meaning along with visual features for a set of 24 carefully chosen words. In addition the eight objective measures of word similarity were correlated with each subject's own subjective estimated of word similarity. The results of this experiment showed that whereas phonetic cues are popular among children, particularly third-graders, they are not used extensively by adults, perhaps because sounding out the word is too slow a process for an efficient recognition strategy." (3:129)

The bottom line is this: auditory input plays a varying role in the brain's ability to recognize a word. Dependence upon vocalization increases in childhood and drops off by adulthood. This is probably because the brain visually recognizes a word as opposed to vocally sounding it out. It is important to note that most adults retain this source of input to some extent.

The last group on the graph points to the third and final input source: syntactic rule structure (the meaning of the word). This deals with the grammar, which is defined by Lindemann as "a capacity for language, a native ability to create and comprehend English utterances." (11:107) This rule structure concerns the comprehension and creative thought aspect alluded to earlier in this discussion. Sentence structure and meaning have a tremendous influence on recognition speed. A sample group of forth graders took a simple anagram (discovering a word in a set of jumbled letters) test to prove this point.

The test involved solving anagrams that were arranged into six categories (FIG. 8). The categories were fruit, drinks, animals, utensils, colors, and furniture. The two conditions, CS and NS, were arranged so that they did or did not, respectively, yield an ordered set when completed. The results show that if subjects expected to fit the anagram into a specific group, it greatly increased the speed with which the anagram was solved. However, solving them at random showed a decrease in problem solving speed. Therefore, given speed of identification as a measure of recognition, apriori knowledge of the meaning, category, etc., the brain's ability to recognize a particular image will increase significantly. Hence, one can note the relationship between visual recognition and intellect.

2.4 Fourier Transform

Some aspects of what the cerebral cortex does through a vast array of interconnections, can be modeled mathematically by the Fourier transform. Radoy (14) and later Tallman (15) have defined the 2DFT algorithm for use with a real input image array The algorithm is not dependent on powers of 2 as in the case of a fast Fourier transform. Kabrisky (6) and later Maher (12) have used this algorithm to show a degree of relationship between machine and human outputs. Maher's analysis "involved discriminating 10 animal forms by computer simulation and by a group of 46 individuals." A Pearson correlation coefficient of 0.961, between machine and human responses, was calculated. The results, therefore, supported the use of 2DFT coefficients as an image recognizer. (12:260)

Bush (1) applied this algorithm to the 26 letters of the alphabet. He used the image of the letters of the alphabet as his input. His desire was to develop a more legible set of characters. His thesis, like Maher's work, supported the algorithm of 2DFT's by using psychological testing to verify machine results. His work used five separate font types and opened the way for character identification based on 2DFT coefficients.

The problem with this identification scheme, however, is that segmentation of the text into individual characters is required; isolated characters do not usually occur in printed text. It suffices to say, years of research spent on letter segmentation has produced little, if any, success. With the appearance of phototype setting and laser printers, the segmentation problem has increased. Recall that gestalt assumes segregated wholes within an image. The algorithm works to model the vast interconnections between the primary input cortex and the visual association cortex, but it begs the questions concerning segmentation.

In my earlier thesis (13), I postulated that text segmentation can be achieved by using the whole word. The spacing between words is easy to locate, but the spacing within words is unobtainable. It is evident that the brain handles words as wholes; what hinders the algorithm from handling it the same way? This was the approach taken in my thesis work and the results were promising.

The tests included the top 200 most popular words in the English language in capital form. The same font styles used in Bush's thesis were used in my earlier thesis. Spacing between letters within a word were fixed. Overall recognition of a particular word in one font style proved 94% successful in chosing the same word in a different font style than a different word in either the same or different font style. Word similarity was almost independent of font type.

Though a very limited test, the algorithm did prove the hypothesis: word recognition based on 2DFT's can be achieved by treating the image of a word as a single segmented whole. For use as a reading machine, proof that a full scale machine can be developed is required. The need for thousands of words, in many font types, with variable letter spacing, and lower case letters must be shown. These variables increase the search space or choices from this previous work by many orders of magnitude.

III. Methodology

3.1 Overview of Process

The approach to solving the problem concentrated on generating digital images of words, computing the 2DFT of each image, and then selecting nearest neighbors (minimum error calculation) based on the differences in coefficient values. This seems simple enough, but a few obstacles need a solution. Building the font base is the first step. To provide maximum flexibility, the particular font styles are digitized and then the images of words are built from the digitized font styles.

This allowed for spacing between characters to be varied and greatly decreased the disk storage space. Selecting how to compute the error or difference calculations (nearest neighbor) between coefficients is the second step. The key to separating similar words in different fonts is in the method used for distance calculation.

Following the basic methodology outlined above, specific variations are covered in Chapter 4. The variations are presented in Chapter 4 because their selection or deletion is based on interim results and logical conclusions or exclusions. Therefore, the beginning step is to build the digitized font styles.

3.2 Building Fonts

A professional printer (2) selected 25 font styles to provide depth and diversification between font styles. Popularity, then variation, are the priorities for font selection. The most popular font styles (Avant Garde, Zapf Chancery, Garamound, Megaron, and Schoolbook) are provided in a variety of styles. The styles include light, medium, bold, and italicized prints. The printer chose these fonts because they are widely used and popular.

The printer also chose Eurostile, Gill Kayo, Hobo, Janson, and Wedding Text for their variation in style. These font styles range from plain to ornate in style and provide variation from the more popular fonts. Also selected for variation is Brush and Helena Script, which are two script (cursive) fonts. They are included to test whether or not cursive text can also be identified using the same algorithm. The complete list of fonts used is listed in Table 1.

TABLE 1

| Font Styles |
| --- |
| Avant Garde |
| Avant Garde bold |
| Brush |
| Zapf Chancery light |
| Zapf Chancery light italicized |
| Zapf Chancery medium |
| Zapf Chancery medium italicized |
| Eurostile |
| Eurostile bold |
| Garamound bold |
| Garamound bold italicized |
| Garamound italicized |
| Gill Kayo |
| Helena Script |
| Hobo |
| Janson |
| Megaron bold |
| Megaron bold italicized |
| Megaron medium |
| Megaron medium italicized |
| Schoolbook |
| Schoolbook bold |
| Schoolbook bold italicized |
| Schoolbook italicized |
| Wedding Text |

An example of a complete font style is shown in FIG. 9 with the remaining 24 font styles presented in FIGS. 17-40.

Each font style in FIGS. 17-40 is digitized into a 480×510 pixel field. The digitized picture is searched to locate individual symbols and then store each symbol separately. The program catalogues each symbol by windowing, allowing no space around each symbol. Once the symbol is cataloged, a left and right margin offset is added. This offset represents a shift along the horizontal axis to be used at the time of printing. The reason for this offset is because typesetters do not print with fixed distances between symbols. They give narrower symbols, like i and l, more spacing as opposed to wider symbols, like m and s. Italicized styles use this offset distances to bring vertical lines closer together, as in fl and fy. The result is that each font style is digitized, and each symbol is individually stored with its own local offset values. An example of how an individual symbol is digitized and stored onto disk is the letter f from the font style Zapf Chancery medium italicized. It is shown in Table 2.

3.3 Building Coefficients

Appendix C shows a list of the 5000 most popular words in the English language. The list is not alphabetized, but it is in order of occurrence with the being the most popular. The list is taken from 500 articles within a field of 15 areas (press, religion, scientific writing, fiction, etc.). One million words were used to compute occurrences. (10) To make it possible to vary the overall spacing between symbols within a word, an additional offset value is added to each symbol's individual offset value. The spacing between characters varied from −7 to +9 pixels. Excluding left and right margin values, the average symbol width is 16 pixels. Thus, it is possible to vary spacing within a word from between −45% to +55%. An example of the spacing variance is shown in FIG. 10.

Once a word is built using a particular font style with a particular offset, the image array is Fourier transformed using Radoy's algorithm. (14) The method for performing the 2DFT are as follows. The image of a word is formed from an M×N matrix that has a single grey level value, 0 (white) and 1 (black), recall Table 2. The image is completely described by the real valued function, f(x,y), which is defined only at the coordinate points at which x and y are both integers. See Equation 1.

$$F(A, B) = \sum_j \sum_k f(x, y) \cdot [\cos(A \cdot x + B \cdot y) + i \cdot \sin(A \cdot x + B \cdot y)] \quad (1)$$

where,
$A = j \cdot 2 \cdot \pi \div M$
$B = k \cdot 2 \cdot \pi \div N$ $i = \sqrt{-1}$ $j = -5, -4, \ldots, 0, 1, \ldots, 5$ order of harmonics in $x$ direction

TABLE 2

| An Example of a Digitized Character |
| --- |
| a b c d e f |
| f 46 23 -12 4 3 |

| | |
| --- | --- |
| | 0000000000000000011111 |
| where: | 0000000000000000111111 |
| | 0000000000000001111110 |
| a = symbol identification | 0000000000000011100000 |
| | 0000000000000111000000 |
| b = height in pixels | 0000000000000111000000 |
| | 0000000000001110000000 |
| c = width in pixels | 0000000000001110000000 |
| | 0000000000001110000000 |
| d = distance (above or | 0000000000001111000000 |
| below) baseline | 0000000000001111000000 |
| | 0000000000001110000000 |
| e = left margin indent | 0000000000001110000000 |
| | 0000000000001110000000 |
| f = right margin indent | 0000000000001110000000 |
| | 0000000111111111111000 |

TABLE 2-continued

An Example of a Digitized Character ab c d ef
f46 23 -12 4 3

0 = white space (pixel)
1 = black space (pixel)

```
0000001111111111110000
0000011111111111100000
0000000000111100000000
0000000000111000000000
0000000000111000000000
0000000000111000000000
0000000000110000000000
0000000000110000000000
0000000000110000000000
0000000000110000000000
0000000000110000000000
0000000000110000000000
0000000000110000000000
0000000000110000000000
0000000001110000000000
0000000001110000000000
0000000001110000000000
0000000001110000000000
0000000001110000000000
0000000010000000000000
0000000110000000000000
0000000110000000000000
0000000110000000000000
0000001100000000000000
0000011100000000000000
0000011100000000000000
0011111000000000000000
1111110000000000000000
1111100000000000000000
1111000000000000000000
```

$k = -5, -4, \ldots, 0, 1, \ldots, 5$ order of harmonics in direction
$M$ = height of image in pixels
$N$ = length of image in pixels
$x,y$ = location of real valued input
$f(x,y)$ = intensity of image at location x,y The two equations that define the real, Re[F(A,B)], and imaginary, Im[F(A,B)], Fourier components are, $$Re[F(A,B)] = \Sigma\Sigma f(x,y) \cdot \cos(A \cdot x + B \cdot y) \quad (2)$$

$$Im[F(A,B)] = \Sigma\Sigma f(x,y) \cdot \sin(A \cdot x + B \cdot y) \quad (3)$$

Since the cosine is an even function and the sine is an odd function, the following relationship exists in equations 4, 5, 6, and 7. (14)

$$Re[F(A,B)] = Re[F(-A,-B)] \quad (4)$$

$$Re[F(-A,B)] = Re[F(A,-B)] \quad (5)$$

$$Im[F(A,B)] = -Im[F(-A,-B)] \quad (6)$$

$$Im[F(-A,B)] = -Im[F(A,-B)] \quad (7)$$

Therefore, due to the symmetric properties of the Fourier transform, only half the cosine and sine terms are unique and need be calculated at any one time. For an example, a 5×5 harmonic space has 11 (−5 to +5) vertical harmonic terms times 11 (−5 to +5) horizontal harmonic terms producing 121 cosine and 121 sine terms. Since half the terms are duplicated due to symmetry, there exist 61 unique cosine and 60 unique sine coefficients (note the dc term for the sine function is always equal to zero). For the case of 2×4, two vertical and four horizontal harmonics, there are 5 (−2 to +2) vertical terms times 9 (−4 to +4) horizontal terms giving a total of 45 unique coefficients.

The coefficient values for each word displayed in each font style with one particular offset spacing are stored for the 5×5 case. Before they are stored though, they are energy normalized. The normalization process accounts for brightness variations and is equivalent to graphing each 2DFT onto the surface of an n-dimensional hypersphere with unit radius (r=1.0). Equation 8 is used to normalize the coefficients.

$$\overline{F}_{r,c} = \frac{F_{r,c}}{\left[\sum_{r=1}^{2n+1} \sum_{c=1}^{2n+1} F_{r,c}^2\right]^{\frac{1}{2}}} \quad (8)$$

where,
$\overline{F}_{r,c}$ = the normalized (r,c)'th element
r = rows
c = columns
n = number of harmonics Therefore, the program to compute the 2DFT coefficients, builds the words from the individually digitized font characters, calculates the 2DFT coefficient values, and stores the values on disk.

To vary from computing the 2DFT of an entire word, one strategy is to break the image of a word into three equal parts and then to compute the 2DFT of each part. The reason for doing this is discussed in the Chapter 4, but the approach is identical for the entire word process. The only difference is that the three subparts are used as inputs to the 2DFT distance calculations.

3.4 Distances

Once the coefficients are computed, the difference calculations are made. This is known as 'finding the nearest neighbor' or minimizing the error. Each image is represented by a set of coefficients, which in turn represents a single location on the n-dimensional hypersphere. For this case of 121 coefficients, n equals 121. If a subset of coefficients is used then n would equate to the number of coefficients being used to define the image of a word. The nearest neighbor is defined as the pair, input word to output (template) word, with the minimum error. This test used five equations of distance or error calculations. They were selected from previous works but are not the only choices available. They are listed in Table 3.

TABLE 3

| name | Distance Equations equation |
|---|---|
| H2 | $d_{x,y} = \left[\sum_{i=1}^{n} (x_i - y_i)^{\frac{1}{2}}\right]^{\frac{1}{2}}$ |
| H1 | $d_{x,y} = \left[\sum_{i=1}^{n} (x_i - y_i)^{\frac{1}{2}}\right]^{2}$ |
| M1 | $d_{x,y} = \sum_{i=1}^{n} (x_i - y_i)$ |
| M2 | $d_{x,y} = \left[\sum_{i=1}^{n} (x_i - y_i)^2\right]^{\frac{1}{2}}$ |
| M3 | $d_{x,y} = \left[\sum_{i=1}^{n} (x_i - y_i)^3\right]^{\frac{1}{2}}$ |

3.5 Font Groups

In my thesis (13), 1 compared each word with all other words in all font styles, using only the M2 (euclidean) distance measurement. The top 1000 words in 25 fonts gives a total of 25,000 (1000×25) words images. Therefore, each word would be compared to 24,999 words (any word compared to itself would yield an error of 0.0). If 10,000 words are used, then the search space is 249,999 words. Computationally, this is too time consuming. A way of limiting the search space and increasing successful matches is needed. Combining font styles into font groups is one approach. Since coefficients are orthogonal, each Fourier coefficient of a particular word can be averaged with the coefficients from the same word spelled in different font styles. The intent is to create a generic font style in Fourier space made up of different and unique font styles. These generic font styles are called font groups and can be thought of as an average between font styles.

Three programs were developed to create font groups. The first one uses all 25 font styles and averages each coefficient for each of the top 1000 words. By creating a single font group from the 25 font styles, there are only 1000 target (template) words instead of 24,999. The second program divides the 25 font styles into three separate font groups. The division into three font groups is listed in Table 4. The result is then 3000 (3 font group×1000 words) target words.

And finally, the third program divided font groups up by placing similar looking font styles into six groups. To obtain six groups, the regular font group from 3 font three font case is subdivided into three subgroups and one more font group, special, is added. The letters a and g are the criterion for subdividing the regular font group into subgroups. They were chosen because their visual shapes, (a,a) and (g,g), seemed to have the greatest variation between font styles. The division into font groups is listed in Table 5. It will yield 6000 (6 font groups×1000 words) target words.

3.6 Special Cases

This research develops three additional distance calculations. The first is the 3 part coefficient values. The objective is to compute the five nearest neighbors for any word and then from this partial nearest neighbors list, recompute a final choice based on the 2DFT images of the first, middle, and last parts of the word. By concentrating on this partial list, a second pass is made using an alternate distance calculation, to pick the correct choice. It uses four sets of calculated coefficient values; one from the entire image of a word and one from each of the first, middle, and last parts of a word. It is done only for the 3 font group case.

The second special case involves an approach to fine tune the font groups. The idea is that through a special transform developed for each font style, the mean errors (differences) can be reduced. This algorithm pushes a font style in Fourier space toward a particular font group. When reading an unfamiliar font style, the brain reads at a slower rate. I hypothesize that the brain is comparing the new font style to what it already knows. Given enough time, it composes a transform for that particular font style. Then, when enough training is incurred, the new font style is assimilated into the brain's working data base of font styles.

TABLE 4

Font Styles for 3 Font Group Case

| font group name | font style |
|---|---|
| italics | Zapf Chancery light |
| | Zapf Chancery light italicized |
| | Zapf Chancery medium |
| | Zapf Chancery medium italicized |
| | Garamound bold italicized |
| | Garamound italicized |
| regular | Avant Garde |
| | Avant Garde bold |
| | Eurostile |
| | Eurostile bold |
| | Garamound bold |
| | Hobo |
| | Janson |
| | Megaron bold |
| | Megaron bold italicized |
| | Megaron medium |
| | Megaron medium italicized |
| | Schoolbook |
| | Schoolbook bold |
| | Schoolbook bold italicized |
| | Schoolbook italicized |
| script | Brush |
| | Helena Script |
| † | Gill Kayo |
| | Wedding Text |

† = not used in any font group.

TABLE 5

Font Styles for 6 Font Group Case

| font group name | font style |
|---|---|
| italics | Zapf Chancery light |
| | Zapf Chancery light italicized |
| | Zapf Chancery medium |
| | Zapf Chancery medium italicized |
| | Garamound bold italicized |
| | Garamound italicized |
| regular a | Avant Garde |
| | Avant Garde bold |
| | Schoolbook bold italicized |
| | Schoolbook italicized |
| regular a g | Eurostile |
| | Eurostile bold |
| | Megaron bold |
| | Megaron bold italicized |
| | Megaron medium |
| | Megaron medium italicized |
| regular a g | Garamound bold |
| | Janson |
| | Schoolbook |
| | Schoolbook bold |
| script | Brush |
| | Helena Script |
| special | Gill Kayo |
| | Hobo |
| † | Wedding Text |

† = not used in any font group.

The transform develops by taking a subset of the input words (i.e., the first 200 of the top 1000 words) and averaging the individual coefficient errors between input word and nearest neighbor. These averaged coefficient errors are then subtracted from the font group(s). A final pass is made for all 1000 words and the nearest neighbors recalculated. Each font group selected in the first pass needs an error transform. The underlying idea is that apart from any particular symbol within a font style, each font group and font style as a whole has its own characteristic shape or form. The average of coefficient errors is a map of the difference or error in characteristic shape and by adding the negative (inverse) to the font group, the distance to the nearest neighbor is then reduced. Thus, reducing the distance should reinforce the correct choice. This program is presented in Appendix B. A special note about this program is that if a correlation does not exist between the characteristic shape of a font style and a font group, then the values of the coefficient errors will be random and their averaging win generate a zero response.

The third special case uses redundancy to eliminate incorrect choices. In the field of the 5×5 coefficients, it is possible to select any or all of the coefficients as a search space. The advantage to this is that a selection based on a different set of coefficient values yields different incorrect choices. If the incorrect choices occur only 1 to 2 percent of the time, then with 3 separate sets of coefficients it will be possible to form a weighting scheme. If choice occurs in 2 out of the 3 sets then the most popular choice is taken.

Overlapping of sets is useful only if the incorrect choices are different. The appropriate coefficients to use in a given set are determined empirically (trial and error). Each set is energy normalized based on the number of coefficients within the set. Therefore, the actual value of the distances between sets to the nearest neighbor might not be a useful measure. Only the target word (nearest neighbor) is of primary concern.

IV. Results

The results are divided into three sections. The first section is the extension of my Master's thesis research into a much larger search space, with lower case letters. The second section presents the font groups, which are the heart of a true reading machine and comprises the bulk of the chapter. The third section covers the special distance calculations.

4.1 Originals

Comparing each font style to itself and all other fonts is the first case presented. The M1 (taxi) distance calculation (see Table 3) is used to compute the nearest neighbor (minimum distance to adjacent image in Fourier n space) for each of 25,000 input words (1000 words in 25 font styles). Given that there are 25,000 inputs, then there are 24,999 possible nearest neighbors for each input image. With the internal letter spacing (offset value) within a word set to +3 pixels (letters have an average width of 16 pixels), the percent of correct choices using a 3×3 harmonic search space is listed in Table 6. This table shows how effective the algorithm is at identifying a correct match (input word and nearest neighbor are the same word) for the most popular 1000 words in each of the separate 25 font styles.

Each font style is listed with the percent correct, its mean distance to nearest neighbor (using M1 distance calculation), and the standard deviation of nearest neighbors. The algorithm in my Masters thesis produced 94% correct choices for 200 capitalized words in 6, various font styles. (13) It is evident from Table 6 that the script fonts (Brush and Helena Script) do not work and the fonts selected for their variation in style (Eurostile, Gill Kayo, Hobo, Janson, and Wedding Text) are marginal at best. If we are to jump to 10,000 words at this point, the percent correct would be too low to build a reading machine based on this algorithm. Also, the computational time for this 1000 word case required 24 cpu hours on a sun4 (12 mips) processor. It would be $10^2$ as long, 100 cpu days, for 10,000 words. Even though this algorithm can identify words without letter segmentation, it still is not realistic to use this approach because the percent correct is too low and the computation time too long.

TABLE 6

| Font Styles | Distances for Originals With a +3 Spacing | | |
|---|---|---|---|
| | % correct | mean dist between nearest neighbors | standard deviation between nearest neighbors |
| Avant Garde | 84.2 | 0.77 | 0.22 |
| Avant Garde bold | 87.3 | 0.56 | 0.18 |
| Brush | 16.5 | 1.03 | 0.29 |
| Zapf Chancery lght | 89.6 | 0.83 | 0.21 |
| Zapf Chancery lght ital | 93.1 | 0.67 | 0.23 |
| Zapf Chancery med | 88.7 | 0.75 | 0.18 |
| Zapf Chancery med ital | 94.2 | 0.65 | 0.21 |
| Eurostile | 84.5 | 0.88 | 0.24 |
| Eurostile bold | 85.0 | 0.65 | 0.15 |
| Garamound bold | 88.2 | 0.75 | 0.17 |
| Garamound bold ital | 95.5 | 0.61 | 0.17 |
| Garamound ital | 97.6 | 0.62 | 0.17 |
| Gill Kayo | 42.0 | 0.73 | 0.18 |
| Helena Script | 7.8 | 1.00 | 0.33 |
| Hobo | 57.6 | 0.72 | 0.21 |
| Janson | 88.0 | 0.77 | 0.17 |
| Megaron bold | 97.0 | 0.51 | 0.13 |
| Megaron bold ital | 91.4 | 0.57 | 0.18 |
| Megaron med | 96.6 | 0.63 | 0.15 |
| Megaron med ital | 94.0 | 0.68 | 0.20 |
| Schoolbook | 95.7 | 0.64 | 0.13 |
| Schoolbook bold | 96.1 | 0.64 | 0.13 |
| Schoolbook bold ital | 98.1 | 0.53 | 0.13 |
| Schoolbook ital | 98.4 | 0.53 | 0.13 |
| Wedding Text | 49.2 | 0.84 | 0.27 |
| overall % correct | 80.6 | 0.70 | 0.19 |

Selecting a different sparing does little to change performance. Table 7 presents the results of the case where letter spacing within words is increased from +3 to +7 pixels. The overall percent correct increased to only 81.9%, and percentages for specific fonts did not vary greatly. The overall mean distance between an input word and its nearest neighbor decreased only by about 0.02 and the overall standard deviation decreased by only 0.01. This is significant because the mean and standard deviation are indicators of performance. As the mean decreases (assuming a constant number of coefficient values) for any font style, the percent correct increases. Some correlation exists between the mean and standard deviation of nearest neighbors and the percentage of correct choices for font styles. A font style with higher mean and standard deviation values than a second font indicates the first font will have a higher error rate (i.e., lower percent correct). This can also be seen in the results presented in Table 7.

Creating font groups is the answer to increasing the percent correct while decreasing the computational time (search space). In the next subsection, the results of creating font groups and the variables affecting their use are presented.

4.2 Font Groups

There are many variables and questions to be answered concerning font groups. When dealing with a particular variable, all other variables will be fixed. A standard spacing of +3 pixels is used unless noted, not because it is superior to all spacings, but because it is a visually comfortable spacing and is a nominal value between the extremes of −7 and +9 pixels. The variables to be covered are:

1. how are font groups best divided and how many should there be
2. which is the best distance rule to use
3. what is the affect of spacing between letters in a word
4. what is the optimum number of Fourier harmonics to use
5. is word length an important discriminator
6. how many words are possible
7. how does script font compare to printed font
8. what happens when a new font style is encountered for the first time
9. what happens when a new spacing is encountered for the first time
10. how does noise affect the percent correct
11. what about upper case letters
12. what about using numbers that the algorithm had a consistent problem in identifying the correct nearest neighbor for the Avant Garde font styles. It was hoped that alternate divisions to the 3 and 6 font groups would solve the problem. The alternate groups developed from this experience are the 4 and 7 font groups. Their break down into groups are listed in Tables 8 and 9, respectively.

A combined table of the results of the 1, 3, 4, 6, and 7 font groups, using the 3×3 harmonic space, a +3 letter spacing, the M1 distance calculation, and the top 1000 words is presented in Table 10.

The two most significant results are the overall percent correct of the 1 font group case versus the original algorithm, section 4.1, and the decrease in percent correct from the 6 font group to the 7 font group case. First, the 1 font group has an output space of 1000 words. The original case had an output space of 24,999 words. By combining the Fourier coefficients of the 25 different images of a word, to form a single font group, the overall percent correct from the original case to this combined case improved 6%. Consider how mixed the font styles are: printed, italicized, ornate, plain, and even script. AU of these are different styles and yet combined they produce a better feature set than the individual font styles themselves, section 4.1. It begs the question: is there one generic font style that can recognize all font styles?

The answer to this seems to be no. The subsequent improvement in the 3, 4, etc. font group cases shows that one single font group is not optimum. The 1 font group case is a major breakthrough in reducing the search space of an algorithm's library of target words but is not the most accurate solution. From Table 10, a steady improvement is seen as the number of font groups increases. This increase occurs up until the 6 font group case and then decreases, which leads to the second significant finding.

TABLE 7

| | Distances for Originals +7 Spacing | | |
|---|---|---|---|
| Font Styles | % correct | mean dist between nearest neighbors | standard deviation between nearest neighbors |
| Avant Garde | 84.9 | 0.75 | 0.22 |
| Avant Garde bold | 90.5 | 0.55 | 0.17 |
| Brush | 22.7 | 1.03 | 0.28 |
| Zapf Chancery lght | 89.8 | 0.80 | 0.20 |
| Zapf Chancery lght ital | 93.3 | 0.64 | 0.22 |
| Zapf Chancery med | 90.2 | 0.71 | 0.17 |
| Zapf Chancery med ital | 94.5 | 0.63 | 0.20 |
| Eurostile | 85.9 | 0.86 | 0.23 |
| Eurostile bold | 86.2 | 0.64 | 0.15 |
| Garamound bold | 88.8 | 0.72 | 0.16 |
| Garamound bold ital | 96.1 | 0.59 | 0.17 |
| Garamound ital | 97.1 | 0.59 | 0.16 |
| Gill Kayo | 47.4 | 0.75 | 0.18 |
| Helena Script | 9.5 | 1.01 | 0.33 |
| Hobo | 57.7 | 0.71 | 0.21 |
| Janson | 89.5 | 0.75 | 0.17 |
| Megaron bold | 97.2 | 0.49 | 0.12 |
| Megaron bold ital | 92.3 | 0.54 | 0.17 |
| Megaron med | 96.1 | 0.61 | 0.15 |
| Megaron med ital | 95.0 | 0.65 | 0.19 |
| Schoolbook | 95.2 | 0.63 | 0.13 |
| Schoolbook bold | 96.7 | 0.63 | 0.13 |
| Schoolbook bold ital | 97.9 | 0.52 | 0.13 |
| Schoolbook ital | 98.5 | 0.52 | 0.13 |
| Wedding Text | 54.6 | 0.82 | 0.27 |
| overall % correct | 81.9 | 0.69 | 0.18 |

4.2.1 Dividing into Font Groups. In addition to the three font groups discussed in the methodology, two other groups are added. Because experience showed

TABLE 8

| font group name | font style |
|---|---|
| italics | Zapf Chancery light |
|  | Zapf Chancery light italicized |
|  | Zapf Chancery medium |
|  | Zapf Chancery medium italicized |
|  | Garamound bold italicized |
|  | Garamound italicized |
| regular a | Avant Garde |
|  | Avant Garde bold |
|  | Schoolbook bold italicized |
|  | Schoolbook italicized |
| regular a | Eurostile |
|  | Eurostile bold |
|  | Garamound bold |
|  | Hobo |
|  | Janson |
|  | Megaron bold |
|  | Megaron bold italicized |
|  | Megaron medium |
|  | Megaron medium italicized |
|  | Schoolbook |
|  | Schoolbook bold |
| script | Brush |
|  | Helena Script |
| † | Gill Kayo |
|  | Wedding Text |

† = not used in any font group.

TABLE 9

| font group name | font style |
|---|---|
| | 7 Font Group Case |
| italics | Zapf Chancery light |
|  | Zapf Chancery light italicized |
|  | Zapf Chancery medium |
|  | Zapf Chancery medium italicized |
|  | Garamound bold italicized |
|  | Garamound italicized |
| regular a | Schoolbook bold italicized |
|  | Schoolbook italicized |
| regular a g | Eurostile |
|  | Eurostile bold |
|  | Megaron bold |
|  | Megaron bold italicized |
|  | Megaron medium |
|  | Megaron medium italicized |
| regular a g | Garamound bold |
|  | Janson |
|  | Schoolbook |
|  | Schoolbook bold |
| script | Brush |
|  | Helena Script |
| special | Gill Kayo |
|  | Hobo |
| avant | Avant Garde |
|  | Avant Garde bold |
| † | Wedding Text |

† = not used in any font group.

TABLE 10

Comparison of Accuracy as a Function of the Number of Font Groups

| Font Style | Number of Font Groups | | | | |
|---|---|---|---|---|---|
|  | 1 | 3 | 4 | 6 | 7 |
| Avant Garde | 78.0 | 94.0 | 95.8 | 96.3 | 92.4 |
| Avant Garde bold | 91.9 | 97.6 | 98.4 | 98.1 | 93.2 |
| Brush | 43.4 | 97.3 | 97.3 | 97.3 | 97.3 |
| Zapf Chancery lght | 93.4 | 99.6 | 99.6 | 99.6 | 99.6 |
| Zapf Chancery lght ital | 90.9 | 99.8 | 99.8 | 99.8 | 99.8 |
| Zapf Chancery med | 94.8 | 99.9 | 99.9 | 99.9 | 99.9 |
| Zapf Chancery med ital | 92.0 | 99.9 | 99.9 | 99.9 | 99.9 |
| Eurostile | 90.8 | 98.3 | 98.7 | 99.6 | 99.6 |
| Eurostile bold | 97.7 | 99.9 | 100.0 | 100.0 | 100.0 |
| Garamound bold | 92.4 | 93.4 | 95.1 | 99.9 | 99.9 |
| Garamound bold ital | 94.2 | 99.3 | 99.4 | 99.4 | 99.4 |
| Garamound ital | 94.9 | 99.6 | 99.5 | 99.6 | 99.7 |

TABLE 10-continued

Comparison of Accuracy as a Function of the Number of Font Groups

| Font Style | Number of Font Groups | | | | |
|---|---|---|---|---|---|
|  | 1 | 3 | 4 | 6 | 7 |
| Gill Kayo | 87.2 | 89.1 | 87.7 | 99.8 | 99.8 |
| Helena Script | 32.0 | 97.5 | 97.5 | 97.5 | 97.5 |
| Hobo | 62.1 | 65.3 | 65.4 | 93.3 | 93.5 |
| Janson | 92.4 | 96.9 | 97.6 | 100.0 | 100.0 |
| Megaron bold | 97.5 | 100.0 | 99.8 | 100.0 | 100.0 |
| Megaron bold ital | 96.6 | 99.4 | 99.5 | 99.9 | 99.7 |
| Megaron med | 89.5 | 98.7 | 99.1 | 100.0 | 100.0 |
| Megaron med ital | 93.5 | 99.4 | 99.1 | 99.7 | 99.7 |
| Schoolbook | 98.4 | 99.4 | 99.5 | 100.0 | 100.0 |
| Schoolbook bold | 98.8 | 99.5 | 99.6 | 100.0 | 100.0 |
| Schoolbook bold ital | 97.7 | 94.9 | 99.7 | 99.3 | 100.0 |
| Schoolbook ital | 98.7 | 96.9 | 99.7 | 99.4 | 100.0 |
| Wedding Text | 71.5 | 71.5 | 72.4 | 76.5 | 76.2 |
| overall % correct | 86.8 | 95.5 | 96.0 | 98.2 | 97.2 |
| % correct excluding fonts not used in font groups | n/a | 96.8 | 97.4 | 99.1 | 98.8 |

The decrease in overall percent correct between the 6 and 7 font group cases implies that, what makes a good font group is a good blend of similar font styles. This does not necessarily mean having a few, or a lot, of font styles within a font group. As font styles are grouped into similar groups, the mean distance between nearest neighbors gradually decreases until finally, in some cases, it rises. Groups possessing this decreasing distance are a good average between font styles. When the mean rises, font groups are becoming either too specialized (style dependent) or a poor mix of font styles. The best algorithm is not necessarily a function of how many font styles make up a font group but of the combined mix of font styles. Therefore, there is a tradeoff between having a generic font group that is a blend of font styles and the idea of becoming too font dependent or poorly mixing the font styles.

The ideal mix is still unknown. It seemed that the low performance of the Avant Garde styles could be solved by using 7 instead of 6 font groups, but obviously that is not true. When the Avant Garde, Avant Garde bold, Schoolbook bold, and Schoolbook bold italicized are put together into one font group, there is a 50% decrease of incorrect nearest neighbors than when the same four fonts are divided into two font groups with Avant Garde and Avant Garde bold in one group and Schoolbook bold and Schoolbook bold italicized in another. A well proportioned average makes a good font group. Dissimilar font styles will yield a font group which is not representative of the individual styles. In the 6 font group case the letters a and g are used as the discriminator between groups. The letter a appears two ways, in the form 'a' and 'a'. The letter g appears two ways, in the form 'g' and 'g'. But there is much more to a font's shape or style than just these two letters. That is why the decrease in percent correct from 6 to 7 font groups occurs when separating the font group into two font groups was thought to solve the low performance of the Avant Garde font styles. And since the algorithm using the 6 font group case is the best performer, it is used in determining the best measure of distance.

4.2.2 Distance Calculations. In the methodology, five distance calculations were discussed. H1, H2, and M3 were developed after M1 and M2 had been thoroughly tested. The M1 distance calculation is frequently termed 'taxi distance'. Envision the map of a large city where all roads run east-west and north-south. To travel from one point to another, the total distance traveled in the east-west direction is added to the total distance traveled in the north-south direction. Each trip from point A to point B is a simple problem of addition and subtraction.

For the case with M2, envision the same city, but a helicopter is used instead of a taxi. The distance is a straight line between points, but computationally addition, subtraction, multiplication, and division are all required. Table 11 shows the results for H1, H2, M1, M2, and M3, using 6 font groups with +3 spacing, a 3×3 harmonic space, and the top 1000 words.

H1, H2, and M3 were developed to test what appeared to be an asymptotic slope developing between the M1 and M2 cases. One premise was that sensitivity to error could be used to increase the percent correct rate. Instead, a maxima in performance occurred at M1. Though H1 and H2 out performs M2 and M3, it still does not perform better than M1. Though not presented, the following is also true for the 1 and 3 font group cases where the M1 distance calculation was the best measure of percent correct with respect to error values. The computationally quickest and simplest algorithm proves to be the best performer in this application and so it is used throughout the remaining research.

A note here is necessary concerning the Wedding Text font. It is usually excluded from the overall percent correct values because of its extreme variation in style and nonuse in font groups, but it is discussed in detail in subsection 4.2.7.

4.2.3 Spacing. Spacing is a very important issue when it comes to real world text. The amount of spacing between letters can vary from having overlapping characters to blank spaces between characters. If an algorithm could only distinguish words where the spacing is fixed, say at +3 pixels in width, then it is essentially useless in the real world. Both the 1 and 6 font group cases are explored for sensitivity to spacing. The harmonic search space is 3×3 and the top 1000 words used. Table 12 is the 1 font group case and Table 13 is the 6 font group case.

TABLE 11

Comparison of Distance Calculations

| Font Style | H2 | H1 | M1 | M2 | M3 |
|---|---|---|---|---|---|
| Avant Garde | 95.5 | 95.4 | 96.3 | 96.0 | 95.0 |
| Avant Garde bold | 97.9 | 97.9 | 98.1 | 98.9 | 98.7 |
| Brush | 97.2 | 97.2 | 97.3 | 59.1 | 51.0 |
| Zapf Chancery lght | 99.4 | 99.1 | 99.6 | 99.3 | 98.3 |
| Zapf Chancery lght ital | 99.7 | 99.6 | 99.8 | 99.6 | 98.9 |
| Zapf Chancery med | 99.9 | 99.9 | 99.9 | 99.6 | 99.1 |
| Zapf Chancery med ital | 99.9 | 99.9 | 99.9 | 99.6 | 98.9 |
| Eurostile | 99.5 | 99.3 | 99.6 | 99.3 | 98.4 |
| Eurostile bold | 99.7 | 99.7 | 100.0 | 99.6 | 98.8 |
| Garamound bold | 99.8 | 99.8 | 99.9 | 89.6 | 86.7 |
| Garamound bold ital | 99.4 | 99.4 | 99.4 | 96.7 | 94.6 |
| Garamound ital | 99.1 | 99.1 | 99.6 | 98.7 | 97.2 |
| Gill Kayo | 99.6 | 99.6 | 99.8 | 83.3 | 75.5 |
| Helena Script | 96.9 | 96.9 | 97.5 | 33.0 | 19.8 |
| Hobo | 94.5 | 94.5 | 93.3 | 65.2 | 64.1 |
| Janson | 100.0 | 100.0 | 100.0 | 86.3 | 78.9 |
| Megaron bold | 100.0 | 100.0 | 100.0 | 99.9 | 99.7 |
| Megaron bold ital | 99.8 | 99.8 | 99.9 | 99.9 | 99.5 |
| Megaron med | 100.0 | 100.0 | 100.0 | 100.0 | 99.7 |
| Megaron med ital | 99.6 | 99.6 | 99.7 | 99.7 | 99.5 |
| Schoolbook | 100.0 | 100.0 | 100.0 | 92.1 | 85.9 |
| Schoolbook bold | 100.0 | 100.0 | 100.0 | 94.3 | 92.4 |
| Schoolbook bold ital | 98.5 | 98.5 | 99.3 | 99.4 | 97.6 |
| Schoolbook ital | 98.8 | 98.7 | 99.4 | 99.7 | 97.7 |
| Wedding Text | 74.3 | 74.4 | 76.5 | 70.2 | 66.7 |
| overall % correct | 98.0 | 97.9 | 98.2 | 90.4 | 87.7 |
| % correct excluding | 98.9 | 98.9 | 99.1 | 91.2 | 88.6 |

TABLE 11-continued

Comparison of Distance Calculations

| Font Style | H2 | H1 | M1 | M2 | M3 |
|---|---|---|---|---|---|
| fonts not used | | | | | |

TABLE 12

Spacing Comparisons of Font Group 1

| | Spacing Between Letters | | | |
|---|---|---|---|---|
| Font Style | −5 | −3 | +3 | +7 |
| Avant Garde | 70.7 | 72.1 | 78.0 | 82.6 |
| Avant Garde bold | 86.8 | 88.0 | 91.9 | 93.3 |
| Brush | 23.0 | 25.0 | 43.4 | 50.3 |
| Zapf Chancery lght | 92.0 | 90.6 | 93.4 | 94.4 |
| Zapf Chancery lght ital | 82.7 | 84.2 | 90.9 | 93.6 |
| Zapf Chancery med | 93.8 | 93.2 | 94.8 | 95.1 |
| Zapf Chancery med ital | 83.0 | 84.4 | 92.0 | 94.0 |
| Eurostile | 85.0 | 89.2 | 90.8 | 92.0 |
| Eurostile bold | 94.7 | 95.6 | 97.7 | 97.9 |
| Garamound bold | 93.1 | 92.3 | 92.4 | 92.9 |
| Garamound bold ital | 88.2 | 89.2 | 94.2 | 95.3 |
| Garamound ital | 91.1 | 92.0 | 94.9 | 95.9 |
| Gill Kayo | 79.5 | 81.8 | 87.2 | 89.7 |
| Helena Script | 21.8 | 23.0 | 32.0 | 37.3 |
| Hobo | 59.8 | 60.9 | 62.1 | 61.7 |
| Janson | 88.2 | 89.9 | 92.4 | 93.7 |
| Megaron bold | 95.6 | 95.5 | 97.5 | 97.3 |
| Megaron bold ital | 95.7 | 95.7 | 96.6 | 97.0 |
| Megaron med | 88.9 | 89.5 | 89.5 | 90.5 |
| Megaron med ital | 91.4 | 92.7 | 93.5 | 94.2 |
| Schoolbook | 95.9 | 96.3 | 98.4 | 98.5 |
| Schoolbook bold | 97.0 | 98.0 | 98.8 | 99.1 |
| Schoolbook bold ital | 97.1 | 96.6 | 97.7 | 97.7 |
| Schoolbook ital | 95.8 | 97.6 | 98.7 | 99.0 |
| Wedding Text | 63.9 | 66.1 | 71.5 | 74.1 |
| overall % correct | 82.2 | 83.2 | 86.8 | 84.4 |

TABLE 13

Spacing Comparisons of Font Group 6

| | Spacing Between Letters | | | |
|---|---|---|---|---|
| Font Style | −7 | −1 | +3 | +9 |
| Avant Garde | 85.8 | 93.0 | 96.3 | 97.6 |
| Avant Garde bold | 94.3 | 97.2 | 98.1 | 98.7 |
| Brush | 94.5 | 96.6 | 97.3 | 98.5 |
| Zapf Chancery lght | 98.0 | 98.9 | 99.6 | 99.7 |
| Zapf Chancery lght ital | 98.4 | 99.4 | 99.8 | 99.7 |
| Zapf Chancery med | 99.1 | 99.8 | 99.9 | 99.8 |
| Zapf Chancery med ital | 97.8 | 99.3 | 99.9 | 99.8 |
| Eurostile | 97.2 | 99.3 | 99.6 | 99.5 |
| Eurostile bold | 97.2 | 99.8 | 100.0 | 99.7 |
| Garamound bold | 100.0 | 99.9 | 99.9 | 99.8 |
| Garamound bold ital | 97.8 | 98.7 | 99.4 | 99.3 |
| Garamound ital | 97.8 | 98.7 | 99.6 | 99.6 |
| Gill Kayo | 99.9 | 99.6 | 99.8 | 99.7 |
| Helena Script | 95.0 | 95.8 | 97.5 | 98.4 |
| Hobo | 93.4 | 92.9 | 93.3 | 94.2 |
| Janson | 99.7 | 99.9 | 100.0 | 100.0 |
| Megaron bold | 99.2 | 100.0 | 100.0 | 100.0 |
| Megaron bold ital | 98.2 | 99.5 | 99.9 | 99.9 |
| Megaron med | 99.8 | 100.0 | 100.0 | 100.0 |
| Megaron med ital | 98.1 | 99.7 | 99.7 | 99.8 |
| Schoolbook | 99.8 | 99.9 | 100.0 | 100.0 |
| Schoolbook bold | 100.0 | 100.0 | 100.0 | 100.0 |
| Schoolbook bold ital | 97.4 | 98.8 | 99.3 | 99.5 |
| Schoolbook ital | 97.5 | 99.1 | 99.4 | 99.6 |
| Wedding Text | 61.5 | 69.2 | 76.5 | 78.2 |
| overall % correct | 95.9 | 97.4 | 98.2 | 98.4 |
| % correct excluding Wedding Text font | 97.3 | 98.6 | 99.1 | 99.3 |

Given a font group composed of a single particular spacing (i.e. −7, +3, +9, etc.), the algorithm is capable of distinguishing nearest neighbors regardless of whether the characters are overlapped or are widely spaced. A logical question to ask is: what is the effect of using font styles from one spacing to identify font groups from another spacing. This will be discussed in subsection 4.2.8. The optimum number of harmonics to use in identifying nearest neighbors is the next variable to be addressed.

4.2.4 Number of Harmonics. Previous work by Bush (1) and O'Hair (13) was done with the 3rd harmonic vertically and horizontally giving a total of 49 coefficients: −3 to +3 (7) vertically and −3 to +3 (7) horizontally. It is undetermined, though, if 49 is the optimum number of coefficients. As the number of harmonics increases so does the sensitivity of the process to the wide variation in the values of the high frequency terms. It is the high frequency Fourier terms that characterize the ornate flare of a font style: curly ques and sharp edges of individual letters. By using the lower order harmonics, the images are essentially blurred to eliminate high frequency inputs. However, too much blurring causes errors like mistaking after for often or came for come. The goal is to find the optimum number of harmonics.

In English text, length is proportionally greater than height. This can be accounted for by increasing the number of harmonics used in the horizontal direction while holding the vertical direction constant. An example is a $3 \times 5$ search space. Using −3 to +3 (7) harmonics vertically and −5 to +5 (11) harmonics horizontally will yield 77 ($7 \times 11$) unique components in the 2DFT. Any variety of combinations can be used. Table 14 presents the results of using the 6 font group case with the top 1000 words, where the energy has been renormalized based on the particular number of coefficients being used.

Three important results are present. The first is the importance of the horizontal axis versus the vertical axis. Successful identification is more sensitive to an increase in the horizontal. An example is $2 \times 4$ and $4 \times 2$. Both programs use 45 coefficients, yet their results are 99.4 percent correct versus 97.3 percent correct, respectively. The horizontal axis is more important for locating a correct neighbor. In fact, the $2 \times 4$ case with 45 coefficients performed better (0.4%) than the $3 \times 3$ case with 49 coefficients. A decrease of components in Fourier space but an increase in performance indicates higher information content in the horizontal axis.

TABLE 14

Harmonic Comparisons for Font Group 6 ‡

| | | Horizontal Harmonics | | | |
|---|---|---|---|---|---|
| | 1 | 2 | 3 | 4 | 5 |
| 1 | 68.3 | 92.2 | 95.8 | 98.4 | 98.6 |
| Vertical 2 | 85.2 | 96.5 | 98.9 | 99.4 | 99.5 |
| Harmonics 3 | 87.5 | 97.1 | 99.0 | 99.5 | 99.6 |
| 4 | 88.5 | 97.3 | 99.1 | 99.5 | 99.6 |
| 5 | 88.4 | 97.3 | 99.0 | 99.5 | 99.6 |

‡ percent correct excluding Wedding Text font.

The second important result is the effect of increasing the number of harmonics in the algorithm. Increasing excessively the number of harmonics gives a diminishing return in performance. The $2 \times 5$ case results in 99.5 percent correct and it uses $5 \times 11$ (55) coefficients. The $5 \times 5$ case on the other hand, resulted in 99.6 percent correct. It used $11 \times 11$ (121) coefficients. Just over twice the number of coefficients develops only a 0.1% increase in the overall percent correct. While just over twice the number of coefficients from the $1 \times 3$ (21) case to the $2 \times 4$ (45) case produces a 7.2% increase in the overall percent correct.

The decreasing rate of return is not because the majority of energy is in the lower harmonics but because the lower harmonics best describes the general shape of the words. A special test proves this for the $2 \times 3$ case where its low frequency (−1 to +1) vertical and horizontal terms were set equal to zero. In effect, 26 coefficients ($2 \times 3$ (35 coefficients) $1 \times 1$ (9 coefficients)) are used; most (>90 percent) of the total energy is zeroed out. The results are an impressive 98.2% correct (excluding Wedding Text) compared to 98.9% (excluding Wedding Text) using all Fourier terms. The $2 \times 2$ case uses 25 coefficients. Both the $2 \times 2$ and the $2 \times 3 - 1 \times 1$ have essentially the same number of coefficients but an increase in overall percent correct of 1.7% occurs, in favor of the $2 \times 3 - 1 \times 1$ case. Graphically, the two search spaces are presented in FIG. 11.

An additional test is performed for the $2 \times 2$ case where the −1 to +1 terms are set to zero. The $2 \times 2$ terms minus the $1 \times 1$ terms gives 16 unique coefficients. The result is 90.5 percent correct. The $2 \times 1$ and $1 \times 2$ cases both have 15 coefficients in them and their results were 85.2 and 92.2 percent correct, respectively. Hence, the results for the $2 \times 2 - 1 \times 1$, where the majority of energy (−1 to +1 coefficients) is zeroed out, versus the $2 \times 1$ and the $1 \times 2$ cases shows that the algorithm is as sensitive to the high energy terms ($1 \times 1$) as it is to the remaining lower energy terms around it. Therefore, the importance that any single coefficient plays in the algorithm making a successful nearest neighbor match is not based on the amount of energy within that particular coefficient but on the relative variance between the particular coefficient and a nearest neighbor coefficient. The first few harmonics are extremely valuable because these terms define the basic shape of a word, but a high percent correct ($\geq 95$ percent) can be obtained with or without the high energy terms by using almost any combination of lower harmonics ($\leq 5$), as long as the horizontal harmonics are emphasized ($\geq$) over the vertical harmonics and the total number of coefficients is roughly greater than 25.

The third important result is energy renormalization. When the number of coefficients are decreased, say from 121 to 49, and especially when the cosine DC term is eliminated (as in $2 \times 2 - 1 \times 1$), the overall energy is no longer 1.0, assuming it is originally normalized for the $5 \times 5$ (121 coefficients) case. Hence, the surface of the $2^n$ hypersphere with unit radius r is now warped. Just like a ripe grape is round and smooth, so is the surface of a proper, energy normalized hypersphere. But when the energy of the components do not equal 1.0, the surface area plot becomes like a raisin. The results intuitively should produce a decrease in percent correct, but it does not.

Take for example the $1 \times 3$ case with and without energy renormalization, renormalization based on the number of coefficients used. The results are 95.8% and 97.3% correct, respectively. The percent correct for the $2 \times 4$ case with and without energy renormalization are identical (99.4%), even thou-,h the overall energy is of an image is 1.0 with renormalization and only 0.86 to 0.96 without renormalization. The majority of the energy is in the lower harmonics, but it is still unknown why the results improve.

Values in Table 14 word case differ slightly from Table 11 because of this renormalization. All previous tables to Table 14 have not been energy renormalized based on the number of harmonics used. In future tables it will be specified whether or not renormalization is being used.

TABLE 15
Word Length Preprocessing

| Assumed Length of Input Word | Possible Length of nearest neighbor |
|---|---|
| 1 | 1 to 2 |
| 2 | 1 to 3 |
| 3 | 2 to 4 |
| 4 | 3 to 5 |
| 5 | 4 to 7 |
| 6 | 4 to 8 |
| 7 | 5 to 10 |
| 8 and up | 6 and up |

TABLE 16
Number of Possible Choices

| Word Length | Number of Possible Choices (max = 6000) |
|---|---|
| 1 letter | 210 |
| 2 letters | 774 |
| 3 letters | 2028 |
| 4 letters | 3048 |
| 5 letters | 4198 |
| 6 letters | 4674 |
| 7 letters | 3846 |
| 8 and above letters | 2742 |

4.2.5 Word Length. In Chapter 2, Table 7 shows for the adult reader that the word length is almost as important as the first letter and the meaning of a word. Because word length is so important to the human visual system, it is used here as a pre-processor or discriminator in the search space. Two cases are examined. The first case has the constraints listed in Table 15. The constraints imposed on the 6 font group case result in shortening the number of possible neighbors. They are derived by an assumption that length of words in a text stream can be approximated by height/length ratios and other simple calculations. The amount the length discriminator shortens the search space for individual word lengths is presented in Table 16.

TABLE 17
1000 vs. 2000 Words

| Harmonics Used (vertical × horizontal) | 1000 Words % correct (†) | 2000 Words % correct (†) | 5000 Words % correct (†) |
|---|---|---|---|
| 1 × 3 | 95.8 | 95.8 | — |
| 2 × 3 | 98.9 | 98.2 | — |
| 2 × 4 | 99.4 | 99.1 | 98.6 |
| 3 × 4 | 99.5 | 99.3 | — |
| 3 × 5 | 99.6 | 99.5 | — |

† = excluding Wedding Text.

The results of the algorithm for the top 1000 words using 6 font groups, a 3×3 harmonic space, with energy renormalization, is 99.0 percent correct. The search space has roughly half the original number of target (template) words as a result of length discrimination, but does not increase in percent correct. Improvement does not occur for two reasons. First, although the number of choices are decreased, the choices come from a location on the hypersphere that is already far away from the nearest neighbor and therefore does not adversely effect the results. And secondly, the total surface area in $2^n$ space is so large compared to the space used in this process that it can accommodate the large difference in choices.

The second case examines the effect of assuming an accurate length discriminator can be developed. The results show if the word length is known then the error rate for the top 1000 words using a 3×3 harmonic space with the 6 font group case is only 0.7% (99.3% correct choices). This is not a drastic improvement (only 0.3%) considering the search space has been decreased an order of magnitude from 6000 to an average of less than 600 choices. This raises the question then: how many words can this Fourier space hold?

4.2.6 Number of Words. Since there are no obviously useful equations to tell when a $2^n$ hypersphere is filled, empirical data provides the only indication of the number of words possible in Fourier space. The second step in this process here is to increase the vocabulary from 1000 words is 2000 words. The list on the next 1000 most popular words is also listed in Appendix C. Given the same 25 font styles distributed into the same 6 font groups, Table 17 is a comparison between the 1000 and 2000 word cases.

The search space is doubled. 2000 words printed in 6 font groups make up 12000 target words for 50,000 input words (2000 words×25 font styles). Little if any of the overall accuracy is lost. Consider the 2×3 case more closely. Table 18 compares the mean distance between nearest neighbors and change in standard deviation. The small change in mean distance is represented by the addition of 6000 target words in the output space.

Also included in Table 17 is the case for a 5000 word vocabulary. The 6 font groups make up 30,000 target words for the 125,000 input words. The largest percent of the increase in errors, from the 1000 to 5000 word case, occurs for the font styles that are used in font groups comprised of only two font styles. Never the less, little if any of the overall accuracy is lost. Therefore, the algorithm is shown capable of performing with a very large vocabulary.

4.2.7 Script Font. The algorithm's performance with the script fonts, Brush and Helena Script, proves to one of the most interesting findings. The performance is not as high as with most printed styles but then the script styles' variances are considerable, see Appendix A. They only have each other to make up the script font group. The algorithm's performance for the script fonts with a selected number of harmonic groups, using the top 1000 words, is presented in Table 19. These results are taken from the same programs which were used to develop Table 14.

The first thing which comes to sight is the mean and standard deviation values. They are almost identical for both font styles and upon further investigation of all other harmonic groups, this equality continues for both mean and standard deviation. Expanding this to other font styles that vary considerably from the majority of font styles (Hobo and Gill Kayo which makeup the special font group), it is evident that they too exhibit this behavior.

The results demonstrates that the algorithm handles script styles and printed styles the same in Fourier space. Neither one is more difficult to distinguish than the other. The percent correct is determined by the number of good font groups that exist to identify a particular font style. In the case of script fonts, only two font styles are used and so correct identification is limited to basically one font group. The algorithm performed similarily for the Hobo and Gill Kayo font styles and their percent correct values are also slightly less than the overall average.

TABLE 18

2 × 3 Harmonic Case of 2000 Words

| Font Style | 1000 | | | 2000 | | |
|---|---|---|---|---|---|---|
| | % cor | mean | std dev | % cor | mean | std dev |
| Avant Garde | 95.9 | 0.72 | 0.20 | 94.3 | 0.69 | 0.19 |
| Avant Garde bold | 98.5 | 0.46 | 0.14 | 98.3 | 0.44 | 0.13 |
| Brush | 96.5 | 0.65 | 0.16 | 95.7 | 0.63 | 0.15 |
| Zapf Chancery lght | 99.5 | 0.65 | 0.22 | 98.9 | 0.61 | 0.21 |
| Zapf Chancery lght ital | 99.9 | 0.55 | 0.20 | 99.7 | 0.52 | 0.20 |
| Zapf Chancery med | 99.8 | 0.55 | 0.19 | 99.3 | 0.52 | 0.18 |
| Zapf Chancery med ital | 99.7 | 0.51 | 0.19 | 99.7 | 0.49 | 0.19 |
| Eurostile | 99.7 | 0.59 | 0.22 | 99.6 | 0.56 | 0.21 |
| Eurostile bold | 99.5 | 0.47 | 0.12 | 99.5 | 0.45 | 0.12 |
| Garamound bold | 99.8 | 0.45 | 0.11 | 99.8 | 0.44 | 0.11 |
| Garamound bold ital | 99.7 | 0.57 | 0.20 | 99.3 | 0.55 | 0.19 |
| Garamound ital | 99.6 | 0.57 | 0.18 | 99.3 | 0.54 | 0.18 |
| Gill Kayo | 98.7 | 0.43 | 0.16 | 97.2 | 0.43 | 0.16 |
| Helena Script | 96.8 | 0.65 | 0.16 | 96.2 | 0.63 | 0.15 |
| Hobo | 90.9 | 0.44 | 0.17 | 82.9 | 0.44 | 0.17 |
| Janson | 100.0 | 0.44 | 0.14 | 100.0 | 0.42 | 0.13 |
| Megaron bold | 100.0 | 0.34 | 0.11 | 100.0 | 0.33 | 0.10 |
| Megaron bold ital | 99.8 | 0.42 | 0.16 | 99.7 | 0.39 | 0.15 |
| Megaron med | 100.0 | 0.39 | 0.14 | 99.9 | 0.37 | 0.13 |
| Megaron med ital | 99.8 | 0.46 | 0.17 | 99.7 | 0.43 | 0.16 |
| Schoolbook | 100.0 | 0.41 | 0.11 | 100.0 | 0.39 | 0.10 |
| Schoolbook bold | 100.0 | 0.40 | 0.10 | 100.0 | 0.38 | 0.09 |
| Schoolbook bold ital | 98.9 | 0.59 | 0.17 | 98.7 | 0.57 | 0.16 |
| Schoolbook ital | 99.5 | 0.63 | 0.18 | 99.0 | 0.61 | 0.18 |
| Wedding Text | 74.9 | 0.83 | 0.31 | 74.8 | 0.78 | 0.29 |
| overall % correct | 97.9 | 0.51 | — | 97.2 | 0.50 | — |
| excluding Wedding Text | 98.9 | — | — | 98.2 | — | — |

TABLE 19

Script Fonts

| Har-monics Used | Overall % cor | Brush | | | Helena Script | | |
|---|---|---|---|---|---|---|---|
| | | % cor | mean | std dev | % cor | mean | std dev |
| 1 × 2 | 92.2 | 80.4 | 0.28 | 0.08 | 82.7 | 0.29 | 0.08 |
| 1 × 4 | 98.4 | 97.5 | 0.51 | 0.15 | 96.0 | 0.51 | 0.15 |
| 2 × 2 | 96.5 | 90.9 | 0.48 | 0.11 | 90.2 | 0.49 | 0.11 |
| 2 × 4 | 99.4 | 98.9 | 0.82 | 0.21 | 97.9 | 0.82 | 0.21 |
| 3 × 2 | 97.1 | 93.0 | 0.67 | 0.14 | 92.1 | 0.67 | 0.15 |
| 3 × 4 | 99.5 | 99.1 | 1.10 | 0.26 | 98.2 | 1.10 | 0.26 |
| 4 × 4 | 99.5 | 99.2 | 1.30 | 0.29 | 98.9 | 1.30 | 0.29 |

TABLE 20

Wedding Text Font

| Font Group | Harmonics Used | Overall % Correct | Wedding Text |
|---|---|---|---|
| 1 | 1 × 1 | 39.0 | 32.1 |
| 1 | 2 × 2 | 75.5 | 63.5 |
| 1 | 3 × 3 | 86.3 | 71.5 |
| 1 | 5 × 5 | 91.2 | 78.7 |
| 6 | 1 × 2 | 92.9 | 58.2 |
| 6 | 2 × 4 | 99.4 | 77.7 |
| 6 | 3 × 3 | 99.0 | 75.6 |
| 6 | 4 × 4 | 99.5 | 79.1 |

The algorithm will work either on script or printed font styles regardless of their shapes. More ornate, stylish, or varied font styles must be well represented by the font group(s) in Fourier space. The more adequate the representation, (multiple font styles in font group) usually the higher the percent correct.

This is an appropriate time to discuss the Wedding Text. First, look at Appendix A and compare this font style with all others. It is not visually close to any other font style and, therefore, stands by itself In this research, it is never included in any font group except the 1 font group case. A comparison of the algorithm's performance with the Wedding Text is presented in Table 20.

As extreme as the font style is and without its inclusion in any of the 6 font groups, the algorithm still performs in the high 70th percentile of correct choices. It is more important to explore how the algorithm handles something that it has not been trained with which is completely different in style, than to force the Wedding Text into an illsuited font group. This is an important question to ask for all the other font styles. How does the algorithm handle font styles that are not a member of any font group?

4.2.8 New font styles. What happens to the algorithm when a new font style is encountered? This question is of significance and is handled by testing each font style against font groups that have not been developed using that particular font style. The font groups are identical to the ones discussed in Chapter 3; except, when a particular font style is tested, it is excluded from the formation of any or all font groups. Hence, each font style is tested against font group(s) that have never seen that particular font style before. This is accomplished for the top 1000 words in a 3×3 harmonic space without energy renormalization. The results for the 1, 3, and 6 font group cases are consolidated in Table 21.

The biggest change is in the script font styles, Brush and Helena Script. These two are vastly different from printed text visually. Where as in the 1 font group case they make up 8.0% (2/25) of the font styles, they make up 100% of their font groups in the 3 and 6 font group cases. When eliminating either one from the font groups during testing, the remaining script font style makes up the entire font group. This results in losing the benefits from having a font group, and the algorithm is back to the original way of searching font styles against font styles, as in section 4.1.

This can also be noted in the 6 font group case for the two font styles (Hobo and Gill Kayo) that make up the special font group. They are the only two font styles that make up that particular font group and when either one is excluded from the group, the percent correct falls off rapidly. If overall percent correct is recalculated for the 3 and 6 font group cases and those font group which only have 2 font styles in a font group are excluded, then the percent correct is 96.0% and 98.0%, respectively.

It is possible to conclude, therefore, that if a font group is properly made with a variety of similar, yet varied font styles and then tested with a new font style, the percent correct will vary according to its similarity to the font groups. An ornate font style like Wedding Text will never produce 99 percent accuracies with the other font styles in FIGS. 17–40. But for a more standard type of printed text (i.e. Megaron), the algorithm operates at nearly peak performance even though the particular font is not part of any font group.

TABLE 21

Introducing New Font Styles

| | Number of Font Groups | | | | | |
|---|---|---|---|---|---|---|
| Font Style | 1 | 1* | 3 | 3* | 6 | 6* |
| Avant Garde | 78.0 | 71.2 | 94.0 | 89.6 | 96.3 | 93.7 |

TABLE 21-continued

Introducing New Font Styles

| Font Style | Number of Font Groups | | | | | |
|---|---|---|---|---|---|---|
| | 1 | 1* | 3 | 3* | 6 | 6* |
| Avant Garde bold | 91.9 | 89.8 | 97.6 | 96.9 | 98.1 | 94.5 |
| Brush | 43.4 | 36.2 | 97.3 | 57.0 | 97.3 | 56.3 |
| Zapf Chancery lght | 93.4 | 90.9 | 99.6 | 97.6 | 99.6 | 97.6 |
| Zapf Chancery lght ital | 90.9 | 88.6 | 99.8 | 98.6 | 99.8 | 98.3 |
| Zapf Chancery med | 94.8 | 93.8 | 99.9 | 99.5 | 99.9 | 99.5 |
| Zapf Chancery med ital | 92.0 | 89.3 | 99.9 | 99.3 | 99.9 | 99.2 |
| Eurostile | 90.8 | 86.1 | 98.3 | 96.4 | 99.6 | 98.9 |
| Eurostile bold | 97.7 | 97.1 | 99.9 | 99.7 | 100.0 | 99.1 |
| Garamound bold | 92.4 | 92.0 | 93.4 | 92.1 | 99.9 | 99.2 |
| Garamound bold ital | 94.2 | 92.6 | 99.3 | 98.2 | 99.4 | 98.6 |
| Garamound ital | 94.9 | 93.3 | 99.6 | 98.5 | 99.6 | 98.4 |
| Gill Kayo | 87.2 | 82.5 | 89.1 | 89.1 | 99.8 | 93.9 |
| Helena Script | 32.0 | 24.7 | 97.5 | 48.2 | 97.5 | 49.5 |
| Hobo | 62.1 | 60.0 | 65.3 | 64.2 | 93.3 | 65.2 |
| Janson | 92.4 | 91.4 | 96.9 | 94.2 | 100.0 | 99.8 |
| Megaron bold | 97.5 | 97.1 | 100.0 | 99.7 | 100.0 | 100.0 |
| Megaron bold ital | 96.6 | 95.2 | 99.4 | 98.9 | 99.9 | 99.2 |
| Megaron med | 89.5 | 86.3 | 98.7 | 98.0 | 100.0 | 99.9 |
| Megaron med ital | 93.5 | 90.6 | 99.4 | 98.8 | 99.7 | 99.3 |
| Schoolbook | 98.4 | 97.3 | 99.4 | 99.1 | 100.0 | 99.9 |
| Schoolbook bold | 98.8 | 97.3 | 99.5 | 99.2 | 100.0 | 99.8 |
| Schoolbook bold ital | 97.7 | 97.9 | 94.9 | 93.8 | 99.3 | 94.8 |
| Schoolbook ital | 98.7 | 96.7 | 96.9 | 96.4 | 99.4 | 95.0 |
| Wedding Text | 71.5 | 68.8 | 71.5 | 71.5 | 76.5 | 76.5 |
| overall % correct | 86.8 | 84.3 | 95.5 | 91.0 | 98.2 | 92.9 |

*font style not part of any font group and therefore considered a new font style.

The human brain actually seems to behave the same way. Given a new ornate font style, reading speed is severely reduced. With practice, reading speed will gradually increase to its usual performance with previously well known font styles. If the style is not an extremely different one, then reading speed is only slightly reduced when first viewing it. The lesson then is to build a machine using a representative cross section that is able to interpret the majority of font styles that might be encountered.

4.2..9 Font from new spacing. The variation between spacing is another important issue. In subsection 4.2.3, the research proved spacing did not severely affect recognition. But what happens when training of the font groups comes from one spacing and the examined text is from a different spacing? To answer this question, four spacings are considered. They are −5, +1, +3, and +7. They represent a −31% to +44% change in average word length. The font groups are made with one particular spacing and then the input words are taken from a second different spacing. The top 1000 words are used with a 3×3 harmonic space and the 6 font group case. The combinations tested are presented in Table 22. Energy renormalization is not performed and not all −5 spacings are tested. In addition to this, the average change in word length between input word and target word is listed in Table 23. It is based on the relationship between letter spacing (−5, +1, +3, and +7 pixels) and the average letter length, which is 16 pixels.

A special note concerning the −5 spacing is necessary. Recall from FIG. 10 what a −5 spacing looks like. Additional examples are shown in FIG. 12. Large distortion occurs where cl now becomes d, to becomes b, and so on. The test was made to determine if the algorithm can work on really distorted images of a word. The results may be a little misleading when −5 spacing is compared to +1 spacing, and +7 spacing; actually the human visual system can do no better in deciding if d is either a d or a cl pushed together. Therefore, it is not a break down in the algorithm but a break down in symbology. The meaning of the symbol or character is lost when overlap is too great.

TABLE 22

Percent Correct from New Spacing

| | | Input Word Spacing | | | |
|---|---|---|---|---|---|
| | | −5 | +1 | +3 | +7 |
| Font Group Spacing | −5 | 97.8 | 78.2 | ↑ | ↑ |
| | +1 | 80.2 | 99.0 | 98.9 | 97.3 |
| | +3 | ↑ | 98.6 | 99.1 | 98.7 |
| | +7 | 41.5 | 93.9 | 98.0 | 99.2 |

↑ = not tested.

TABLE 23

Percent Change in Length

| | | Input Word Spacing | | | |
|---|---|---|---|---|---|
| | | −5 | +1 | +3 | +7 |
| Font Group Spacing | −5 | 0 | 38 | ↑ | ↑ |
| | +1 | 38 | 0 | 13 | 38 |
| | +3 | ↑ | 13 | 0 | 25 |
| | +7 | 75 | 38 | 25 | 0 |

↑ = not tested.

Examine the remaining cases of +1, +3, and +7. As the percent of increase in spacing within a word grows, the percent correct between different spacings decreases. This indicates the possible need for multiple font groups with varied spacing. Depending on the reduction of percent correct allowable, the necessary number of font groups based on spacing can be calculated. Note that after about a +7 spacing, the letters within a word can freely be segmented and the algorithm applied to the individual letters themselves. Therefore, many different font groups based on spacing are not required. Only about 2 or 3 spacings would ever be necessary in actual text.

4.2.10 Noise. Up until now, all images of words used in this research have been considered noiseless. In a real world case, this never happens and this research now investigates three cases where noise is added to the data previously generated. The first is covered in subsection 4.2.4 where the energy normalization is not uniform. The effect of improperly normalizing the energy is equivalent to varying the intensity in the input image. With a 10% variance in energy in Fourier space, the results produced a moderate (1×3 harmonic case) to slight (2×4 harmonic case) increase in percent correct. This addition of noise actually benefits recognition. The answer to this is unpredictable and at present unexplainable.

The second case was discovered by accident. It involved incorrectly building one of the font groups for the top 2000 words, 6 font group case. The first 1000 words of the 'regular a'font group (Avant Garde, Avant Garde bold, Schoolbook bold italicized, and Schoolbook italicized) were accidentally added with the second 1000 words of the Wedding Text font style. Hence, the following in Table 24 is a partial list of what happened.

TABLE 24

Inadvertent Error in the 2000 Word Case

| Font Group "regular a" word | | font style 1 word | font style 2 word | font style 3 word | font style 4 word | font style 5 word |
|---|---|---|---|---|---|---|
| 1 the | = | the + | the + | the + | the + | covered (1001) |
| 2 of | = | of + | of + | of + | of + | current (1002) |
| 3 and | = | and + | and + | and + | and + | despite (1003) |
| 4 to | = | to + | to + | to + | to + | eight (1004) |
| 5 a | = | a + | a + | a + | a + | i'd (1005) |
| . | | | | | | |
| . | | | | | | |
| . | | | | | | |
| 1000 won't | = | won't + | won't + | won't + | won't + | joe (2000) | where:
font style 1 = Avant Garde
font style 2 = Avant Garde bold
font style 3 = Schoolbook bold italicized
font style 4 = Schoolbook italicized
font style 5 = Wedding Text The most popular word, the, should have been a composite of 4 different the's. Actually it is made up of 5 words, 4 the's and the word covered. The second most popular word of is a composite of 4 different ofs and the word current. This error occurred for the first 1000 words of the 'regular a' font group. In addition to this 'noise', the images were energy normalized for only 4 words and not the 5 which occurred. So, not only were the images greatly corrupted, but their energy normalization is incorrect. The results of this top 2000 word test using the 6 font group case with a 3×3 harmonic search space are listed in Table 25.

TABLE 25

Percent Correct for Added Noise to 2000 Words

| | Correct 2000 | | | Corrupted 2000 | | |
|---|---|---|---|---|---|---|
| Font Style | % cor | mean | std dev | % cor | mean | std dev |
| Avant Garde | 95.3 | 0.91 | 0.25 | 92.0 | 0.90 | 0.26 |
| Avant Garde bold | 98.3 | 0.58 | 0.18 | 97.3 | 0.60 | 0.20 |
| Brush | 98.5 | 0.80 | 0.20 | 98.5 | 0.76 | 0.19 |
| Zapf Chancery lght | 99.5 | 0.82 | 0.28 | 99.4 | 0.77 | 0.25 |
| Zapf Chancery lght ital | 100.0 | 0.70 | 0.26 | 99.9 | 0.66 | 0.24 |
| Zapf Chancery med | 99.7 | 0.70 | 0.24 | 99.7 | 0.67 | 0.22 |
| Zapf Chancery med ital | 99.7 | 0.66 | 0.26 | 99.7 | 0.62 | 0.24 |
| Eurostile | 99.5 | 0.74 | 0.28 | 99.7 | 0.71 | 0.26 |
| Eurostile bold | 99.3 | 0.59 | 0.17 | 99.5 | 0.58 | 0.16 |
| Garamound bold | 100.0 | 0.56 | 0.14 | 100.0 | 0.53 | 0.13 |
| Garamound bold ital | 99.3 | 0.73 | 0.25 | 99.4 | 0.70 | 0.23 |
| Garamound ital | 99.5 | 0.73 | 0.24 | 99.5 | 0.69 | 0.22 |
| Gill Kayo | 99.3 | 0.54 | 0.20 | 99.4 | 0.53 | 0.19 |
| Helena Script | 98.3 | 0.80 | 0.20 | 98.2 | 0.76 | 0.19 |
| Hobo | 94.7 | 0.55 | 0.20 | 94.8 | 0.54 | 0.19 |
| Janson | 100.0 | 0.55 | 0.18 | 100.0 | 0.53 | 0.16 |
| Megaron bold | 99.9 | 0.43 | 0.13 | 99.9 | 0.42 | 0.13 |
| Megaron bold ital | 99.6 | 0.54 | 0.21 | 99.3 | 0.54 | 0.21 |
| Megaron med | 100.0 | 0.50 | 0.18 | 100.0 | 0.48 | 0.17 |
| Megaron med ital | 99.7 | 0.59 | 0.23 | 99.7 | 0.57 | 0.22 |
| Schoolbook | 100.0 | 0.51 | 0.14 | 100.0 | 0.48 | 0.13 |
| Schoolbook bold | 100.0 | 0.48 | 0.12 | 100.0 | 0.47 | 0.11 |
| Schoolbook bold ital | 99.5 | 0.75 | 0.22 | 96.2 | 0.79 | 0.26 |
| Schoolbook ital | 99.5 | 0.81 | 0.24 | 96.5 | 0.84 | 0.26 |
| Wedding Text | 77.5 | 1.05 | 0.38 | 78.2 | 0.99 | 0.36 |
| percent correct | 99.1 | 0.66 | — | 98.7 | 0.65 | — |
| ( ) | | | | | | |

( ) - percent correct excludes Wedding Text

The most important result is only a moderate decrease in performance occurred for the font styles which make up the 'regular a' font group. The noise did not affect other font groups but is isolated to the group in which it originated. The second important result is the amount by which the noise decreased the percent correct for the 'regular a' font group. Calculating the 'regular a' font group correctly, the percent correct for these 4 font styles is 98.2%. With the noise it is 95.5%. Thus when 50% of the 'regular a' font group's words are corrupted, an average decrease of only 2.7% occurs.

This leads to a more structured way of generating noise in the input image. All coefficient values for the top 1000 words with +3 spacing are recomputed with a random noise value. The input images of the words are degraded by a selected noise percentage. This amount ranges from 10% to 86%. The image of each word is built with a percentage of the pixels randomly whited out. FIG. 13 is an example of the 10%, 50%, and 86% cases. The font group coefficients values are derived from noiseless images and the test input words are made from noisy images.

TABLE 26

Effects of Noise on the 1 × 3 Harmonic Seach Space

| Font Style | Noiseless | 10% | 20% | 50% | 86% |
|---|---|---|---|---|---|
| Avant Garde | 84.8 | 85.8 | 83.9 | 76.2 | 34.0 |
| Avant Garde bold | 97.1 | 97.6 | 97.0 | 91.9 | 52.4 |
| Brush | 93.7 | 93.8 | 93.0 | 84.1 | 46.2 |
| Zapf Chancery lght | 98.1 | 97.8 | 96.8 | 88.5 | 40.9 |
| Zapf Chancery lght ital | 98.8 | 98.2 | 97.7 | 93.2 | 50.5 |
| Zapf Chancery med | 98.0 | 97.8 | 96.9 | 90.5 | 43.3 |
| Zapf Chancery med ital | 99.1 | 98.5 | 98.4 | 93.5 | 52.9 |
| Eurostile | 99.1 | 97.7 | 97.9 | 89.2 | 37.2 |
| Eurostile bold | 97.3 | 96.5 | 95.2 | 92.1 | 49.1 |
| Garamound bold | 99.1 | 98.9 | 98.8 | 94.3 | 52.3 |
| Garamound bold ital | 97.4 | 96.2 | 95.3 | 91.2 | 53.1 |
| Garamound ital | 98.2 | 97.5 | 97.3 | 91.5 | 50.6 |
| Gill Kayo | 95.8 | 95.6 | 93.9 | 85.7 | 37.7 |
| Helena Script | 93.0 | 91.3 | 88.4 | 79.9 | 47.2 |
| Hobo | 88.9 | 87.0 | 86.1 | 81.5 | 42.1 |
| Janson | 99.7 | 99.4 | 99.1 | 93.3 | 46.3 |
| Megaron bold | 99.7 | 99.6 | 99.5 | 96.1 | 53.8 |
| Megaron bold ital | 98.1 | 98.2 | 97.9 | 92.3 | 50.5 |
| Megaron med | 99.7 | 99.7 | 99.1 | 96.9 | 48.5 |
| Megaron med ital | 99.5 | 99.7 | 98.9 | 96.2 | 41.9 |
| Schoolbook | 99.7 | 98.9 | 98.4 | 95.1 | 55.0 |
| Schoolbook bold | 99.6 | 99.6 | 99.7 | 96.6 | 54.5 |
| Schoolbook bold ital | 97.4 | 96.4 | 95.7 | 91.6 | 53.7 |
| Schoolbook ital | 97.2 | 96.8 | 95.0 | 89.1 | 45.7 |
| Wedding Text | 68.9 | 66.8 | 63.9 | 53.3 | 24.6 |
| overall % correct | 95.8 | 95.4 | 94.6 | 89.0 | 46.6 |

TABLE 26-continued

| Effects of Noise on the 1 × 3 Harmonic Search Space | | | | | |
|---|---|---|---|---|---|
| Font Style | Noiseless | 10% | 20% | 50% | 86% |
| excluding Wedding Text | 96.9 | 96.6 | 95.8 | 90.4 | 47.5 |

Once the 2DFT of the 25,000 images (1000 words×25 font style) are computed, for each of the separate noise values (10, 20, 50, and 86%), the nearest neighbor calculations are handled just as before. The results for the top 1000 words using the 6 font group case, with energy renormalization and both 1×3 and 2×4 harmonic spaces are presented in Tables 26 and 27, respectively.

It is evident from Tables 26 and 27 that the algorithm is not sensitive to noise. There is a slow degradation of the results as the input images become noisier, but for small to moderate amounts of noise (10 to 20%), the algorithm is essentially unaffected by noise.

TABLE 27

| Effects of Noise on the 2 × 4 Harmonic Search Space | | | | | |
|---|---|---|---|---|---|
| Font Style | Noiseless | 10% | 20% | 50% | 86% |
| Avant Garde | 95.7 | 95.5 | 95.6 | 93.9 | 69.9 |
| Avant Garde bold | 99.0 | 99.0 | 99.1 | 98.2 | 80.5 |
| Brush | 98.9 | 98.2 | 97.2 | 95.1 | 70.8 |
| Zapf Chancery lght | 99.3 | 99.3 | 99.2 | 98.0 | 70.5 |
| Zapf Chancery lght ital | 100.0 | 100.0 | 100.0 | 99.5 | 78.7 |
| Zapf Chancery med | 99.9 | 99.9 | 99.7 | 99.1 | 76.1 |
| Zapf Chancery med ital | 99.7 | 99.5 | 99.6 | 98.6 | 76.6 |
| Eurostile | 99.4 | 99.5 | 99.2 | 98.2 | 73.0 |
| Eurostile bold | 99.5 | 99.6 | 99.3 | 98.7 | 79.3 |
| Garamound bold | 100.0 | 99.9 | 100.0 | 99.8 | 86.1 |
| Garamound bold ital | 99.7 | 99.7 | 99.6 | 98.7 | 79.4 |
| Garamound ital | 99.7 | 99.9 | 99.7 | 99.0 | 79.2 |
| Gill Kayo | 99.8 | 99.5 | 99.5 | 98.8 | 76.6 |
| Helena Script | 97.9 | 97.1 | 96.7 | 94.1 | 68.2 |
| Hobo | 98.5 | 98.0 | 98.1 | 94.8 | 76.6 |
| Janson | 100.0 | 99.9 | 100.0 | 99.6 | 84.6 |
| Megaron bold | 100.0 | 100.0 | 99.8 | 99.7 | 86.0 |
| Megaron bold ital | 99.9 | 99.7 | 99.8 | 99.3 | 82.3 |
| Megaron med | 100.0 | 99.9 | 99.9 | 99.8 | 82.1 |
| Megaron med ital | 99.9 | 99.8 | 99.8 | 99.1 | 77.5 |
| Schoolbook | 100.0 | 100.0 | 100.0 | 99.6 | 87.2 |
| Schoolbook bold | 100.0 | 100.0 | 100.0 | 99.8 | 88.0 |
| Schoolbook bold ital | 99.9 | 99.6 | 99.7 | 98.5 | 82.6 |
| Schoolbook ital | 99.9 | 99.9 | 99.6 | 98.7 | 79.7 |
| Wedding Text | 77.7 | 77.4 | 76.4 | 71.1 | 43.3 |
| overall % correct | 98.5 | 98.4 | 98.3 | 97.2 | 77.4 |
| excluding Wedding Text | 99.4 | 99.3 | 99.2 | 98.3 | 78.8 |

This is especially true for the 2×4 harmonic case. For use in a reading machine this is of great importance since input images are rarely 100% noiseless.

4.2.11 Upper case letters. Common text is rarely capitalized for any extended period. But for the cases where it does occur, it is important to know how well the algorithm performs is investigated. Consider four test cases where:

1. no font groups used: original approach of section 4.1
2. 1 font group case is used
3. 6 font group case used
4. 6 font group case used but font styles rearranged into new font groups.

The change in font groups between the previous 6 font group case and the new proposed one for capital letters is shown in Table 28.

The results for these 4 test cases using a 3×3 harmonic space with the top 1000 words and energy renormalization are shown in Table 29.

It is obvious that the algorithm for the 1 font group case, like in the lower case, is superior to the original search method in section 4.1. It is not superior though to the 1 font group case of the using the lower case alphabet because the upper case letters are more ornate. Examine Appendix A again and compare the wide range of font styles. These uppercase font styles are vastly different and varied from the previous work in my Master's thesis (13). Not only is the search space greatly increased, but the florid design of the font styles increases the difficulty of recognition.

The old and new divisions in the 6 font groups reveal the importance of good font group construction. The old 6 font group case is divided according to lower case variance of the letters a and g. This does not necessarily apply to the upper case variances. The new font groups are grouped based on overall letter variances. I did this subjectively. This, too, may not be the optimum division of font styles into font groups, but notice the increase in percent correct. The new 6 font group case is also tested using different harmonics spaces. The results for the top 1000 words are shown in Table 30.

TABLE 28

| New and Old Font Groups for Capitals | | | |
|---|---|---|---|
| Previous Font Group | Font Styles | New Font Group | Font Styles |
| italics | Zapf Chancery lt | fg1 | Zapf Chancery med |
|  | Zapf Chancery lt ital |  | Garamound bold ital |
|  | Zapf Chancery med |  | Garamound ital |
|  | Zapf Chancery med ital |  | Schoolbook bold ital |
|  | Garamound bold ital |  | Schoolbook ital |
|  | Garamound ital |  |  |
|  |  | fg2 | Avant Garde bold |
| regular a | Avant Garde |  | Eurostile bold |
|  | Avant Garde bold |  | Gill Kayo |
|  | Schoolbook bold ital |  | Hobo |
|  | Schoolbook ital |  |  |
|  |  | fg3 | Avant Garde |
| regular a g | Eurostile |  | Eurostile |
|  | Eurostile bold |  | Megaron bold |
|  | Megaron bold |  | Megaron bold ital |
|  | Megaron bold ital |  | Megaron med |
|  | Megaron med |  | Megaron med ital |
|  | Megaron med ital |  |  |
|  |  | fg4 | Zapf Chancery lt |
| regular a g | Garamound bold |  | Garamound bold |
|  | Janson |  | Janson |
|  | Schoolbook |  | Schoolbook |
|  | Schoolbook bold |  | Schoolbook bold |
| script | Brush | fg5 | Brush |
|  | Helena Script |  | Zapf Chancery med ital |
|  |  |  | Zapf Chancery lt ital |
| special | Gill Kayo |  |  |
|  | Hobo | fg6 | Helena Script |
|  |  |  | Wedding Text |
| not used | Wedding Text |  | none |

TABLE 29

Percent Correct for Capital Letters

| Font Style | Original | 1 Font Group | 6 Font Group (old) | 6 Font Group (new) |
|---|---|---|---|---|
| Avant Garde | 94.0 | 98.2 | 99.6 | 99.9 |
| Avant Garde bold | 76.5 | 96.0 | 98.4 | 99.9 |
| Brush | 8.2 | 42.3 | 99.2 | 91.6 |
| Zapf Chancery lght | 95.9 | 98.0 | 98.1 | 99.8 |
| Zapf Chancery lght ital | 96.6 | 44.0 | 86.7 | 100.0 |
| Zapf Chancery med | 92.8 | 97.9 | 98.7 | 99.6 |
| Zapf Chancery med ital | 95.9 | 33.6 | 78.4 | 99.9 |
| Eurostile | 81.4 | 86.0 | 99.4 | 99.4 |
| Eurostile bold | 92.3 | 97.8 | 99.2 | 100.0 |
| Garamound bold | 93.1 | 99.9 | 100.0 | 100.0 |
| Garamound bold ital | 99.2 | 99.1 | 99.0 | 100.0 |
| Garamound ital | 99.8 | 99.0 | 98.7 | 100.0 |
| Gill Kayo | 31.2 | 48.7 | 99.8 | 97.2 |
| Helena Script | 0.6 | 6.6 | 58.5 | 88.6 |
| Hobo | 76.5 | 96.5 | 99.8 | 98.5 |
| Janson | 96.7 | 99.7 | 100.0 | 100.0 |
| Megaron bold | 97.1 | 99.9 | 100.0 | 99.9 |
| Megaron bold ital | 94.3 | 100.0 | 99.9 | 99.6 |
| Megaron med | 98.2 | 98.8 | 100.0 | 100.0 |
| Megaron med ital | 96.8 | 98.8 | 99.9 | 100.0 |
| Schoolbook | 97.1 | 99.1 | 100.0 | 99.8 |
| Schoolbook bold | 96.3 | 99.0 | 99.9 | 99.5 |
| Schoolbook bold ital | 99.2 | 97.3 | 99.8 | 99.6 |
| Schoolbook ital | 99.0 | 96.3 | 99.9 | 99.5 |
| Wedding Text | 0.2 | 4.1 | 1.4 | 66.8 |
| overall % correct | 80.4 | 81.5 | 92.6 | 97.6 |
| excluding Wedding Text | n/a | n/a | 96.4 | 98.8 |

TABLE 30

Different Harmonic Groups for Capitals

| Font Style | 1 × 1 | 1 × 4 | 3 × 3 | 2 × 5 |
|---|---|---|---|---|
| Avant Garde | 79.1 | 98.6 | 99.9 | 98.8 |
| Avant Garde bold | 72.6 | 99.2 | 99.9 | 99.9 |
| Brush | 23.5 | 68.6 | 91.6 | 94.1 |
| Zapf Chancery lght | 28.3 | 96.4 | 99.8 | 100.0 |
| Zapf Chancery lght ital | 72.3 | 99.8 | 100.0 | 100.0 |
| Zapf Chancery med | 59.2 | 97.4 | 99.6 | 99.4 |
| Zapf Chancery med ital | 71.4 | 99.7 | 99.9 | 100.0 |
| Eurostile | 41.4 | 98.3 | 99.4 | 99.7 |
| Eurostile bold | 69.5 | 99.5 | 100.0 | 100.0 |
| Garamound bold | 80.9 | 99.7 | 100.0 | 100.0 |
| Garamound bold ital | 95.1 | 99.8 | 100.0 | 100.0 |
| Garamound ital | 90.1 | 99.4 | 100.0 | 100.0 |
| Gill Kayo | 37.4 | 88.0 | 97.2 | 99.4 |
| Helena Script | 9.5 | 89.1 | 88.6 | 98.6 |
| Hobo | 73.8 | 99.1 | 98.5 | 99.6 |
| Janson | 91.5 | 100.0 | 100.0 | 100.0 |
| Megaron bold | 78.3 | 100.0 | 99.9 | 100.0 |
| Megaron bold ital | 60.6 | 99.2 | 99.6 | 99.8 |
| Megaron med | 97.2 | 100.0 | 100.0 | 100.0 |
| Megaron med ital | 93.3 | 99.9 | 100.0 | 100.0 |
| Schoolbook | 89.5 | 99.8 | 99.8 | 100.0 |
| Schoolbook bold | 51.5 | 98.6 | 99.5 | 99.9 |
| Schoolbook bold ital | 67.4 | 99.1 | 99.6 | 100.0 |
| Schoolbook ital | 82.8 | 99.3 | 99.5 | 100.0 |
| Wedding Text | 2.6 | 31.5 | 66.8 | 77.8 |
| overall % correct | 64.7 | 94.4 | 97.5 | 98.6 |
| excluding Wedding Text | 67.3 | 97.0 | 98.8 | 99.5 |

TABLE 31

Font Groups for Numbers

| Font Style ( ) | 1 Font group font group names | 3 Font group font group names |
|---|---|---|
| Avant Garde | fg1 | reg1 |
| Brush | fg1 | reg2 |
| Zapf Chancery med ital | fg1 | reg2 |
| Eurostile | fg1 | reg1 |
| Garamound bold | fg1 | script |
| Garamound bold ital | fg1 | script |
| Megaron bold | fg1 | reg1 |
| Schoolbook bold | fg1 | reg1 |

The overall result is the algorithm performs as well for uppercase letters as with lower case letters. But a significant improvement occurs when font styles are properly arranged into font groups. These groupings are not necessarily the same for lower and upper case alphabets.

4.2.12 Numbers. So far the algorithm has been applied to lower and upper case letters, printed and script text, plain and ornate letters, and all in a variety of type settings. Performance has ranged from acceptable to outstanding, but consider a new set of symbols: numbers. This work is performed on a subset of the 25 font groups. Only eight font styles are chosen because the variance in numerical shapes for the 25 different font styles is limited. Also using the subset of eight font styles increases the processing speed. The eight-font styles chosen are picked for their variation in style from one another. At least two fairly similar font styles are used for each font group and then varying font styles are picked to distinguish font groups. The font styles picked for the font groups are shown in Table 31.

The numerical sequence 000 to 999 is chosen as a test case. The image of each three digit number is built using each of the eight font styles. The 2DFT of the images are computed and stored. The approach is identical to the image of words except that numbers are used as symbols instead of letters. The results using the 1000 3 digit numbers in a 3×3 harmonic space are shown in Table 32.

TABLE 32

Percent Correct for Numbers 000 to 999

| Font Style | 1 Font group | | | 3 Font group | | |
|---|---|---|---|---|---|---|
| | −3 | +1 | +5 | −3 | +1 | +5 |
| Avant Garde | 97.4 | 97.3 | 95.6 | 97.7 | 99.2 | 99.4 |
| Brush | 62.6 | 63.7 | 60.5 | 99.4 | 97.9 | 95.9 |
| Zapf Chancery med ital | 55.6 | 60.1 | 59.7 | 93.7 | 86.1 | 82.4 |
| Eurostile | 50.4 | 57.9 | 48.5 | 85.4 | 91.2 | 89.6 |
| Garamound bold | 95.2 | 92.7 | 91.4 | 100.0 | 100.0 | 100.0 |
| Garamound bold ital | 89.9 | 87.1 | 83.9 | 100.0 | 100.0 | 100.0 |
| Megaron bold | 82.6 | 92.8 | 91.3 | 90.3 | 95.0 | 94.4 |
| Schoolbook bold | 83.9 | 84.8 | 79.0 | 84.3 | 80.0 | 79.8 |
| overall % correct | 77.2 | 79.6 | 76.2 | 93.9 | 93.7 | 92.7 |

The results are not as promising as the case with letters. This is probably due to the fact that the number of font styles which make up the font groups are small. Also, the mean distances between numbers is proportionally smaller than the mean distances between letters. This is mainly because the top 1000 words are not all the same length as are the 1000 numerical symbols. If all the 1000 three letter word combinations using just ten separate letters were compiled, I doubt that the results would be any different.

4.3 Special Distance Calculations 4.3.1 Three Part Look. To obtain an algorithm that is 100% correct for the 1000 word case, the three special distance calculations are developed. These three algorithms are described in section 3.5. The first case is the image of a word broken into three parts. The 2DFT for each word is computed, both for the complete image and for the three parts (first, middle, and last third) of the image. It was thought if all the correct answers lie within some number (first, second, third ... choice) of neighbors from the input word, then it might be possible to choose the correct answer from this list and rule out false recognitions. Table 33 is a list of percent correct with respect to the combined top 1, 3, and 5 choices of nearest neighbors. Instead of just recording the single nearest neighbor, the second, third, etc. choices are also recorded. This table uses the top 1000 words with 3×3 harmonic search space for the 3 font group case.

Assuming the correct answers can now be chosen from a list of just five choices, instead of 3000 (3 font groups1000 words), the overall percent correct will increase from 95.5 to 97.7 percent correct. Ruling out the effects of the varied font styles Hobo and Wedding Text, this percent correct jumps from 96.8 to 99.8. The three part search is an attempt to achieve such an increase in recognition.

The results are somewhat disappointing. The best choice is chosen from the five nearest neighbors based on the smallest combined total distance from the three parts (first, middle, and last) of the word. Each word in the list of five neighbors is treated equally, and selection from this subgroup is solely based on the 2DFT of the three parts. Table 34 compares the previous results of the 3 font group case with the 1000 top words and a 3×3 search space and the new results after searching the five nearest neighbors based on the three parts of the image.

Examining the specific errors in each column reveals the three part scheme is making some adjustments but introduces a new group of errors. Selecting three of the font styles for a closer examination (Avant Garde, Janson, and Megaton bold) shows that for Avant Garde, 30% of the errors in the first column are corrected, but 95% more errors overall were added. This information came from an additional list of all errors and their nearest neighbors that is recorded at the same time the percent correct figures is computed. For Janson, 100% of the errors are corrected through this scheme, but 174% more errors are created. For Megaron bold, no errors occurred previously, but only 98.8% correct are obtained through the 3 part scheme. The final result is that this special case that uses the Fourier coefficients of the first, middle, and last thirds of a word as a post-processor is not effective in improving the performance of the algorithm. It does solve the majority of the previous errors, but in the process creates more errors overall.

TABLE 33

Percent Correct for Combined Nearest Neighbors

| Font Style | Nearest Neighbor | Nearest 3 Neighbors Combined | Nearest 5 Neighbors Combined |
| --- | --- | --- | --- |
| Avant Garde | 94.0 | 99.5 | 99.8 |
| Avant Garde bold | 97.6 | 99.7 | 99.9 |
| Brush | 97.3 | 99.9 | 100.0 |
| Zapf Chancery lght | 99.6 | 100.0 | 100.0 |
| Zapf Chancery lght ital | 99.8 | 100.0 | 100.0 |
| Zapf Chancery med | 99.9 | 100.0 | 100.0 |
| Zapf Chancery med ital | 99.9 | 100.0 | 100.0 |
| Eurostile | 98.3 | 100.0 | 100.0 |
| Eurostile bold | 99.9 | 100.0 | 100.0 |
| Garamound bold | 93.4 | 97.4 | 98.0 |
| Garamound bold ital | 99.3 | 100.0 | 100.0 |
| Garamound ital | 99.6 | 100.0 | 100.0 |
| Gill Kayo | 89.1 | 97.1 | 98.6 |
| Helena Script | 97.5 | 100.0 | 100.0 |
| Hobo | 65.3 | 66.4 | 67.3 |
| Janson | 96.9 | 99.7 | 100.0 |
| Megaron bold | 100.0 | 100.0 | 100.0 |
| Megaron bold ital | 99.4 | 100.0 | 100.0 |
| Megaron med | 98.7 | 100.0 | 100.0 |
| Megaron med ital | 99.4 | 100.0 | 100.0 |
| Schoolbook | 99.4 | 100.0 | 100.0 |
| Schoolbook bold | 99.5 | 100.0 | 100.0 |
| Schoolbook bold ital | 94.9 | 99.0 | 99.8 |
| Schoolbook ital | 96.9 | 99.1 | 99.7 |
| Wedding Text | 71.5 | 77.4 | 80.2 |
| overall % correct | 95.5 | 97.4 | 97.7 |
| % correct excluding Hobo and Wedding Text | 96.8 | 99.6 | 99.8 |

TABLE 34

Percent Correct for 3 Part Scheme

| Font Style | Previous Results | 3 Part Scheme |
| --- | --- | --- |
| Avant Garde | 94.0 | 83.3 |
| Avant Garde bold | 97.6 | 95.2 |
| Brush | 97.3 | 97.0 |
| Zapf Chancery lght | 99.6 | 97.9 |
| Zapf Chancery lght ital | 99.8 | 98.8 |
| Zapf Chancery med | 99.9 | 98.3 |
| Zapf Chancery med ital | 99.9 | 98.9 |
| Eurostile | 98.3 | 90.3 |
| Eurostile bold | 99.9 | 96.2 |
| Garamound bold | 93.4 | 94.6 |
| Garamound bold ital | 99.3 | 98.5 |
| Garamound ital | 99.6 | 98.5 |
| Gill Kayo | 89.1 | 85.0 |
| Helena Script | 97.5 | 98.5 |
| Hobo | 65.3 | 64.5 |
| Janson | 96.9 | 94.6 |
| Megaron bold | 100.0 | 98.9 |
| Megaron bold ital | 99.4 | 98.0 |
| Megaron med | 98.7 | 96.6 |
| Megaron med ital | 99.4 | 96.0 |
| Schoolbook | 99.4 | 97.4 |
| Schoolbook bold | 99.5 | 99.0 |
| Schoolbook bold ital | 94.9 | 90.2 |
| Schoolbook ital | 96.9 | 91.1 |
| Wedding Text | 71.5 | 67.6 |
| overall % correct | 95.5 | 93.0 |
| % correct excluding Hobo and Wedding Text | 96.8 | 95.3 |

4.3.2 Learn Font Groups. Section 3.5 touches on the fundamentals involved in making the special transforms for each font group, but the actual amount of training used is three distinct passes. The first two passes by the program through the font groups uses the first 200 of the top 1000 words. For each of the nearest neighbors, a record is kept concerning which font group is selected and the numerical difference between font style coefficient values and font group coefficient values. The normalized cumulative difference is then subtracted from the font group coefficient values. This cumulative difference approaches 0.0 as the number of passes increases. It was determined that in just two training passes, approximately 98% of the total cumulative difference values could be obtained. Therefore, on the third pass, the entire 1000 words are used for nearest neighbor calculations.

Table 35 is developed using the top 1000 words with a 3×3 harmonic search space. The transform coefficient values for any font group which is used less than 10 times during the 200 training passes is energy normalized to 10% of its value. This is done because the transform becomes too specialized if the number of samples is too small ($\leq 10$). Normalizing the transform's energy prevents over-specialization of the font groups.

Table 36 is a composition of varying harmonic values used with this new technique. It is combined with the results of Table 14 section 4.2.4 and also excludes using the Wedding Text font style. Improvements are greatest in the lower harmonic terms. When input information (number of coefficients) is low, the transform makes a greater improvement over the conventional algorithm. When information increases, the benefits of the transform values on each font group is reduced.

Two important ideas evolve here. First, using a subset of the top 1000 words gives transform values that will improve all of the distance calculations between font style and font groups. Put another way, analyzing ho,.v a font style differs between a font group for a few particular words will improve its ability to recognize all other words. The program learns to recognize the overall characteristics of a particular font style and not just individual letter characteristics.

The second idea is that smaller harmonic groups can be used to obtain performance levels of larger harmonic groups. The reduction of input data (number of coefficients) can be augmented through transform use to obtain results equivalent to an increase in input data. Essentially, it is doing more with less through the use of the transforms by preprocessing the information.

TABLE 35

| Learn Font Groups using Special Transforms | | |
|---|---|---|
| Font Style | Previous Results | Learn Font Groups |
| Avant Garde | 96.3 | 96.5 |
| Avant Garde bold | 98.1 | 98.3 |
| Brush | 97.3 | 98.1 |
| Zapf Chancery lght | 99.6 | 99.7 |
| Zapf Chancery lght ital | 99.8 | 99.7 |
| Zapf Chancery med | 99.9 | 99.8 |
| Zapf Chancery med ital | 99.9 | 99.9 |
| Eurostile | 99.6 | 99.6 |
| Eurostile bold | 100.0 | 99.9 |
| Garamound bold | 99.9 | 99.9 |
| Garamound bold ital | 99.4 | 99.4 |
| Garamound ital | 99.6 | 99.5 |
| Gill Kayo | 99.8 | 99.6 |
| Helena Script | 97.5 | 97.8 |
| Hobo | 93.3 | 96.7 |
| Janson | 100.0 | 100.0 |
| Megaron bold | 100.0 | 100.0 |
| Megaron bold ital | 99.9 | 99.8 |
| Megaron med | 100.0 | 100.0 |
| Megaron med | 99.7 | 99.7 |

TABLE 35-continued

| Learn Font Groups using Special Transforms | | |
|---|---|---|
| Font Style | Previous Results | Learn Font Groups |
| ital | | |
| Schoolbook | 100.0 | 100.0 |
| Schoolbook bold | 100.0 | 100.0 |
| Schoolbook bold ital | 99.3 | 99.8 |
| Schoolbook ital | 99.4 | 99.7 |
| Wedding Text | 76.5 | 75.8 |
| overall % correct | 98.1 | 98.4 |
| excluding Wedding Text | 99.0 | 99.3 |

TABLE 36

| Harmonic Variations for Learned Font Groups using Special Transforms | | | | | |
|---|---|---|---|---|---|
| | Horizontal Harmonics | | | | |
| | 1 | 2 | 3 | 4 | 5 |
| Vertical Harmonics 1 | 68.3/73.2 | 92.2/93.7 | 95.8/97.8 | 98.4/* | 98.6/* |
| 2 | 85.2/* | 96.5/97.2 | 98.9/* | 99.4/* | 99.5/99.6 |
| 3 | 87.5/* | 97.1/* | 99.0/99.3 | 99.5/* | 99.6/* |
| 4 | 88.5/* | 97.3/* | 99.1/* | 99.5/* | 99.6/99.6 |
| 5 | 88.4/* | 97.3/* | 99.0/* | 99.5/* | 99.6/* |

(Table 14 results/algorithm using transform)
*not calculated.

4.3.3 Look Three Ways. The final attempt to achieve 100% for the top 1000 words using the 6 font group case is to capitalize on the fact that different harmonic groups (i.e. 1×3, 2×5, ect.) produce different errors. Even though the overall percent correct for the 2×5 harmonic case is equivalent to the 4×4 harmonic case, the individual errors are not all the same. Three separate harmonic groups are chosen to be as different as possible. This is done by dividing the 121 total coefficients possible (the 5×5 case contains 121 coefficients) into three separate groups. Each group is required to achieve a minimum overall percent correct of $\geq 95\%$. To accomplish this, some over lapping between the three groups is necessary.

Ten 3 group cases were tested. Two of the ten are selected for discussion. They are not necessarily the best performers, but they give an overview as to what happened. FIG. 14 shows the first case of three harmonic groups used to select a best neighbor for the top 1000 words using the 6 font group case for each.

The overall percent correct for the algorithm using the combined FIGS. 14a, 14b, and 14c for the top 1000 words with the 6 font group case is 98.7% with and 99.5% without the Wedding Text font style. Seven out of 25 font styles produced 100.0% correct. Eight out of 25 font styles produced 99.8 to 99.9% correct. The result is a slight increase (0.1%) in overall percent correct from the 2×4 harmonic group case, FIG. 14b, by itself The second three harmonic group case is shown in FIG. 15. The overall percent correct for the algorithm using the combined FIGS. 15a, 15b, and 15c for the top 1000 words with the 6 font group case is 98.8% with and 99.6% without the Wedding Text font style. Ten out of 25 font styles produced 100.0% correct. Seven out of 25 font styles produced 99.8 to 99.9% correct. The result is again a slight increase (0.1%) in overall percent correct from the 2×5 harmonic group case, FIG. 15c, by itself The final result is: to get harmonic groups which have $\geq 95\%$ percent correct and are completely unique in the coefficients they use is not possible. Some overlapping of -harmonic groups is required. If the restriction of being ≧95% is removed then three unique harmonic groups can be obtained, but their overall percent correct is never ≧99.7%. The combined percent correct is always better than any of the three groups individually, but it never achieves 100.0% correct.

V. Conclusion

The original algorithm used in my Master's thesis (13) clearly demonstrates the ability to recognize an entire word as a single symbol using the lower harmonics of its Fourier transform. These lower harmonic coefficients provided a feature space in which to categorize each image of a word. The difference between the coefficients establishes a basis for chosing similar and nonsimilar images. The algorithm is shown to be deficient though, in section 4.1, because it does not perform well with a large vocabulary. As the number of images within the vocabulary grows, processing time becomes excessive and performance decreases rapidly. The algorithm does display the unique property of identifying whole words as single symbols, but for use as the algorithm of a reading machine, it is marginal at best.

The solution to the vocabulary problem is solved with the use of font groups. The font groups are created by averaging the individual Fourier coefficients from similar font styles. The coefficients are originally energy normalized in Fourier space to plot on the surface of an n dimensional hypersphere. The averaging within the font groups was accomplished for each coefficient individually, and all coefficients are assumed to be orthogonal to each other. Averaging was performed using a simple combined average $$(\frac{1}{n} \sum_{j=1}^{n} c_{i,j}$$

where $c_{ij}$ represents the $i^{th}$ Fourier coefficient for each word and the case where the are n font styles in the font group). These font groups, therefore, make up the decision or output space, and the font styles make up the input space.

The variance within a font group for a particular word is computed from the (Mi) distance between the average and an individual font style. The distance between two font groups is the distance between the location of one average to the other. The use of font groups is superior to the original algorithm proposed in my Master's thesis because the average distance between font groups is greater than the variances within a font group. Without font groups, the area encompassing all the locations along the n dimensional surface for a particular word (each location represents a particular font style) boarders the area encompassing all the locations of another particular word. When a location to location distance calculation is made, as in the original algorithm (section 4.1), the individual words are sometimes closer to an alternate word that is along the boarder of its area, than the same word in a different font style. But by using font groups, the nearest neighbor is defined to be the location of the centroid of the area. For a simplistic two dimensional drawing of this explanation see FIG. 16.

Figure 16:
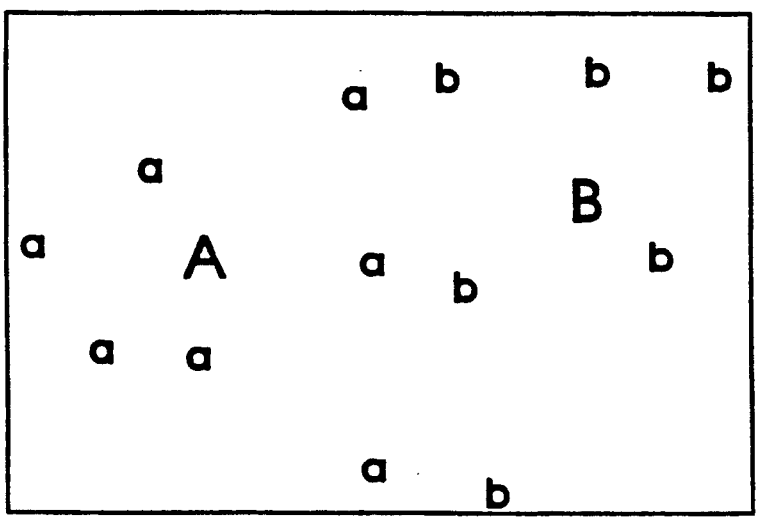
FIG. 16 is a diagram showing a two dimensional representation of an n dimensional surface.
Figure 17:
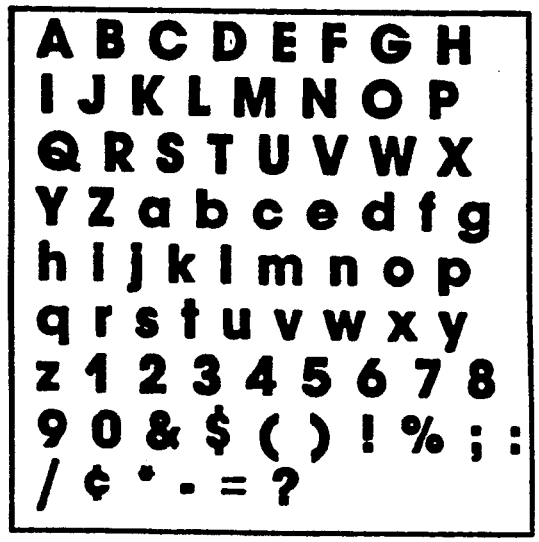
FIG. 17 is a diagram showing an avant garde bold font style.
Figure 18:
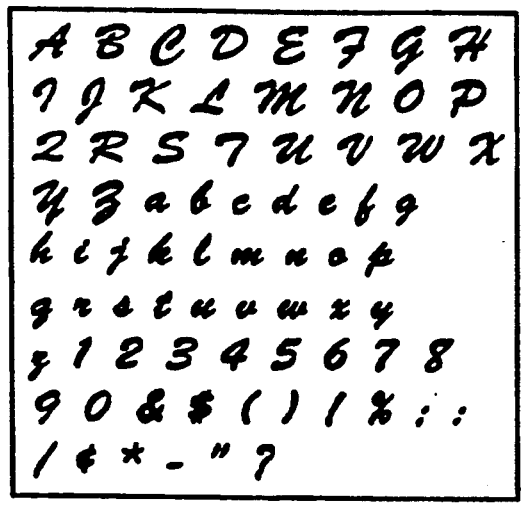
FIG. 18 is a diagram showing a brush font style.
Figure 19:
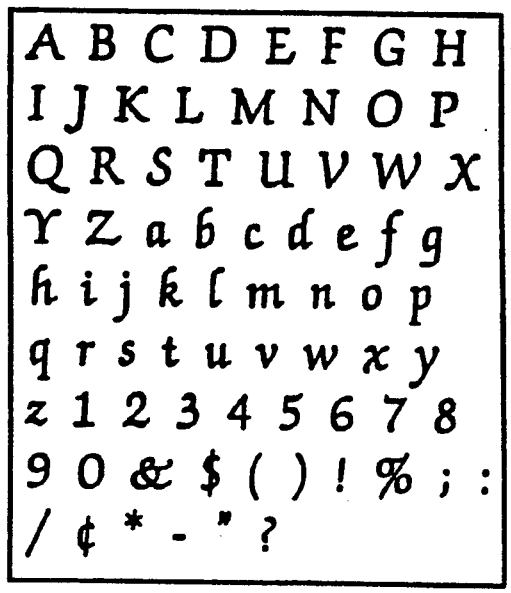
FIG. 19 is a diagram showing a zapf chancery light font style.
Figure 20:
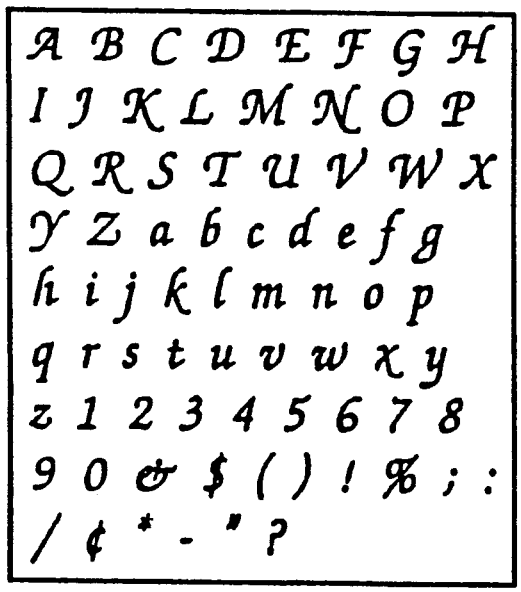
FIG. 20 is a diagram showing a zapf chancery light italicized font style.
Figure 21:
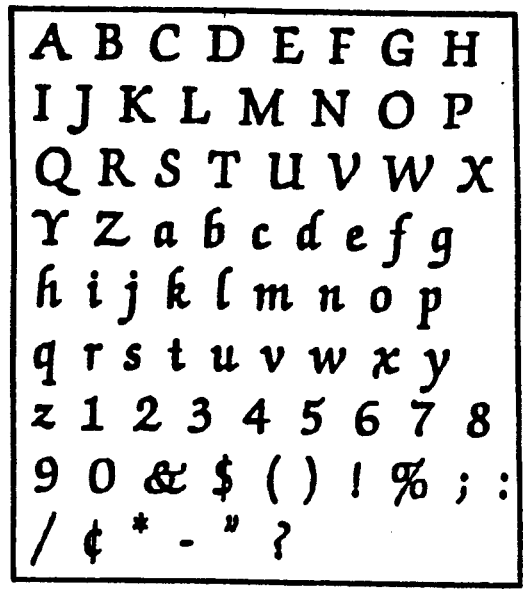
FIG. 21 is a diagram showing a zapf chancery medium font style.
Figure 22:
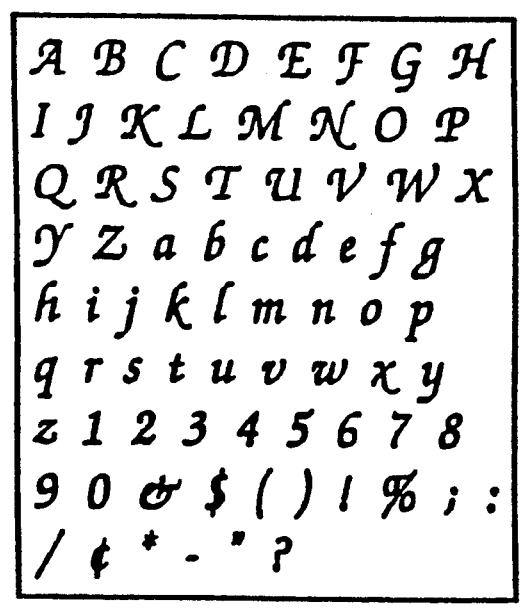
FIG. 22 is a diagram showing a zapf chancery medium italicized font style.
Figure 23:
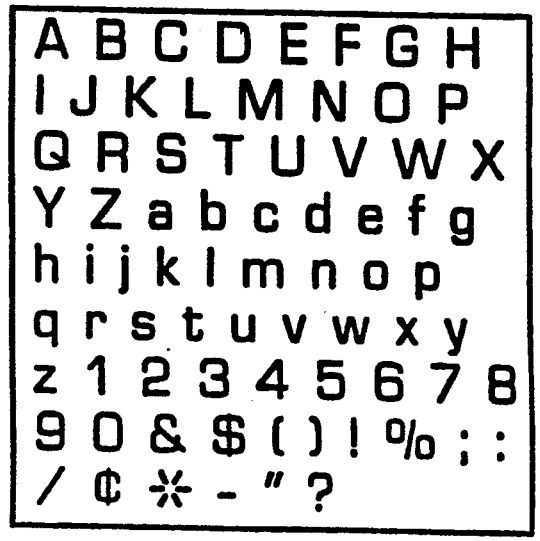
FIG. 23 is a diagram showing a eurostile font style.
Figure 24:
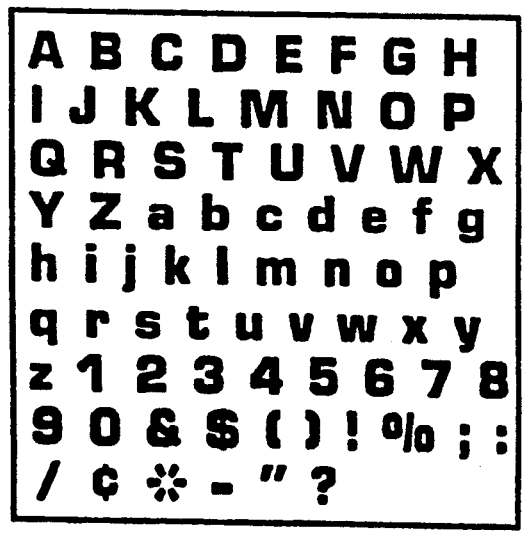
FIG. 24 is a diagram showing a eurostile bold font style.
Figure 25:
FIG. 25 is a diagram showing a garamound bold font style.
Figure 26:
FIG. 26 is a diagram showing a garamound italicized bold font style.
Figure 27:
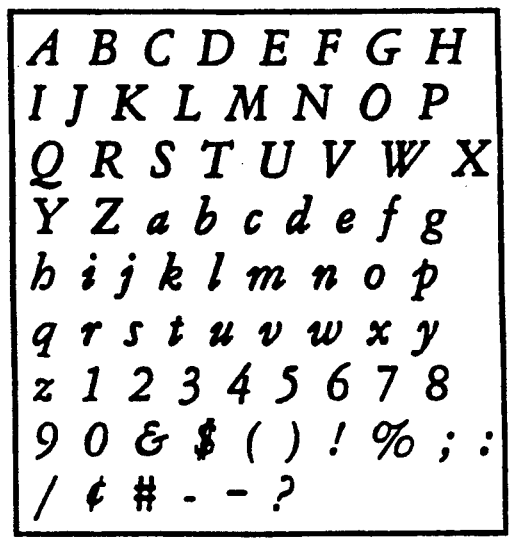
FIG. 27 is a diagram showing a garamound italicized font style.
Figure 28:
FIG. 28 is a diagram showing a gill kayo font style.
Figure 29:
FIG. 29 is a diagram showing a helena script font style.
Figure 30:
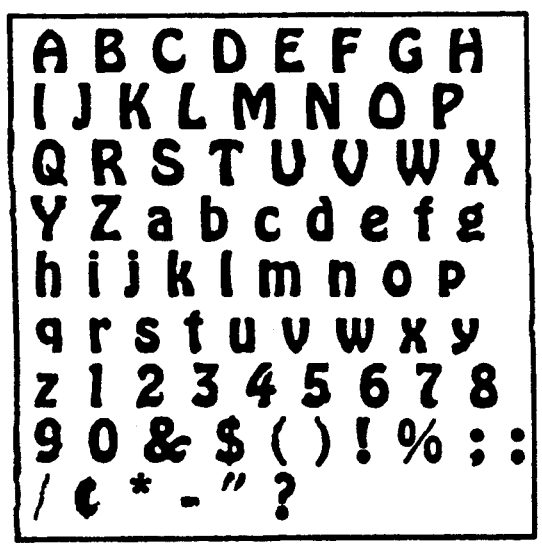
FIG. 30 is a diagram showing a hobo font style.
Figure 31:
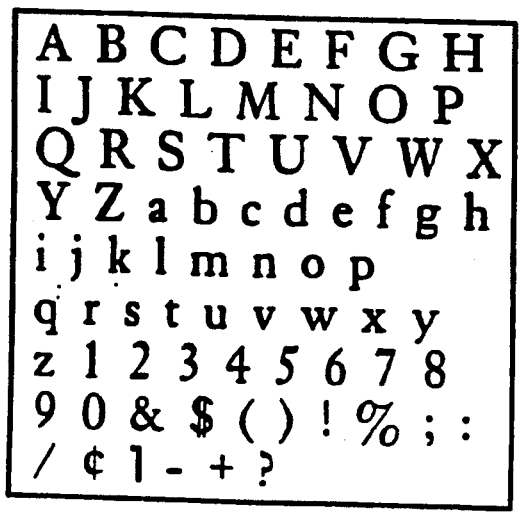
FIG. 31 is a diagram showing a janson font style.
Figure 32:
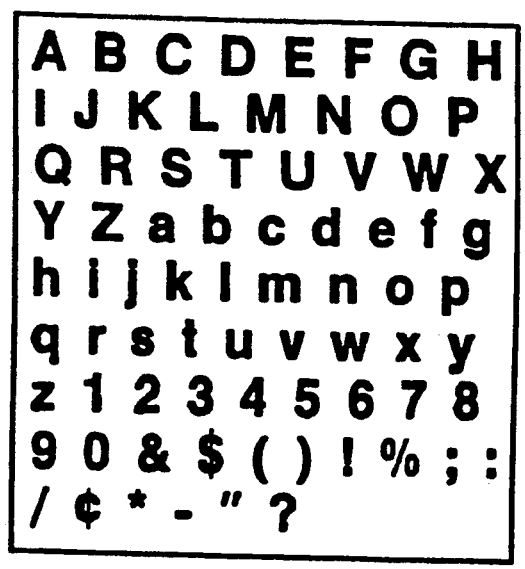
FIG. 32 is a diagram showing a megaron bold font style.
Figure 33:
FIG. 33 is a diagram showing a megaron bold italicized font style.
Figure 34:
FIG. 34 is a diagram showing a megaron medium font style.
Figure 35:
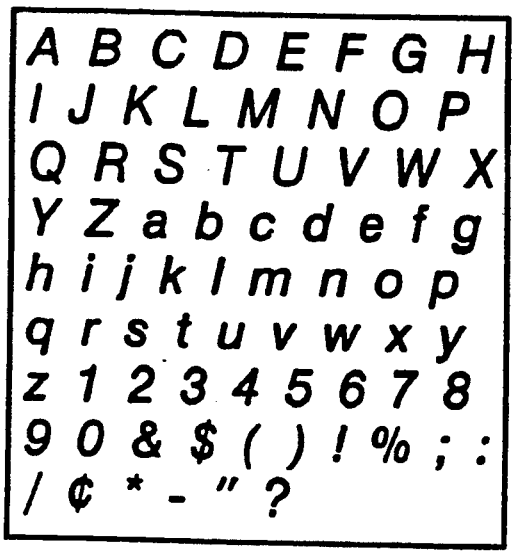
FIG. 35 is a diagram showing a megaron medium italicized font style.
Figure 36:
FIG. 36 is a diagram showing a schoolbook font style.
Figure 37:
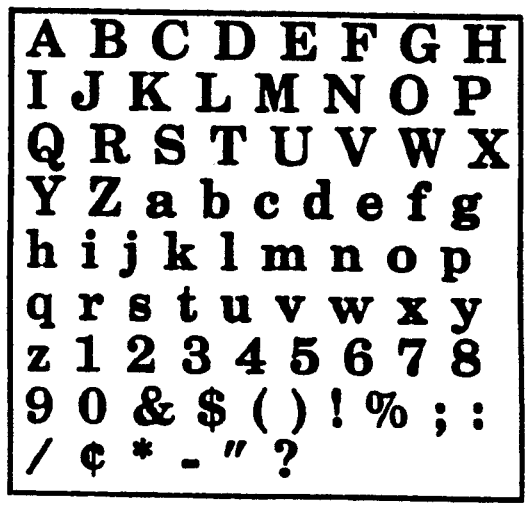
FIG. 37 is a diagram showing a schoolbook bold font style.
Figure 38:
FIG. 38 is a diagram showing a schoolbook bold italicized font style.

Notice in particular the three a's and the three b's in the center of the FIG. 16. If the original algorithm, section 4.1, is applied, then the nearest neighbors are not the same words (i.e., a and b are closest). However, if the algorithm used in section 4.2 is applied, then the nearest neighbor of a particular word (a or b) would be the centroid of its area (A or B), and the nearest neighbor is then chosen to be the same word (i.e., a points to A and b points to B). This is the basis of my claim that the images of a particular word in different font styles will cluster on the surface of an n dimensional hypersphere in Fourier space. The centroid, A or B, which is the average of a particular cluster, defines the coefficient values of a particular word in a single font group. When the area of a cluster becomes too large, with respect to the total number of clusters and their composition, the cluster should be split. This is represented in section 4.2.1 by increasing the number of font groups to define the output space.

Both printed and cursive text styles cluster in Fourier space. This is why the algorithm, section 4.2, is capable of recognizing both types of fonts. Block versus italicized, or, plain versus ornate, are capable of being recognized. The M1 distance rule, section 4.2.2, is currently the best (empirically determined) algorithm for chosing a match for an input word. Even though the coefficient values were created and energy normalized using euclidean space, the distance algorithm performs best using M1 space.

Noise in the input image is associated with a greater distance from a particular word's font group centroid (distance between the a's and A in FIG. 16). However, because the distance between an individual word (a) and its font group centroid (A) is less than another nearby word's font group center (B), added noise to the input images (up to 50%) does not adversely affect recognition. Therefore, the algorithm is substantially insensitive to the addition of noise. In Fourier space the relative area around a centroid (A or E) versus the distance between centroids (A to B) provides for large input variances while still maintaining well defined clusters for individual words. Noise and variation in font styles have the same effect in Fourier space. They both vary the location of a particular word on the surface of the hypersphere. With too much variance, incorrect matching occurs (a's match with B or b's match with A).

The technique used to compute Fourier coefficients in this research are scale invariant. The algorithm is proven to be substantially insensitive to noise and is capable of handling almost any font style, printed or cursive. Therefore, I conclude: the algorithm, as defined in section 4.2 and 4.3, is suitable as the basis for a whole word and number reading machine.

Appendix B. *Computer Program for Learning Font Groups*

```
/******************************************************************* title: dn6lnfm.c
        < lnfm = learn new font - creates transform matrices for
            each input font, to be used with each font group.
            This uses 2nd harmonic vertically and 3rd harmonic horizontally.
            This program uses the coefficient data and computes the
        average of the coefficient values for 6 types of fonts.
        Length of the test word is the first distinguishing
            deliminator. The table of number of letters
        vs. possible matching word lengths, is as follows:

Assumed length      Possible Matches
        1                   1-2
        2                   1-3
        3                   2-4
        4                   3-5
        5                   4-7
        6                   4-8
        7                   5-10
        8 and up            6 and up by :   Mark O'Hair   3 Jul 90
********************************************************************/ include <stdio.h>
include <math.h> define NULL 0
define ORDER 5
#define FILTER 11
#define BLOCK 1000
#define NUMFONTS 25
#define NUMWORDS 1000
#define MAXENTR 25000
#define fabs(n) ( ((n)<0) ? -(n) : (n) )
define pi 3.1415926535897932384626433 double coeff_a,coeff_b,coeff_c,coeff_d,**coeff_e;
double coeff_a2,coeff_b2,coeff_c2,coeff_d2,**coeff_e2;
double **coeff_f,**coeff_g,*dist;
double **coeff_f2,**coeff_g2;
int *name;

main()
{ char *font_style[35],fqword[50],character,*inputed,*fqwords[NUMWORDS+1];

int i,j,k,l,m,n,nn,x,y,w,len_i,len_j,flag_j,word_y,num;
int ww,yy,len,nam,degree,degreev,count,count_sub,lop,size_arry;
int cnt[6],startv,finishv,starth,finishh,font,flag_loop,jmax;

double diss,dix,dissa,dissb,dissc,dissd,disse,dissf;
double mean,mag,stdd,temp,trans[NUMFONTS][FILTER*FILTER];

unsigned long ptr_position[30];

FILE *fqword_ptr,*coeff_ptr,*dist_ptr,*dist_wds_ptr;
/*******************************************************************/
degree = 1;    /** degree is the filtering amount which takes place **/
degreev = 2;   /** degree is the filtering amount which takes place **/
size_arry = sizeof(double)*121;
startv = ORDER - degreev;
starth = ORDER - degree;
finishv = ORDER + degreev;
finishh = ORDER + degree;
```

```c
if ((coeff_ptr = fopen("coefficients_3","r")) == NULL)
   {
    printf("Can't open 'coefficients_3' for input.\n");
    exit(1);
   } if ((fqword_ptr = fopen("freqwords","r")) == NULL)
   {
    printf("Can't open 'FREQWORDS' for input.\n");
    exit(1);
   }

/*************** allocate space for fqwords  ****************/
for (x=0; x<NUMWORDS; x++)
 {
  fscanf(fqword_ptr,"%s",fqword);  /** get word from freqwords **/
  inputwd = fqword;
  len = strlen(inputwd);           / find length of 'inputwd' / if ( (fqwords[x] = (char *)calloc(len+1,sizeof(char))) == NULL)
   {
    printf("Error! can't allocate enough memory for fqwords\n");
    exit();
   }
  strcpy(fqwords[x],fqword);

} / end NUMWORDS loop / fclose(fqword_ptr);

j=0;
/*************** allocate space for coeff_a  ****************/
if ( !(coeff_a = (double **)calloc(BLOCK+1,sizeof(double *)) ))   j=1;
for (i=0; i<BLOCK; i++)
if ( !(coeff_a[i] = (double *)calloc(128,sizeof(double)) ))   j=1;
if(j)
  {
   printf("Error! can't allocate enough memory for coeff_a\n");
   exit();
  }

/*************** allocate space for coeff_a2  ****************/
if ( !(coeff_a2 = (double **)calloc(BLOCK+1,sizeof(double *)) ))   j=1;
for (i=0; i<BLOCK; i++)
if ( !(coeff_a2[i] = (double *)calloc(128,sizeof(double)) ))   j=1;
if(j)
  {
   printf("Error! can't allocate enough memory for coeff_a2\n");
   exit();
  }

/*************** allocate space for coeff_b  ****************/
if ( !(coeff_b = (double **)calloc(BLOCK+1,sizeof(double *)) ))   j=1;
for (i=0; i<BLOCK; i++)
if ( !(coeff_b[i] = (double *)calloc(128,sizeof(double)) ))   j=1;
if(j)
  {
   printf("Error! can't allocate enough memory for coeff_b\n");

/*************** allocate space for coeff_b2  ****************/
if ( !(coeff_b2 = (double **)calloc(BLOCK+1,sizeof(double *)) ))   j=1;
for (i=0; i<BLOCK; i++)
if ( !(coeff_b2[i] = (double *)calloc(128,sizeof(double)) ))   j=1;
if(j)
  {
   printf("Error! can't allocate enough memory for coeff_b2\n");
   exit();
  }
```

```c
/*************** allocate space for coeff_c ******************/
if ( !(coeff_c = (double **)calloc(BLOCK+1,sizeof(double *)) ))    j=1;
for (i=0; i<BLOCK; i++)
if ( !(coeff_c[i] = (double *)calloc(128,sizeof(double)) ))    j=1;
if(j)
 {
  printf("Error! can't allocate enough memory for coeff_c\n");
  exit();
 }

/*************** allocate space for coeff_c2 ******************/
if ( !(coeff_c2 = (double **)calloc(BLOCK+1,sizeof(double *)) ))    j=1;
for (i=0; i<BLOCK; i++)
if ( !(coeff_c2[i] = (double *)calloc(128,sizeof(double)) ))    j=1;
if(j)
 {
  printf("Error! can't allocate enough memory for coeff_c2\n");
  exit();
 }

/*************** allocate space for coeff_d ******************/
if ( !(coeff_d = (double **)calloc(BLOCK+1,sizeof(double *)) ))    j=1;
for (i=0; i<BLOCK; i++)
if ( !(coeff_d[i] = (double *)calloc(128,sizeof(double)) ))    j=1;
if(j)
 {
  printf("Error! can't allocate enough memory for coeff_d\n");
  exit();
 }

/*************** allocate space for coeff_d2 ******************/
if ( !(coeff_d2 = (double **)calloc(BLOCK+1,sizeof(double *)) ))    j=1;
for (i=0; i<BLOCK; i++)
if ( !(coeff_d2[i] = (double *)calloc(128,sizeof(double)) ))    j=1;
if(j)
 {
  printf("Error! can't allocate enough memory for coeff_d2\n");
  exit();
 }

/*************** allocate space for coeff_e ******************/
if ( !(coeff_e = (double **)calloc(BLOCK+1,sizeof(double *)) ))    j=1;
for (i=0; i<BLOCK; i++)
if ( !(coeff_e[i] = (double *)calloc(128,sizeof(double)) ))    j=1;
if(j)
 {
  printf("Error! can't allocate enough memory for coeff_e\n");
  exit();
 }

/*************** allocate space for coeff_e2 ******************/
if ( !(coeff_e2 = (double **)calloc(BLOCK+1,sizeof(double *)) ))    j=1;
for (i=0; i<BLOCK; i++)
if ( !(coeff_e2[i] = (double *)calloc(128,sizeof(double)) ))    j=1;
if(j)
 {
  printf("Error! can't allocate enough memory for coeff_e2\n");
  exit();
 }

/*************** allocate space for coeff_f ******************/
if ( !(coeff_f = (double **)calloc(BLOCK+1,sizeof(double *)) ))    j=1;
for (i=0; i<BLOCK; i++)
if ( !(coeff_f[i] = (double *)calloc(128,sizeof(double)) ))    j=1;
if(j)
 {
  printf("Error! can't allocate enough memory for coeff_f\n");
  exit();
 }
```

```c
/*************** allocate space for coeff_f2 *******************/
if ( !(coeff_f2 = (double **)calloc(BLOCK+1,sizeof(double *)) ))   j=1;
for (i=0; i<BLOCK; i++)
if ( !(coeff_f2[i] = (double *)calloc(128,sizeof(double)) ))       j=1;
if(j)
 {
  printf("Error! can't allocate enough memory for coeff_f2\n");
  exit();
 }

/*************** allocate space for coeff_g  *******************/
if ( !(coeff_g = (double **)calloc(BLOCK+1,sizeof(double *)) ))    j=1;
for (i=0; i<BLOCK; i++)
if ( !(coeff_g[i] = (double *)calloc(128,sizeof(double)) ))        j=1;
if(j)
 {
  printf("Error! can't allocate enough memory for coeff_g\n");
  exit();
 }

/************** allocate space for dist   *********************/
if ( !(dist = (double *)calloc(MAXENTR+5,sizeof(double)) ))   j=1;
if(j)
 {
  printf("Error! can't allocate enough memory for dist\n");
  exit();
 }

/************** allocate space for name   *********************/
if ( !(name = (int *)calloc(MAXENTR+5,sizeof(int)) ))   j=1;
if(j)
 {
  printf("Error! can't allocate enough memory for name\n");
  exit();
 }

/*****************************************************************/
  font_style[0] = "avant_garde.font";
  font_style[1] = "avant_garde_b.font";
  font_style[2] = "brush.font";
  font_style[3] = "chancery_zapf_l.font";
  font_style[4] = "chancery_zapf_l_i.font";
  font_style[5] = "chancery_zapf_m.font";
  font_style[6] = "chancery_zapf_m_i.font";
  font_style[7] = "eurostile.font";
  font_style[8] = "eurostile_b.font";
  font_style[9] = "garamound_b.font";
  font_style[10] = "garamound_b_i.font";
  font_style[11] = "garamound_i.font";
  font_style[12] = "gill_kayo.font";
  font_style[13] = "helena_script.font";
  font_style[14] = "hobo.font";
  font_style[15] = "janson.font";
  font_style[16] = "megaron_b.font";
  font_style[17] = "megaron_b_i.font";
  font_style[18] = "megaron_m.font";
  font_style[19] = "megaron_m_i.font";
  font_style[20] = "schoolbook.font";
  font_style[21] = "schoolbook_b.font";
  font_style[22] = "schoolbook_b_i.font";
  font_style[23] = "schoolbook_i.font";
  font_style[24] = "wedding_text.font";
  font_style[25] = "EMPTY";
  font_style[26] = "ital";
  font_style[27] = "reg_a";
  font_style[28] = "reg_as_g";
  font_style[29] = "reg_as_gs";
  font_style[30] = "script";
  font_style[31] = "special";
```

```
for (x=0; x<MAXENTR; x++)
  {
    dist[x] = 20.0;
    name[x] = 25 * BLOCK;
  }
for (y=0; y<BLOCK; y++)
for (k=0; k<128; k++)
  {
    coeff_a[y][k] = 0.0;
    coeff_b[y][k] = 0.0;
    coeff_c[y][k] = 0.0;
    coeff_d[y][k] = 0.0;
    coeff_e[y][k] = 0.0;
    coeff_f[y][k] = 0.0;
  }

/***********************************************************************/
for (x=0; x<25; x++)
 {
  ptr_position[x] = ftell(coeff_ptr);
  for (lop=0; lop<BLOCK; lop++)
    fread(coeff_g[lop],size_arry,1,coeff_ptr);

/********* energy normalize based on number of coefficients used *********/
  for (nn=0; nn<BLOCK; nn++)
    {
      mag = 0.0;
      for (k=(startv); k<=(finishv); k++)
      for (l=(starth); l<=(finishh); l++)
        {
          num = k*FILTER + l;
          diss = coeff_g[nn][num] * coeff_g[nn][num];
          mag += fabs(diss);
        }
      mean = sqrt(mag);
      for (k=(startv); k<=(finishv); k++)
      for (l=(starth); l<=(finishh); l++)
        {
          num = k*FILTER + l;
          coeff_g[nn][num] = coeff_g[nn][num]/mean;
        }
    }
/***********************************************************************/ if ((x==3) || (x==4) || (x==5) || (x==6) || (x==10) || (x==11))
   {
    for (y=0; y<BLOCK; y++)
    for (k=(startv); k<=(finishv); k++)
    for (l=(starth); l<=(finishh); l++)
      {
  num = k*FILTER + l;
        coeff_a[y][num] += coeff_g[y][num];
      }
   } if ((x==0) || (x==1) || (x==22) || (x==23))
   {
    for (y=0; y<BLOCK; y++)
    for (k=(startv); k<=(finishv); k++)
    for (l=(starth); l<=(finishh); l++)
      {
        num = k*FILTER + l;
        coeff_b[y][num] += coeff_g[y][num];
      }
   }
```

```
if ((x==7) || (x==8) || (x==16) || (x==17) || (x==18) || (x==19))
  {
    for (y=0; y<BLOCK; y++)
    for (k=(startv); k<=(finishv); k++)
    for (l=(starth); l<=(finishh); l++)
      {
        num = k*FILTER + l;
        coeff_c[y][num] += coeff_g[y][num];
      }
  } if ((x==9) || (x==15) || (x==20) || (x==21))
  {
    for (y=0; y<BLOCK; y++)
    for (k=(startv); k<=(finishv); k++)
    for (l=(starth); l<=(finishh); l++)
      {
        num = k*FILTER + l;
        coeff_d[y][num] += coeff_g[y][num];
      }
  } if ((x==2) || (x==13))
  {
    for (y=0; y<BLOCK; y++)
    for (k=(startv); k<=(finishv); k++)
    for (l=(starth); l<=(finishh); l++)
      {
        num = k*FILTER + l;
        coeff_e[y][num] += coeff_g[y][num];
      }
  } if ((x==12) || (x==14))
  {
    for (y=0; y<BLOCK; y++)
    for (k=(startv); k<=(finishv); k++)
    for (l=(starth); l<=(finishh); l++)
      {
        num = k*FILTER + l;
        coeff_f[y][num] += coeff_g[y][num];
      }
  }

} / end x loop / for (y=0; y<BLOCK; y++)
for (k=(startv); k<=(finishv); k++)
for (l=(starth); l<=(finishh); l++)
  {
    num = k*FILTER + l;
    coeff_a[y][num] = coeff_a[y][num]/6.0;
    coeff_a2[y][num] = coeff_a[y][num];
    coeff_b[y][num] = coeff_b[y][num]/4.0;
    coeff_b2[y][num] = coeff_b[y][num];
    coeff_c[y][num] = coeff_c[y][num]/6.0;
    coeff_c2[y][num] = coeff_c[y][num];
    coeff_d[y][num] = coeff_d[y][num]/4.0;
    coeff_d2[y][num] = coeff_d[y][num];
    coeff_e[y][num] = coeff_e[y][num]/2.0;
    coeff_e2[y][num] = coeff_e[y][num];
    coeff_f[y][num] = coeff_f[y][num]/2.0;
    coeff_f2[y][num] = coeff_f[y][num];
  }
```

```
/**************************************************************/
   for (y=0; y<25; y++)
   {
     for (nn=0; nn<BLOCK; nn++)
     for (k=(startv); k<=(finishv); k++)
     for (l=(starth); l<=(finishh); l++)
       {
          num = k*FILTER + l;
          coeff_a[nn][num] = coeff_a2[nn][num];
          coeff_b[nn][num] = coeff_b2[nn][num];
          coeff_c[nn][num] = coeff_c2[nn][num];
          coeff_d[nn][num] = coeff_d2[nn][num];
          coeff_e[nn][num] = coeff_e2[nn][num];
          coeff_f[nn][num] = coeff_f2[nn][num];
       } fseek(coeff_ptr,ptr_position[y],0);
     for (lop=0; lop<BLOCK; lop++)
         fread(coeff_g[lop],size_arry,1,coeff_ptr);

/********* energy normalize based on number of coefficients used **********/
   for (nn=0; nn<BLOCK; nn++)
    {
      mag = 0.0;
      for (k=(startv); k<=(finishv); k++)
      for (l=(starth); l<=(finishh); l++)
        {
           num = k*FILTER + l;
           diss = coeff_g[nn][num] * coeff_g[nn][num];
           mag += fabs(diss);
        }
      mean = sqrt(mag);
      for (k=(startv); k<=(finishv); k++)
      for (l=(starth); l<=(finishh); l++)
        {
           num = k*FILTER + l;
           coeff_g[nn][num] = coeff_g[nn][num]/mean;
        }
    }
   }
/**************************************************************/ flag_loop = 1;

REPEAT:
   for (k=0; k<6; k++)
   for (l=0; l<(FILTER*FILTER); l++)
       trans[k][l] = 0.0;
   for (k=0; k<6; k++)
       cnt[k] = 0;
     if (flag_loop <= 2)    /** first 2 passes are for transformation coeff's **/
        jmax = BLOCK/5;     /** passes are limited to the first 200 words    **/
     else
        jmax = BLOCK;

for (j=0; j<jmax; j++)
     {
       for (i=0; i<BLOCK; i++)
       {
len_i = strlen(fqwords[i]);
len_j = strlen(fqwords[j]);
         flag_j = 0;

if (len_j==1 && len_i<3)
             flag_j = 1;
         else if (len_j==2 && len_i<4)
             flag_j = 1;
```

```
           else if ((len_j==3) && (len_i>1 && len_i<5))
               flag_j = 1;
           else if ((len_j==4) && (len_i>2 && len_i<6))
               flag_j = 1;
           else if ((len_j==5) && (len_i>3 && len_i<8))
               flag_j = 1;
           else if ((len_j==6) && (len_i>3 && len_i<9))
               flag_j = 1;
           else if ((len_j==7) && (len_i>4 && len_i<11))
               flag_j = 1;
           else if (len_j>7 && len_i>6)
               flag_j = 1;

word_y = (y * BLOCK) + j;
           dissa = 0.0;
           dissb = 0.0;
           dissc = 0.0;
   dissd = 0.0;
   disse = 0.0;
   dissf = 0.0;

if (flag_j==1)
       {
           for (k=(startv); k<=(finishv); k++)
           for (l=(starth); l<=(finishh); l++)
           {
   num = k*FILTER + l;
   dissa += fabs(coeff_a[i][num] - coeff_g[j][num]);
   dissb += fabs(coeff_b[i][num] - coeff_g[j][num]);
   dissc += fabs(coeff_c[i][num] - coeff_g[j][num]);
   dissd += fabs(coeff_d[i][num] - coeff_g[j][num]);
   disse += fabs(coeff_e[i][num] - coeff_g[j][num]);
   dissf += fabs(coeff_f[i][num] - coeff_g[j][num]);
           }
           if (dist[word_y] > dissa)
               {
   dist[word_y] = dissa;
   name[word_y] = i + 26 * BLOCK;
       }
           if (dist[word_y] > dissb)
               {
   dist[word_y] = dissb;
   name[word_y] = i + 27 * BLOCK;
       }
           if (dist[word_y] > dissc)
               {
   dist[word_y] = dissc;
   name[word_y] = i + 28 * BLOCK;
       }
           if (dist[word_y] > dissd)
               {
   dist[word_y] = dissd;
   name[word_y] = i + 29 * BLOCK;
       }
           if (dist[word_y] > disse)
               {
   dist[word_y] = disse;
   name[word_y] = i + 30 * BLOCK;
       }
           if (dist[word_y] > dissf)
               {
   dist[word_y] = dissf;
   name[word_y] = i + 31 * BLOCK;
       }

} /** end if flag_j **/
     } /** end i loop **/
```

```
/*********************************************************************/ font = name[word_y]/BLOCK;
    nn = (name[word_y] % BLOCK);

if (flag_loop < 3)
     {
      if (font == 26)
         {
           for (vv=(startv); vv<=(finishv); vv++)
           for (yy=(starth); yy<=(finishh); yy++)
              {
    num = vv * FILTER + yy;
    trans[0][num] += (coeff_a[nn][num] - coeff_g[j][num]);
              }
           cnt[0]++;
         }
      else if (font == 27)
         {
           for (vv=(startv); vv<=(finishv); vv++)
           for (yy=(starth); yy<=(finishh); yy++)
              {
    num = vv * FILTER + yy;
    trans[1][num] += (coeff_b[nn][num] - coeff_g[j][num]);
              }
           cnt[1]++;
         }
      else if (font == 28)
         {
           for (vv=(startv); vv<=(finishv); vv++)
           for (yy=(starth); yy<=(finishh); yy++)
              {
    num = vv * FILTER + yy;
    trans[2][num] += (coeff_c[nn][num] - coeff_g[j][num]);
              }
           cnt[2]++;
         }
      else if (font == 29)
         {
           for (vv=(startv); vv<=(finishv); vv++)
           for (yy=(starth); yy<=(finishh); yy++)
              {
    num = vv * FILTER + yy;
    trans[3][num] += (coeff_d[nn][num] - coeff_g[j][num]);
              }
           cnt[3]++;
         }
      else if (font == 30)
         {
           for (vv=(startv); vv<=(finishv); vv++)
           for (yy=(starth); yy<=(finishh); yy++)
              {
    num = vv * FILTER + yy;
    trans[4][num] += (coeff_e[nn][num] - coeff_g[j][num]);
              }
           cnt[4]++;
         }
      else if (font == 31)
         {
           for (vv=(startv); vv<=(finishv); vv++)
           for (yy=(starth); yy<=(finishh); yy++)
              {
    num = vv * FILTER + yy;
    trans[5][num] += (coeff_f[nn][num] - coeff_g[j][num]);
              }
           cnt[5]++;
         }

} /** end if flag_loop **/
```

```c
     } /** end j loop **/
/**************************************************************/
   for (yy=0; yy<6; yy++)
     {
       if (cnt[yy] >= 10)
         {
           diss = cnt[yy]/1.0;                /** scale transfer function **/
           for (ww=0; ww<(FILTER*FILTER); ww++)
               trans[yy][ww] = trans[yy][ww]/diss;
         }
       else if (cnt[yy] > 0)
         {
           diss = cnt[yy]*10.0/1.0;           /** scale transfer function **/
           for (ww=0; ww<(FILTER*FILTER); ww++)
               trans[yy][ww] = trans[yy][ww]/diss;
         }
       else
           for (ww=0; ww<(FILTER*FILTER); ww++)
               trans[yy][ww] = 0.0;
     }
/**************************************************************/
   for (ww=0; ww<BLOCK; ww++)
   for (yy=(startv); yy<=(finishv); yy++)
   for (nn=(starth); nn<=(finishh); nn++)
     {
       num = yy*FILTER + nn;
       coeff_a[ww][num] -= trans[0][num];
       coeff_b[ww][num] -= trans[1][num];
       coeff_c[ww][num] -= trans[2][num];
       coeff_d[ww][num] -= trans[3][num];
       coeff_e[ww][num] -= trans[4][num];
       coeff_f[ww][num] -= trans[5][num];
     } if (flag_loop<3)
     {
       flag_loop++;
       goto REPEAT;
     }

} /** end y loop **/

/****************************************************************
    Print out the nearest neighbor for each word
****************************************************************/ if ((dist_ptr = fopen("results/d6lnfm_3_2-1n","a")) == NULL)
   {
    printf("Can't open 'results/d6lnfm_3_2-1n' for input.\n");
    exit(1);
   } if ((dist_wds_ptr = fopen("words/d6lnfm_3_2-1n_wds","a")) == NULL)
   {
    printf("Can't open 'words/d6lnfm_3_2-1n_wds' for input.\n");
    exit(1);
   }

/****************************************************************/ fprintf(dist_ptr,"\nFONT GROUP = 6norm lnfm   SPACING = +3
                  HARMONICS USED = %d(vert) %d(horz)",degreev,degree);
fprintf(dist_wds_ptr,"\nFONT GROUP = 6norm lnfm   SPACING = +3
   HARMONICS USED = %d(vert) %d(horz)",degreev,degree);
```

```
/******************************************************************/ count = 0;
 for (x=0; x<MAXENTR; x++)
   {
     k = (x % BLOCK);
     l = (name[x] % BLOCK);
     if (k == l)
        count++;
   }
 diss = count*100.0/MAXENTR;
 fprintf(dist_ptr,"\n\nTop choice is %5.1f percent correct overall\n",diss);
 fflush(dist_ptr);

/******************************************************************/
 i = 0;
 count = 0;
 for (x=0; x<MAXENTR; x++)
   {
     i = x/BLOCK;
     if (i<24)
       {
         k = (x % BLOCK);
         l = (name[x] % BLOCK);
         if (k == l)
            count++;
       }
   }
 diss = count*100.0/(MAXENTR-(1*BLOCK));
 fprintf(dist_ptr,"\n\nTop choice is %5.1f percent correct excluding wedding font\n",diss);
 fflush(dist_ptr);

/******************************************************************/ i = 0;
 count = 0;
 for (x=0; x<MAXENTR; x++)
  {
   k = (x % BLOCK);
   l = (name[x] % BLOCK);
   if (k == 0)                 /** beginning of particular font **/
       count = 0;
   if (k == l)                 /** record if a match is found **/
       count++;
   if (k == (BLOCK-1))         /** end of particular font **/
     {
       diss = count/10.0;
       fprintf(dist_ptr,"\n%6.1f percent correct for %s",diss,font_style[i]);

yy = (x/BLOCK) * BLOCK;
       mean = 0.0;
       for (ww=0; ww<BLOCK; ww++)
         {
           nn = yy + ww;
           mean += dist[nn];
         }
       mean = mean/BLOCK;
       stdd = 0.0;
       for (ww=0; ww<BLOCK; ww++)
         {
           nn = yy + ww;
           temp = (mean - dist[nn]);
           stdd += (temp * temp);
         }
       stdd = stdd/BLOCK;
       stdd = sqrt(stdd);
       fprintf(dist_ptr,"\n   mean = %6.2f   standard dev = %5.2f",mean,stdd);
```

```
        fflush(dist_ptr);
        i++;

} /** end if k **/
    } / end x loop / fprintf(dist_ptr,"\n");
    fflush(dist_ptr);

/************************************************************/
    y = 0;
    for (m=0; m<MAXENTR; m++)
    {
        i = (m % BLOCK);
        nam = (name[m] % BLOCK);
        n = name[m]/BLOCK;
        if (i == 0)
        {
            fprintf(dist_wds_ptr,"\n\n**%s**",font_style[y]);
            y++;
        }
        if (i != nam)
        {
            fprintf(dist_wds_ptr,"\n%d\t%s",i+1,fqwords[i]);
            fprintf(dist_wds_ptr,"\t    %s   %s   %6.3f",fqwords[nam],font_style[n],dist[m]);
        }

}
    fprintf(dist_wds_ptr,"\n");
    fflush(dist_wds_ptr);

fclose(dist_ptr);
    fclose(dist_wds_ptr);

} /** end main **/
```

Bibliography

1. Larry F. Bush. The design of an optimum alphanumeric symbol set for cockpit displays. Master's thesis, School of Engineering, Air Force Institute of Technology (AU), Wright-Patterson AFB OH, dec 1977.
2. Fred Dillon. The Dillon Printery, Brookville, Ohio, 1988.
3. Peter Dunn-Rankin. The visual characteristics of words. Scientific American, pages 122–130, jan 1978.
4. Eleanor J. Gibson and Harry Levin. The Psychology of Reading. Mass. Institute of Technology Press, Cambridge, Mass., 1975.
5. A. C. Guyton. Textbook of Medical Physiology. W. B. Saunders Co., Philadelphia, forth edition, 1971.
6. Matthew Kabriskv. A Proposed Model for Visual Information Processing in the Human Brain. University of Iwnois Press, Chicago, 1964.
7. Kurt Kofrk-a. Principles of Gestalt Psychology. Harcourt, Bruce, and World Inc., New York, 1935.
8. Kurt KofFka. Perception: an Introduction to the Gestalt-thorie. Philosophical Library, New York, 1961.
9. Wolfgang Kohler. Gestalt Psychology. Liveright Publishing Corp., New York, 1929.
10. Henry Kucera and W. Nelson Francis. Computational Analysis of Present Day American English. Brown University Press, Providence, RI, 1967.
11. Erika Lindemann. A Rhetoric For Writing Teachers. Oxford University Press, New York, 1982.
12. Frank A. Maher. A correlation of human and machine pattern discrimination. NASCON 1970 RECORD, pages 260–4,1970.
13. Mark A. O'Hair. Whole word recognition based on low frequency fourier complex and amplitude spectrums. Master's thesis, School of Engineering, Air Force Institute of Technology (AU), Wright-Patterson AFB OH, dec 1984.
14. Charles Radoy. Pattern recognition by fourier series transformations. Master's thesis, School of Engineering, Air Force Institute of Technology (AU), Wright-Patterson AFB OH, aug 1968.
15. O. H. Tallman. The Classification of Visual Images by Spatial Filtering. PhD thesis, School of Engineering, Air Force Institute of Technology (AU), Wright-Patterson AFB OH, jun 1969.
16. Miles A. Tinker. Bases For Effective Reading. University of Minnesota, Minneapolis, 1966.

It is understood, that certain modifications to the invention as described, may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of the invention or from the scope of the appended claims.

What is claimed is:

1. The method of recognizing text, with a system having representative digital images stored in memory, comprising the steps:

(a) building a library of library images of known entities comprising words, phrases and numbers using low frequency filtered Fourier coefficients, using many different font styles, and assembling them into font groups; the font groups being created by averaging Fourier coefficients of a particular entity in different font styles, with first and second properties generated for each coefficient, the first property being a mean value which equates to a unique location in Fourier space, the second property being a standard deviation associated with the averaging of the coefficients, this standard deviation being considered as a radius of a chosen font group, a font group center being a mean value derived by averaging Fourier coefficients of a particular entity in the different font styles;

(b) inputting an image representing text;

(c) digitizing the image to form a digital picture thereof;

(d) storing the image in memory;

(e) breaking the image into blocks of data, wherein the blocks represent entire words, phrases, or numbers;

(f) placing a window around the first individual block;

(g) performing a two-dimensional discrete Fourier Transform (2DDFT) of the image within the window;

(h) adjusting the punctuations;

(i) filtering both the real (cosine) and imaginary (sine) coefficients to the first N harmonics in both the vertical and horizontal axis, these coefficients then make up a total of M unique vectors which defines a M orthogonal vector space, wherein N is at least five and M is $(2N+1)^2$;

(j) energy normalizing to unity the M unique vectors, which will eliminate the effects due to image brightness;

(k) searching the library of known coefficients and finding the closest match by computing the smallest error between library image and input image;

(l) calculating a confidence value of the closest match based on the radius of the chosen font group and the distance between the font group center and the input image;

(m) storing the match if confidence is high, or further investigating if confidence is low.

2. The method according to claim 1, wherein the system has the capability to self-monitor its decisions and performance and make an appropriate change(s) to its algorithm to improve its level of recognition; wherein when confidence is low, the method of recognition enters into a self-monitoring mode; wherein this mode includes the following steps:

(n) varying the total number of harmonics used and the specific harmonic field used for recognition;

(o) monitoring the percentage of words which exceed a low confidence threshold and activating the self-retraining mode;

(i) using a small sample of less than a given number of words;

(ii) calculating the mean magnitude and direction of errors between the input words, phrases, or numbers and the library words or numbers;

(iii) adding this mean magnitude and direction to the entire library font group(s);

(iv) if the confidence values do not improve for the next set of said given number of input words, then returning the previous font group(s) to their values and repeating the first given number of inputs against the font styles in the library; using the most popular two or three font styles selected between the nearest neighbor matches, building a new font group using these two or three most popular font styles and the input font style;

(v) if the confidence values do not improve for the third set of said given number of input words, then eliminating this new font group, using only the original font groups in the library, and flagging al words with a low confidence value.

3. The method according to claim 2, which further includes (p) activating solutions that include the steps:

(i) breaking the input image into three parts;

(ii) imaging the input into three distinct Fourier vector spaces and reaching a best solution based on their correlation;

(iii) varying scanner resolution;

(iv) searching strategic key subregions of the input image to eliminate confusion between words that differ only in details such as 'came/come' or 'after/often';

(v) post processing based on syntax and semantics.

4. The method according to claim 3, which further includes displaying, for a human operator, only those words, phrases, and numbers which exceed the low confidence threshold and can not be improved upon by steps (n), (o), or (p) or any combination of these steps.

5. The method according to claim 1, wherein the system has the capability to self-monitor its decisions and performance and make an appropriate change(s) to its algorithm to improve its level of recognition; wherein when confidence is low, the method of recognition enters into a self-monitoring mode; wherein this mode includes the following step:

(n) varying the total number of harmonics used and the specific harmonic field used for recognition.

6. The method according to claim 1, wherein the system has the capability to self-monitor its decisions and performance and make an appropriate change(s) to its algorithm to improve its level of recognition; wherein when confidence is low, the method of recognition enters into a self-monitoring mode; wherein the mode includes the following steps:

(n) monitoring the percentage of words which exceed a low confidence threshold and activating the self-retraining mode;

(i) using a small sample of less than a given number of words;

(ii) calculating the means magnitude and direction of errors between the input words, phrases, or numbers and the library words or numbers;

(iii) adding this mean magnitude and direction to the entire library font group(s);

(iv) if the confidence values do not improve for the next set of said given number of input words, then returning the previous font group(s) to their values and repeating the first given number of inputs against the font styles in the library; using the most popular two or three font styles selected between the nearest neighbor matches, building a new font group using these two or three most popular font styles and the input font style;

(v) if the confidence values do not improve for the third set of said given number of input words, then eliminating this new font group, using only the original font groups in the library, and flagging all words with a low confidence value.

* * * * *